US007816682B2

(12) United States Patent
Kimura

(10) Patent No.: US 7,816,682 B2
(45) Date of Patent: Oct. 19, 2010

(54) LIQUID CRYSTAL DISPLAY DEVICE AND SEMICONDUCTOR DEVICE

(75) Inventor: Hajime Kimura, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 506 days.

(21) Appl. No.: 11/746,377

(22) Filed: May 9, 2007

(65) Prior Publication Data
US 2007/0284627 A1 Dec. 13, 2007

(30) Foreign Application Priority Data
May 16, 2006 (JP) ............... 2006-135954

(51) Int. Cl.
H01L 29/04 (2006.01)
(52) U.S. Cl. ............... 257/59; 349/43; 349/46
(58) Field of Classification Search ........... 349/43, 349/46, 47, 141, 142, FOR. 129; 257/59
See application file for complete search history.

(56) References Cited

U.S. PATENT DOCUMENTS

| 5,870,160 | A | 2/1999 | Yanagawa et al. |
| 5,966,193 | A | 10/1999 | Zhang et al. |
| 6,034,757 | A | 3/2000 | Yanagawa et al. |
| 6,108,066 | A | 8/2000 | Yanagawa et al. |
| 6,281,953 | B1 | 8/2001 | Lee et al. |
| 6,507,383 | B1 * | 1/2003 | Abe et al. .......... 349/141 |
| 6,914,656 | B2 | 7/2005 | Sakamoto et al. |
| 7,088,409 | B2 | 8/2006 | Itou et al. |
| 7,605,898 | B2 * | 10/2009 | Ochiai et al. ........ 349/143 |
| 2003/0103181 | A1 | 6/2003 | Imayama et al. |
| 2003/0218664 | A1 | 11/2003 | Sakamoto et al. |
| 2004/0051100 | A1 * | 3/2004 | Yamazaki et al. ...... 257/59 |
| 2005/0001959 | A1 | 1/2005 | Chang |
| 2005/0105033 | A1 | 5/2005 | Itou et al. |
| 2005/0128390 | A1 | 6/2005 | Yang |
| 2005/0140867 | A1 | 6/2005 | Choi |
| 2005/0264731 | A1 | 12/2005 | Itou et al. |

(Continued)

FOREIGN PATENT DOCUMENTS

JP 08-078329 3/1996

(Continued)

OTHER PUBLICATIONS

S.H. Lee et al.; "29.2: 18.1" Ultra-FFS TFT-LCD with Super Image Quality and Fast Response Time; *SID '01 Digest*; pp. 484-487; 2001.

(Continued)

Primary Examiner—Zandra Smith
Assistant Examiner—Paul E Patton
(74) Attorney, Agent, or Firm—Fish & Richardson P.C.

(57) ABSTRACT

By increasing an interval between electrodes which drives liquid crystals, a gradient of an electric field applied between the electrodes can be controlled and an optimal electric field can be applied between the electrodes. The invention includes a first electrode formed over a substrate, an insulating film formed over the substrate and the first electrode, a thin film transistor including a semiconductor film in which a source, a channel region, and a drain are formed over the insulating film, a second electrode located over the semiconductor film and the first electrode and including first opening patterns, and liquid crystals provided over the second electrode.

16 Claims, 38 Drawing Sheets

U.S. PATENT DOCUMENTS

| | | |
|---|---|---|
| 2006/0092356 A1 | 5/2006 | Morimoto et al. |
| 2006/0092363 A1 | 5/2006 | Hasegawa et al. |
| 2006/0164575 A1 | 7/2006 | Su et al. |
| 2006/0192912 A1 | 8/2006 | Itou et al. |
| 2006/0215086 A1 | 9/2006 | Kurasawa |
| 2006/0215087 A1 | 9/2006 | Matsushima et al. |
| 2006/0267891 A1 | 11/2006 | Nishimura et al. |
| 2007/0126969 A1 | 6/2007 | Kimura et al. |
| 2007/0146591 A1 | 6/2007 | Kimura et al. |

FOREIGN PATENT DOCUMENTS

| | | |
|---|---|---|
| JP | 2000-089255 | 3/2000 |
| JP | 2006-184325 | 7/2006 |

OTHER PUBLICATIONS

J.H. Song et al.; "Electro-optic Characteristics of Fringe-Field Driven Transflective LCD with Dual Cell Gap"; *IDW/AD '005*, vol. 1; pp. 103-106; 2005.

M.O. Choi et al.; "P-110: A Single Gap Transflective Display using a Fringe-Field Driven Homogeneously Aligned Nematic Liquid Crystal Display"; *SID '05 Digest*; pp. 719-721; 2005.

Ruibo Lu et al.; "4:4: Transflective Liquid Crystal Display Using In-plane Switching Effect"; *Conference Record of the 2006 IDRC (International Display Research Conference)*; pp. 39-42; 2006.

Gak Seok Lee et al.; "6.3: Design of Wide-Viewing-Angle Transflective IPS LCD"; *Conference Record of the 2006 IDRC (International Display Research Conference)*; pp. 75-77; 2006.

Norio Aoki; "16.3: *Invited Paper*: Advanced IPS Technology for Mobile Applications"; *SID '06 Digest*; pp. 1087-1090; 2006.

Michiaki Sakamoto et al.; "L-6: *Late-News Paper*: Development of the Novel Transflective LCD Module Using Super-Fine-TFT Technology"; *SID '06 Digest*; pp. 1669-1672; 2006.

Gak Seok Lee et al.; "Optical Configuration of Horizontal-Switching Transflective LCDs in Double Cellgap Structure"; *IDW/AD '05*; pp. 111-114; 2005.

Osamu Itou et al.; "P-231L: *Late-NewsPoster*: A Wide Viewing Angle Transflective IPS LCD Applying New Optical Design"; *SID '06 Digest*; pp. 832-835; 2006.

Jae Geon You et al.; "23.4: Characteristics and Reliabilities of the Ion Beam Irradiated Polyimide as an LC Alignment Layer"; *SID '05 Digest*; pp. 1089-1091; 2005.

Office action (Application No. 200710104131.4) dated Feb. 5, 2010 with Full English translation, 26 pages.

\* cited by examiner

LIQUID CRYSTAL DISPLAY DEVICE AND SEMICONDUCTOR DEVICE

BACKGROUND OF THE INVENTION

1. Field of the Invention

The present invention relates to a semiconductor device and a liquid crystal display device. In particular, the invention relates to a semiconductor device and a liquid crystal display device each controlling liquid crystal molecules by generating an electric field almost parallel to a substrate.

2. Description of the Related Art

One of technical development strategies of a liquid crystal display device is widening a viewing angle. As a technique for realizing a wide viewing angle, a mode has been used in which gray scales are controlled by generating an electric field almost parallel to a substrate to move liquid crystal molecules within a surface parallel to the substrate. IPS (In-Plane Switching) and FFS (Fringe-Field Switching) are given as such a mode. In an FFS mode, a second electrode having an opening pattern (e.g., a pixel electrode of which a voltage is controlled per pixel) is provided below liquid crystals, and a first electrode (e.g., a common electrode of which a voltage common to all pixels is supplied) is provided below the opening pattern. An electric field is applied between the pixel electrode and the common electrode, so that the liquid crystals are controlled. Since an electric field is applied to the liquid crystals in a direction parallel to a substrate, liquid crystal molecules can be controlled by using the electric field. That is, since liquid crystal molecules which are aligned in parallel to the substrate (so-called homogeneous alignment) can be controlled in a direction parallel to the substrate, a viewing angle is widened.

The first electrode (the common electrode) is formed to be in direct contact with a glass substrate, and a gate electrode in an inversely staggered transistor is also formed to be in direct contact with the glass substrate. An insulating film functioning as a gate insulating film in the inversely staggered transistor is formed to be in direct contact therewith. In addition, the second electrode (the pixel electrode) is formed thereover (see Reference 1: Japanese Published Patent Application No. 2000-89255).

Alternatively, the first electrode (the common electrode) is formed to be in direct contact with the insulating film functioning as the gate insulating film in the inversely staggered transistor. Note that a semiconductor film, a source electrode, and a drain electrode are also formed to be in direct contact with the insulating film functioning as the gate insulating film in the inversely staggered transistor. In addition, an insulating layer is formed to be in direct contact therewith. Further, the second electrode (the pixel electrode) is formed thereover (see Reference 1: Japanese Published Patent Application No. 2000-89255).

SUMMARY OF THE INVENTION

In the aforementioned conventional technique, electrodes which drive liquid crystals are provided with one insulating film interposed therebetween. Therefore, even when a distance between the electrodes is made to be increased, there has been limitation. If the thickness of the insulating film interposed between electrodes is increased, for example, since a gate insulating film in a transistor is thickened there is an adverse effect such that current drive capability of the transistor is decreased.

Further, optimal values for an arrangement interval and width of an opening pattern of a pixel electrode change depending on a distance between the pixel electrode and a common electrode. Thus, when the distance between the pixel electrode and the common electrode cannot be freely set, the arrangement interval and width of the opening pattern of the pixel electrode have to be extremely limited values. Therefore, the size and a direction of an electric field applied to liquid crystal molecules are inadequate.

In view of the foregoing problems, it is an object of the invention to provide a display device which can improve degree of freedom of an interval between two electrodes of a display element and can apply an optimal electric field between the electrodes, and a manufacturing method thereof.

In order to solve the aforementioned problems, a semiconductor device in accordance with the invention includes a first electrode formed over a substrate, a first insulating film formed over the first electrode, a semiconductor film formed over the first insulating film, a second insulating film formed over the semiconductor film, a conductive film formed over the second insulating film, a third insulating film formed over the conductive film, and a second electrode formed over the third insulating film and having an opening pattern.

A liquid crystal display device in accordance with the invention includes a first electrode formed over a substrate, a first insulating film formed over the first electrode, a semiconductor film formed over the first insulating film, a second insulating film formed over the semiconductor film, a conductive film formed over the second insulating film, a third insulating film formed over the conductive film, a second electrode formed over the third insulating film and having an opening pattern, and liquid crystals provided over the second electrode.

In accordance with each of the semiconductor device and the liquid crystal display device, the first electrode is formed over the substrate, that is, below the semiconductor film. In addition, since the second electrode is provided over the conductive film (e.g., a gate electrode or a source electrode of a transistor) and the third insulating film, an interval between the first electrode and the second electrode can be increased compared with a conventional device. Further, even when thickness of the first insulating film is changed, it does not affect another element such as a transistor very much. Therefore, the thickness thereof can be optionally changed, so that the interval between the first electrode and the second electrode can be freely set. Accordingly, degree of freedom of the interval between the first electrode and the second electrode is improved. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a viewing angle is widened by applying an optimal electric field.

Note that the opening pattern is provided for generating an electric field almost parallel to the substrate between the first electrode and the second electrode. Therefore, the opening pattern can be various shapes as log as it can generate the electric field which is almost parallel to the substrate.

Therefore, the opening pattern includes not only a closed opening pattern such as a slit but also includes a space which is located between conductor patterns and in which the conductor patterns are not formed such as a space between comb-shaped portions in a comb-shaped electrode, for example. That is, the opening pattern may be any pattern as long as a gap or an interval is provided between electrodes. The same can be said hereinafter.

A semiconductor device in accordance with the invention includes a first electrode formed over a substrate, a first insulating film formed over the first electrode, a semiconductor film formed over the first insulating film, a conductive film formed over the semiconductor film, a second insulating film formed over the conductive film, and a second electrode formed over the second insulating film and having an opening pattern.

In accordance with each of the semiconductor device and the liquid crystal display device, the first electrode is formed over the substrate, that is, below the semiconductor film. In addition, since the second electrode is provided over the conductive film (e.g., a source electrode) and the insulating films, an interval between the first electrode and the second electrode can be increased compared with a conventional device. Further, even when thickness of the first insulating film is changed, it does not affect another element such as a transistor very much. Therefore, the thickness thereof can be optionally changed, so that the interval between the first electrode and the second electrode can be freely set. Accordingly, degree of freedom of the interval between the first electrode and the second electrode is improved. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a viewing angle is widened by applying an optimal electric field.

A semiconductor device in accordance with the invention includes a first electrode formed over a substrate, a first insulating film formed over the first electrode, a conductive film formed over the first insulating film, a semiconductor film formed over the conductive film, a second insulating film formed over the semiconductor film, and a second electrode formed over the second insulating film and having an opening pattern.

In accordance with each of the semiconductor device and the liquid crystal display device, the first electrode is formed over the substrate, that is, below the semiconductor film and the conductive film (e.g., a gate electrode). In addition, since the second electrode is provided over the second insulating film, an interval between the first electrode and the second electrode can be increased compared with a conventional device. Further, even when thickness of the second insulating film is changed, it does not affect another element such as a transistor very much. Therefore, the thickness thereof can be optionally changed, so that the interval between the first electrode and the second electrode can be freely set. Accordingly, degree of freedom of the interval between the first electrode and the second electrode is improved. Then, a gradient of an electric field applied between the electrodes can be controlled, so that, for example, of an electric field parallel to the substrate can be easily increased. That is, since liquid crystal molecules which are aligned in parallel to the substrate (so-called homogeneous alignment) can be controlled in a direction parallel to the substrate in a display device using liquid crystals, a viewing angle is widened by applying an optimal electric field.

In a semiconductor device in accordance with the invention, the first electrode is a common electrode and the second electrode is a pixel electrode in the aforementioned structure.

In a semiconductor device in accordance with the invention, the first electrode is a pixel electrode and the second electrode is a common electrode in the aforementioned structure.

A liquid crystal display device in accordance with the invention includes a first electrode formed over a substrate, a first insulating film formed over the first electrode, a semiconductor film formed over the first insulating film, a conductive film formed over the semiconductor film, a second insulating film formed over the conductive film, a second electrode formed over the second insulating film and having an opening pattern, and liquid crystals provided over the second electrode.

A liquid crystal display device in accordance with the invention includes a first electrode formed over a substrate, a first insulating film formed over the first electrode, a conductive film formed over the first insulating film, a semiconductor film formed over the conductive film, a second insulating film formed over the semiconductor film, a second electrode formed over the second insulating film and having an opening pattern, and liquid crystals provided over the second electrode.

In a liquid crystal display device in accordance with the invention, the liquid crystals are controlled by an electric field between the first electrode and the second electrode in the aforementioned structure.

In a liquid crystal display device in accordance with the invention, the first electrode is a common electrode and the second electrode is a pixel electrode in the aforementioned structure.

In a liquid crystal display device in accordance with the invention, the first electrode is a pixel electrode and the second electrode is a common electrode in the aforementioned structure.

Note that various types of switches can be used as a switch shown in the invention, and an electrical switch, a mechanical switch, or the like is given as an example. That is, any element can be used as long as it can control a current flow, without limiting to a certain element. For example, it may be a transistor, a diode (e.g., a PN diode, a PIN diode, a Schottky diode, or a diode-connected transistor), or a logic circuit combining such elements. In the case of using a transistor as a switch, the polarity (a conductivity type) of the transistor is not particularly limited to a certain type because it operates just as a switch. However, a transistor of polarity with smaller off-current is preferably used when small off-current is preferable. A transistor provided with an LDD region, a transistor with a multi-gate structure, or the like is given as an example of a transistor with smaller off-current. In addition, it is preferable that an N-channel transistor be used when a potential of a source electrode of the transistor operating as a switch is closer to a low-potential-side power supply (e.g., Vss, GND, or 0 V), while a P-channel transistor be used when the potential of the source electrode is closer to a high-potential-side power supply (e.g., Vdd). This is because the absolute value of a gate-source voltage of the transistor can be increased, so that the transistor can easily operate as a switch. Note that a CMOS switch may also be employed by using both N-channel and P-channel transistors. By employing the CMOS switch, the switch can be operated appropriately even when a voltage output through the switch (i.e., an input voltage) is changed such that it becomes higher or lower than an output voltage. Note that although a TFT which controls a pixel electrode, a switching element used for a driver circuit portion, or the like can be given as the switch in the invention, the switch can also be used at another portion as long as it is a portion which is necessary to control a current flow.

Note that in the invention, description "being connected" includes the case where elements are electrically connected and the case where elements are directly connected. Accordingly, in structures disclosed in the invention, another element which enables an electrical connection (e.g., a switch, a transistor, a capacitor, an inductor, a resistor, or a diode) may be interposed between elements having a predetermined connection relation. Alternatively, the elements may be provided without interposing another element therebetween. Note that the case where two conductive films are not electrically connected without interposing another element which enables an electrical connection therebetween is described as "being directly connected". Note also that description "being electrically connected" includes the case where elements are electrically connected and the case where elements are directly connected.

Note that a display element, a display device, and a light-emitting device of the invention can employ various types and include various elements. In the invention, a liquid crystal element can be used. A liquid crystal element is an element which controls transmission or nontransmission of light by an optical modulation action of liquid crystals and includes a pair of electrodes and liquid crystals. Display devices using liquid crystals element include a liquid crystal display, a transmissive liquid crystal display, a semi-transmissive liquid crystal display, a reflective liquid crystal display, and the like. In addition, for example, a display medium, the contrast of which changes by an electromagnetic action, such as an EL element (an EL element means an element including a light-emitting layer which can obtain luminescence generated by applying an electric field. Further, an EL element includes an organic EL element, an inorganic EL element, or an EL element containing both organic and inorganic materials), an electron-emissive element, electronic ink, a grating light valve (GLV), a plasma display panel (PDP), a digital micromirror device (DMD), a piezoelectric ceramic display, or a carbon nanotube can be included. Note that display devices using an EL element include an EL display; display devices using an electron-emissive element include a field emission display (FED), an SED-type flat panel display (SED: Surface-conduction Electron-emitter Display), and the like; and display devices using electronic ink include electronic paper.

Note that in the invention, various types of transistors can be applied to a transistor without limiting to a certain type. Accordingly, a thin film transistor (TFT) using a non-single crystalline semiconductor film typified by amorphous silicon or polycrystalline silicon, a transistor formed by using a semiconductor substrate or an SOI substrate, a MOS transistor, a junction transistor, a bipolar transistor, a transistor using a compound semiconductor such as ZnO or a-InGaZnO, a transistor using an organic semiconductor or a carbon nanotube, or other transistors can be applied. In addition, various types of substrates can be used as a substrate over which a transistor is formed without limiting to a certain type. Therefore, for example, the transistor can be formed over a glass substrate, a plastic substrate, a paper substrate, a cellophane substrate, a stone substrate, or the like. Further, in the case of manufacturing a reflective display, a single crystalline substrate or an SOI substrate can also be used. Moreover, a transistor may be formed over one substrate, and then, the transistor may be transferred to another substrate.

Note that as described above, various types of transistors can be used for the transistor in the invention and the transistor can be formed over various types of substrates. Accordingly, all circuits may be formed over a glass substrate or a plastic substrate. In the case of manufacturing a reflective display, the transistor may be formed over a single crystalline substrate or an SOI substrate. That is, the transistor may be formed over any substrate. By forming all of the circuits over the same substrate, the number of component parts can be reduced to cut cost, or the number of connections to the circuit components can be reduced to improve reliability. Alternatively, a part of the circuits may be formed over one substrate and another part of the circuits may be formed over another substrate. That is, not all of the circuits are required to be formed over the same substrate. For example, a part of the circuits may be formed with transistors over a glass substrate and another part of the circuits may be formed over a single crystalline substrate, so that an IC chip thereof may be connected to the glass substrate by COG (Chip On Glass). Alternatively, the IC chip may be connected to the glass substrate by TAB (Tape Automated Bonding) or a printed wiring board. By forming a part of the circuits over the same substrate in this manner, the number of component parts can be reduced to cut cost, or the number of connections to the circuit components can be reduced to improve reliability. In addition, by forming a portion with a high driving voltage or a portion with high driving frequency, which consumes large power, over another substrate, increase in power consumption can be prevented.

A structure of a transistor can be various modes without limiting to a certain structure. For example, a multi-gate structure having two or more gate electrodes may be used. By using the multi-gate structure, off-current can be reduced; the withstand voltage of the transistor can be increased to improve reliability; or a drain-source current does not fluctuate very much even when a drain-source voltage fluctuates in a saturation region so that flat characteristics can be obtained. In addition, a structure where gate electrodes are formed over and below a channel may be used. By using the structure where gate electrodes are formed over and below the channel, a channel region is enlarged to increase a current flowing therethrough, or a depletion layer can be easily formed to decrease the S value. Further, a structure where a gate electrode is formed over a channel, a structure where a gate electrode is formed below a channel, a staggered structure, or an inversely staggered structure may be used. Further, a channel region may be divided into a plurality of regions and the divided regions may be connected in parallel or in series. A source electrode or a drain electrode may overlap with a channel (or a part of it). By using the structure where the source electrode or the drain electrode may overlap with the channel (or a part of it), a problem in that an electric charge is accumulated in a part of the channel so that an operation becomes unstable can be prevented. Moreover, an LDD region may be provided. By providing the LDD region, off-current can be reduced and the withstand voltage of the transistor can be increased to improve reliability, or a drain-source current does not fluctuate very much even when a drain-source voltage fluctuates in a saturation region so that flat characteristics can be obtained.

Note also that one pixel corresponds to one element which can control brightness in the invention. Therefore, for example, one pixel corresponds to one color element and brightness is expressed with the one color element. Accordingly, in the case of a color display device having color elements of R (Red), G (Green), and B (Blue), a minimum unit of an image is formed of three pixels of an R pixel, a G pixel, and a B pixel. Note that the color elements are not limited to three colors, and color elements with more than three colors may be employed. RGBW (W means white), or RGB plus yellow, cyan, and/or magenta is given as an example. Alternatively, as another example, in the case of controlling brightness of one color element by using a plurality of regions, one region corresponds to one pixel. Therefore, for example, in the case of performing area gray scale display, a plurality of regions which controls brightness are provided in each color element and gray scales are expressed with the whole regions. In this case, one region which controls brightness corresponds to one pixel. Thus, in that case, one color element includes a plurality of pixels. Further, in that case, regions which contribute to display may be different depending on each pixel. Moreover, in a plurality of regions which control brightness in each color element, that is, in a plurality of pixels which form one color element, a viewing angle may be increased by slightly varying signals supplied to the plurality of the pixels. Note that description "one pixel (for three colors)" corresponds to the case where three pixels of R, G, and B are considered as one pixel. Meanwhile, description "one pixel (for one color)" corresponds to the case where a plurality of pixels are provided for each color element and collectively considered as one pixel.

Note also that in the invention, pixels may be provided (arranged) in matrix. Here, description that pixels are provided (arranged) in matrix includes the case where the pixels are provided in stripes in a so-called grid pattern combining vertical stripes and lateral stripes. In addition, in the case of performing full color display with three color elements (e.g., RGB), dots of the three color elements may be provided in a so-called delta pattern. Further, dots of the three color elements may also be provided in Bayer arrangement. Note that the color elements are not limited to three colors, and color elements with more than three colors may be employed. RGBW (W means white), or RGB plus yellow, cyan, and/or magenta is given as an example. Moreover, the sizes of light-emitting regions may be different per color element.

A transistor is an element including at least three terminals of a gate, a drain, and a source, and includes a channel region between a drain region and a source region. Here, since the source and the drain of the transistor change depending on the structure, the operating condition, or the like of the transistor, it is difficult to define which is a source or a drain. Therefore, in the invention, one of regions functioning as a source and a drain is described as a first terminal and the other region is described as a second terminal.

A gate means all of or a part of a gate electrode and a gate wiring (also called a gate line, a gate signal line, or the like). A gate electrode means a conductive film which overlaps with a semiconductor forming a channel region, an LDD (Lightly Doped Drain) region, or the like with a gate insulating film interposed therebetween. A gate wiring means a wiring for connecting gate electrodes of respective pixels or for connecting a gate electrode to another wiring.

However, there is also a portion functioning as both a gate electrode and a gate wiring. Such a region may be called either a gate electrode or a gate wiring. That is, there is a region in which a gate electrode and a gate wiring cannot be clearly distinguished from each other. For example, in the case where a channel region is formed overlapping with an extended gate wiring, the overlapping region functions as both a gate wiring and a gate electrode. Accordingly, such a region may be called either a gate electrode or a gate wiring.

In addition, for example, a region formed of the same material as a gate electrode and electrically connected to the gate electrode may also be called a gate electrode. Similarly, a region formed of the same material as a gate wiring and electrically connected to the gate wiring may also be called a gate wiring. In a strict sense, such a region does not overlap with a channel region, or does not have a function of connecting to another gate electrode in some cases. However, there is a region formed of the same material as a gate electrode or a gate wiring and electrically connected to the gate electrode or the gate wiring, for reduction of manufacturing cost or steps, simplification of layout, or the like. Accordingly, such a region may also be called either a gate electrode or a gate wiring.

In a multi-gate transistor, for example, a gate electrode of one transistor is often connected to a gate electrode of another transistor by using a conductive film which is formed of the same material as the gate electrode. Since such a region is a region for connecting a gate electrode to another gate electrode, it may be called a gate wiring, while it may also be called a gate electrode because a multi-gate transistor can be considered as one transistor. That is, a region which is formed of the same material as a gate electrode or a gate wiring and electrically connected thereto may be called either a gate electrode or a gate wiring. In addition, for example, a conductive film which connects a gate electrode and a gate wiring may also be called either a gate electrode or a gate wiring.

Note that a gate terminal means a part of a region of a gate electrode or a region which is electrically connected to a gate electrode.

Note also that a source means all of or a part of a source region, a source electrode, and a source wiring (also called a source line, a source signal line, or the like). A source region means a semiconductor region containing a large amount of p-type impurities (e.g., boron or gallium) or n-type impurities (e.g., phosphorus or arsenic). Accordingly, a region containing a slight amount of p-type impurities or n-type impurities, namely, an LDD (Lightly Doped Drain) region is not included in a source region. A source electrode is a conductive layer formed of a different material from a source region, and electrically connected to the source region. However, a source electrode and a source region are collectively called a source electrode in some cases. A source wiring is a wiring for connecting source electrodes of pixels or for connecting a source electrode to another wiring.

However, there is also a portion functioning as both a source electrode and a source wiring. Such a region may be called either a source electrode or a source wiring. That is, there is a region in which a source electrode and a source wiring cannot be clearly distinguished from each other. For example, in the case where a source region overlaps with an extended source wiring, the overlapping region functions as both a source wiring and a source electrode. Accordingly, such a region may be called either a source electrode or a source wiring.

In addition, a region formed of the same material as a source electrode and electrically connected to the source electrode, or a portion for connecting a source electrode to another source electrode may also be called a source electrode. A portion which overlaps with a source region may also be called a source electrode. Similarly, a region formed of the same material as a source wiring and electrically connected to the source wiring may also be called a source wiring. In a strict sense, such a region does not have a function of connecting to another source electrode in some cases. However, there is a region formed of the same material as a source electrode or a source wiring and electrically connected to the source electrode or the source wiring, for reduction of manufacturing cost or steps, simplification of layout, or the like. Accordingly, such a region may also be called either a source electrode or a source wiring.

In addition, for example, a conductive film which connects a source electrode and a source wiring may also be called either a source electrode or a source wiring.

Note that a source terminal means a part of a region of a source electrode or a region which is electrically connected to a source electrode.

Note also that a drain means all of a drain region, a drain electrode, and a drain wiring. Words used for a drain in this specification are similar to those used for a source. Words used for a drain terminal are also similar to those used for a source terminal.

Note also that in the invention, a semiconductor device means a device having a circuit including a semiconductor element (e.g., a transistor or a diode). The semiconductor device may also include all devices that can function by utilizing semiconductor characteristics. In addition, a display device means a device having a display element (e.g., a liquid crystal element or a light-emitting element). Note that the display device may include a display panel itself where a plurality of pixels including display elements such as liquid crystal elements or EL elements are formed over the same substrate as a peripheral driver circuit for driving the pixels. The display device may also include a flexible printed circuit (FPC) or a printed wiring board (PWB) attached to the display panel. Further, a light-emitting device means a display device having a self-luminous display element, particularly, such as an EL element or an element used for an FED. A liquid crystal display device means a display device having a liquid crystal element.

In the invention, description that an object is "formed on" or "formed over" another object does not necessarily mean that the object is in direct contact with another object. The description includes the case where the two objects are not in direct contact with each other, that is, the case where another object is sandwiched therebetween. Accordingly, for example, when it is described that a layer B is formed on (or over) a layer A, it includes both of the case where the layer B is formed in direct contact with the layer A, and the case where another layer (e.g., a layer C or a layer D) is formed in direct contact with the layer A and the layer B is formed in direct contact with the layer C or D. Similarly, when it is described that an object is formed above another object, it does not necessarily mean that the object is in direct contact with another object, and another object may be sandwiched therebetween. Accordingly, for example, when it is described that a layer B is formed above a layer A, it includes both of the case where the layer B is formed in direct contact with the layer A, and the case where another layer (e.g., a layer C or a layer D) is formed in direct contact with the layer A and the layer B is formed in direct contact with the layer C or D. Similarly, when it is described that an object is formed below or under another object, it includes both of the case where the objects are in direct contact with each other, and the case where the objects are not in contact with each other. Note that here when it is described that an object is formed above or over another object, a substrate over which an electrode is formed is used as a base and a side over which the electrode is formed corresponds to a direction described as "above" or "over".

By employing the invention, an interval between the first electrode and the second electrode can be increased and controlled without affecting another element, so that degree of freedom of the interval therebetween is improved. Accordingly, since optimal values for an arrangement interval and width of an opening pattern of a pixel electrode change depending on a distance between the pixel electrode and a common electrode, the size, the width, and the interval of the opening pattern can also be freely set. Then, a gradient of an electric field applied between the electrodes can be controlled, so that, for example, an electric field parallel to a substrate can be easily increased. In particular, since liquid crystal molecules which are aligned in parallel to the substrate (so-called homogeneous alignment) can be controlled in a direction parallel to the substrate in a display device using liquid crystals, a viewing angle is widened by applying an optimal electric field.

DETAILED DESCRIPTION OF THE INVENTION

Hereinafter, the invention is described by way of embodiment modes with reference to the drawings. However, the invention can be implemented by various different ways and it will be understood that various changes and modifications will be apparent to those skilled in the art. Unless such changes and modifications depart from the spirit and the scope of the invention, they should be construed as being included therein. Therefore, the invention should not be construed as being limited to the description of embodiment modes.

Embodiment Mode 1

Figure 37:
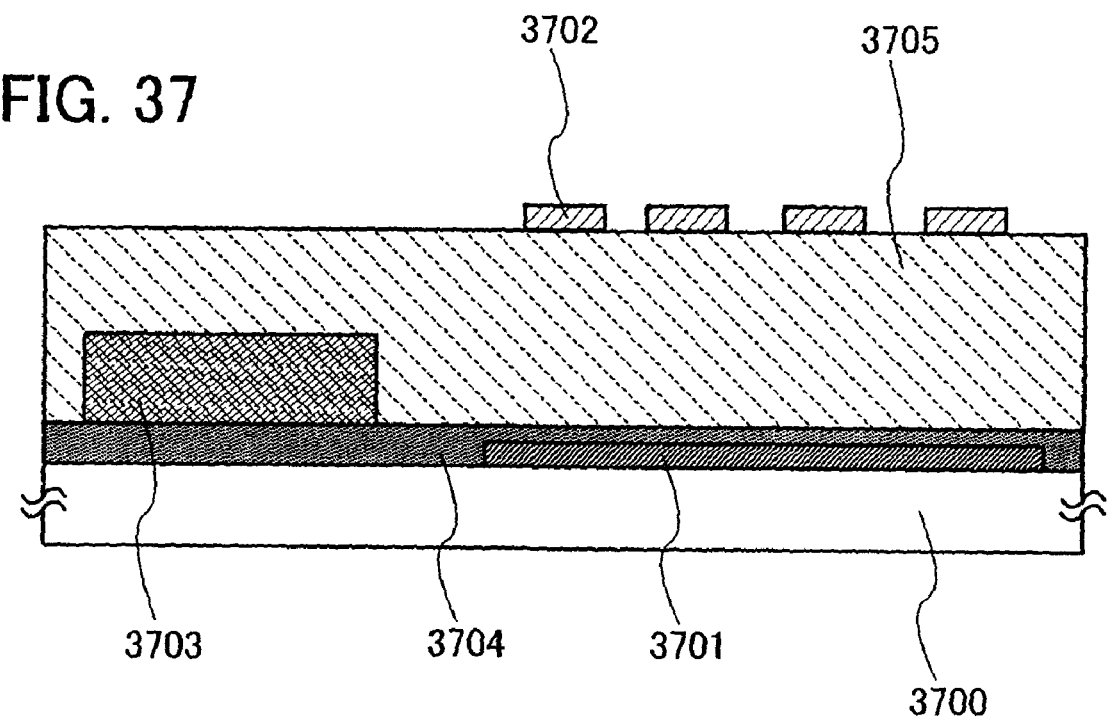
FIG. 37 is a cross-sectional view in accordance with Embodiment Mode 1, showing a basic structure of the invention.

FIG. 37 is a cross-sectional view showing a basic structure of the invention. A first electrode 3701 is formed over a substrate 3700. The substrate 3700 is a glass substrate, a quartz substrate, a substrate formed of an insulator such as alumina, a plastic substrate having heat resistance which can resist processing temperature of a post-process, a silicon substrate, or a metal substrate. In the case of operating as a transmissive display device, it is preferable that the substrate 3700 have a light-transmitting property.

The first electrode 3701 is formed by using a conductive film which transmits visible light (e.g., ITO: Indium Tin Oxide).

An insulating film 3704 is formed over the substrate 3700 and the first electrode 3701. The insulating film 3704 is formed of an insulating substance having oxygen or nitrogen such as silicon oxide ($SiO_x$), silicon nitride ($SiN_x$), silicon oxynitride ($SiO_xN_y$: x>y), or silicon nitride oxide ($SiN_xO_y$: x>y), and may be a single-layer structure of any of these films or may be a stacked-layer structure of a plurality of these films. By providing the insulating film 3704, diffusion of an impurity from the substrate 3700 to an upper layer of the insulating film 3704 can be prevented.

Note that a gate electrode, a gate wiring, a gate insulating film, or the like may be further provided between the substrate 3700 and the insulating film 3704. Out of these, for example, the gate electrode and/or the gate wiring may be formed in the same step as the first electrode 3701.

A thin film transistor 3703 is formed over the insulating film 3704. The thin film transistor 3703 may be either a top-gate thin film transistor or a bottom-gate thin film transistor. The thin film transistor 3703 is provided around the first electrode 3701 and a second electrode 3702.

An interlayer insulating film 3705 is formed over the thin film transistor 3703 and the insulating film 3704. The interlayer insulating film 3705 may be a single-layer or a multi-layer structure.

An inorganic material or an organic material can be used as a material which forms the interlayer insulating film 3705. As an organic material, polyimide, acryl, polyamide, polyimide amide, resist, siloxane, polysilazane, or the like can be used. As an inorganic material, an insulating substance having oxygen or nitrogen such as silicon oxide ($SiO_x$), silicon nitride ($SiN_x$), silicon oxynitride ($SiO_xN_y$: x>y), or silicon nitride oxide ($SiN_xO_y$: x>y) can be used. In addition, a stacked-layer film of a plurality of these films may be used. Further, a stacked-layer film may also be used by combining an organic material and an inorganic material.

In the case of using an inorganic material for the interlayer insulating film 3705, penetration of moisture or an impurity can be prevented. In particular, a function of blocking moisture or an impurity is high when a layer including nitrogen is used. Alternatively, in the case of using an organic material for the interlayer insulating film 3705, a surface thereof can be flattened. Therefore, an advantageous effect can be produced on a layer formed thereover. For example, since a layer formed over the organic material can also be flattened, random orientation of liquid crystals can be prevented, disconnection of a wiring can be prevented, and resist can be formed precisely.

The second electrode 3702 is formed over the interlayer insulating film 3705. It is preferable that a material having a high light-transmitting property be used for the second electrode 3702. For example, it is preferable to use one element or a plurality of elements selected from a group of indium (In), tin (Sn), and oxygen (O), or a compound and an alloy material including one element or a plurality of elements selected from the group as a component (e.g., Indium Tin Oxide (ITO), Indium Zinc Oxide (IZO), or Indium Tin Oxide to which silicon oxide is added (ITSO)). IZO is particularly preferable because it can be easily processed and can be formed minutely with a precise shape. However, the invention is not limited to this.

One of the first electrode 3701 and the second electrode 3702 functions as an electrode to which a signal which is different depending on a pixel is supplied in accordance with a video signal, that is, a so-called pixel electrode, and is electrically connected to a source or a drain of the thin film transistor 3703. In addition the other of the first electrode 3701 and the second electrode 3702 functions as a common electrode.

An opening pattern (a slit) is formed in the second electrode 3702. This opening pattern is provided for generating an electric field which is almost parallel to the substrate between the first electrode 3701 and the second electrode 3702. The opening pattern can be various shapes as log as it can generate an electric field having a part which is almost parallel to the substrate. Here, description "almost parallel" corresponds to the case where two objects are in parallel to each other with a little deviation. Accordingly, two objects may be deviated from a parallel direction as long as it does not affect display. For example, the description "almost parallel" includes the case of having a deviation of ±10 degrees, and more preferably, the case of having a deviation of around ±5 degrees.

Therefore, the opening pattern includes not only a closed opening pattern such as a slit but also includes a space which is located between conductor patterns and in which the conductor patterns are not formed such as a space between comb-shaped portions in a comb-shaped electrode, for example. That is, the opening pattern may be any pattern as long as a gap or an interval is provided between electrodes.

By generating an electric field between the second electrode 3702 and the first electrode 3701 in this manner, an orientation state of liquid crystal molecules can be controlled.

As described above, the insulating film 3704 is located between the first electrode 3701 and the thin film transistor 3703 in this embodiment mode. Thus, by controlling thickness of the insulating film 3704, degree of freedom of an interval between the first electrode 3701 and the second electrode 3702 is improved. Accordingly, since optimal values for an arrangement interval and width of the opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a viewing angle is widened by applying an optimal electric field.

In addition, an operation or the like of the transistor is not affected even when thickness of the insulating film 3704 is changed, so that the thickness thereof can be freely controlled. Therefore, the interval between the first electrode 3701 and the second electrode 3702 can be freely increased.

Note that although only second electrode 3702 has the opening pattern in FIG. 37, the first electrode 3701 may also have an opening pattern. Thus, the electric field almost parallel to the substrate is generated, so that the liquid crystal molecules can be controlled.

Further, unless transmittance is 100%, the amount of light transmission decreases when the first electrode 3701 is provided. However, when an opening pattern is provided in the first electrode 3701, light does not attenuate in a portion of the opening pattern, and thus, the amount of light transmission increases as a whole. Accordingly, luminance can be improved and power consumption can be reduced.

Embodiment Mode 2

Figure 1A:
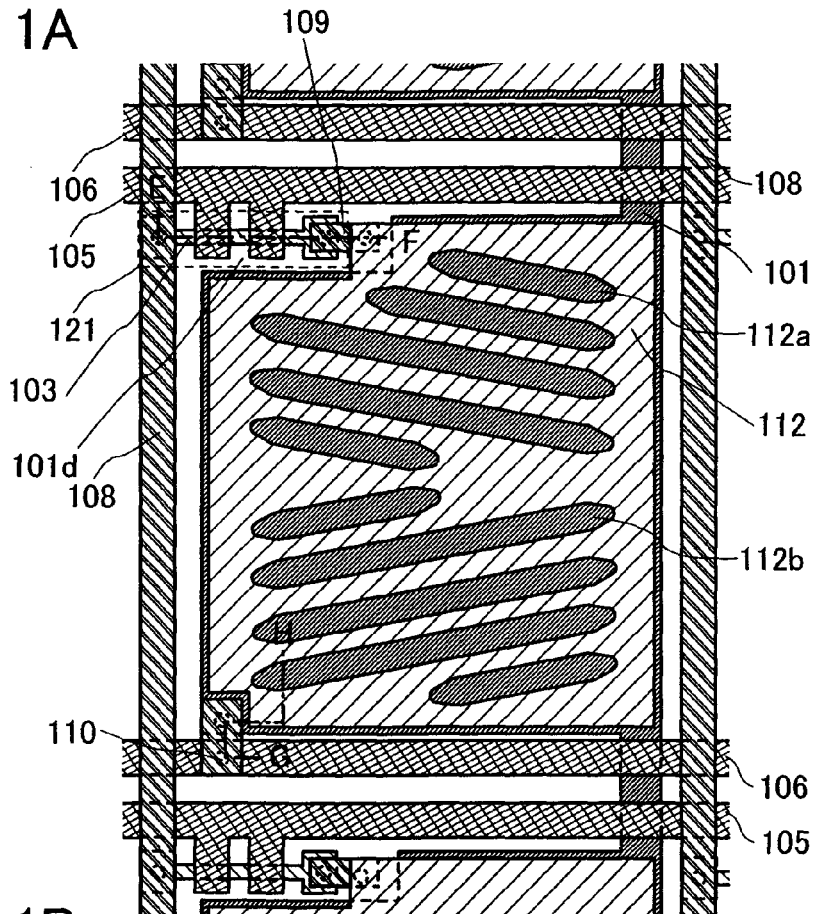
FIG. 1A is a plan view showing a structure of an FFS-mode liquid crystal display device in accordance with Embodiment Mode 2.

FIG. 1A is a plan view showing a structure of a liquid crystal display device in accordance with Embodiment Mode 2 of the invention. A pixel for one pixel is shown. This liquid crystal display device is a device which controls an alignment direction of liquid crystals by an FFS-mode. In FIG. 1A, a plurality of source wirings 108 are provided in parallel with each other (extended in a longitudinal direction in the drawing) and separated from each other. A plurality of gate wirings 105 are provided so as to be extended in a direction which is almost perpendicular to the source wirings 108 (in a horizontal direction in the drawing) and separated from each other. Auxiliary wirings 106 are provided in positions adjacent to each of the plurality of gate wirings 105, and extended in a direction which is almost parallel to the gate wirings 105, that is, in a direction which is almost perpendicular to the source wirings 108 (in the horizontal direction in the drawing). Almost rectangular space is surrounded by the source wirings 108, the auxiliary wirings 106, and the gate wirings 105, and a pixel electrode of the liquid crystal display device is provided in this space. A thin film transistor 121 for driving the pixel electrode is provided on an upper left corner in the drawing. A plurality of pixel electrodes and thin film transistors are provided in matrix.

Note that each of the gate wiring 105, the auxiliary wiring 106, and the source wiring 108 is formed to have one element or a plurality of elements selected from a group of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), tin (Sn), and oxygen (O), a compound or an alloy material including one or a plurality of the elements selected from the group as a component (e.g., Indium Tin Oxide (ITO), Indium Zinc Oxide (IZO), Indium Tin Oxide to which silicon oxide is added (ITSO), zinc oxide (ZnO), aluminum neodymium (Al—Nd), or magnesium silver (Mg—Ag)), a substance in which these compounds are combined, or the like. Alternatively, each of the gate wiring 105, the auxiliary wiring 106, and the source wiring 108 is formed to have a compound of silicon and the above-described material (silicide) (e.g., aluminum silicon, molybdenum silicon, or nickel silicide) or a compound of nitrogen and the above-described material (e.g., titanium nitride, tantalum nitride, or molybdenum nitride). Note also that a large amount of n-type impurities (e.g., phosphorus) or p-type impurities (e.g., boron) may be included in silicon (Si). By including the impurities, conductivity is improved and behavior similar to a normal conductor is exhibited, so that each of the gate wiring 105, the auxiliary wiring 106, and the source wiring 108 can be easily utilized as a wiring or an electrode. Silicon may be single crystalline silicon, polycrystalline silicon (polysilicon), or amorphous silicon. By using single crystalline silicon or polycrystalline silicon, resistance can be reduced. By using amorphous silicon, it can be manufactured with a simple manufacturing process. Since aluminum or silver has high conductivity, signal delay can be reduced. In addition, aluminum or silver is easily etched and patterned, so that minute processing can be performed. Since copper has high conductivity, signal delay can be reduced. Molybdenum is preferable because it can be manufactured without generating a problem that a material causes a defect even when molybdenum is in contact with semiconductor oxide such as ITO or IZO or silicon, patterning and etching are easily performed, and heat resistance is high. Titanium is preferable because it can be manufactured without generating a problem that a material causes a defect even when titanium is in contact with semiconductor oxide such as ITO or IZO or silicon, and heat resistance is high. Tungsten is preferable because heat resistance is high. Neodymium is preferable because heat resistance is high. In particular, it is preferable to use an alloy of neodymium and aluminum because heat resistance is improved and a hillock is hardly generated in aluminum. Silicon is preferable because it can be formed at the same time as a semiconductor film included in a transistor and heat resistance is high. Indium Tin Oxide (ITO), Indium Zinc Oxide (IZO), Indium Tin Oxide to which silicon oxide is added (ITSO), zinc oxide (ZnO), and silicon (Si) are preferable because these materials have light-transmitting properties and can be used for a portion which transmits light. For example, these materials can be used for a pixel electrode or a common electrode.

Note that a wiring or an electrode may be formed of the above-described material with a single-layer structure or a multi-layer structure. By forming the wiring or the electrode with a single-layer structure, a manufacturing process can be simplified; the number of days for a process can be reduced; and cost can be reduced. Alternatively, by forming the wiring or the electrode with a multi-layer structure, an advantage of each material is taken and a disadvantage thereof is reduced so that a wiring or an electrode with high performance can be formed. For example, by including a material with low resistance (e.g., aluminum) in a multi-layer structure, resistance in the wiring can be reduced. In addition, by including a material with high heat resistance, for example, by employing a stacked-layer structure in which a material with low heat resistance and having a different advantage is sandwiched with materials with high heat resistance, heat resistance in the wiring or the electrode as a whole can be improved. For example, it is preferable that a stacked-layer structure be employed in which a layer including aluminum is sandwiched with layers including molybdenum or titanium. Further, when there is a portion which is in direct contact with a wiring, an electrode, or the like formed of another material, they may be adversely affected each other. For example, in some cases, one material enters the other material and changes property thereof, so that an original purpose cannot be achieved; there occurs a problem in manufacturing, so that normal manufacturing cannot be performed. In such a case, by sandwiching or covering a certain layer with different layers, the problem can be solved. For example, when Indium Tin Oxide (ITO) is to be in contact with aluminum, it is preferable to interpose titanium or molybdenum therebetween. Moreover, when silicon is to be in contact with aluminum, it is preferable to interpose titanium or molybdenum therebetween.

It is preferable that a material with heat resistance higher than that of a material used for the source wiring 108 be used for the gate wiring 105. This is because the gate wiring 105 is often disposed in a higher-temperature state in a manufacturing process.

It is preferable that a material with resistance lower than that of a material used for the gate wiring 105 be used for the source wiring 108. This is because although only a signal of a binary value of an H signal and an L signal is supplied to the gate wiring 105, an analog signal is supplied to the source wiring 108 to contribute to display. Therefore, it is preferable to use a material with low resistance for the source wiring 108 so as to supply an accurate signal.

Although the auxiliary wiring 106 is not necessarily provided, a potential of a common electrode in each pixel can be stabilized by providing the auxiliary wiring 106. Note that although the auxiliary wiring 106 is provided in almost parallel to a gate line in FIG. 1A, the invention is not limited to this. The auxiliary wiring 106 may be provided in almost parallel to the source wiring 108. At that time, the auxiliary wiring 106 is preferably formed of the same material as the source wiring 108.

Note that the auxiliary wiring 106 is preferably provided in almost parallel to the gate line because an aperture ratio can be increased and layout can be efficiently performed.

Figure 1B:
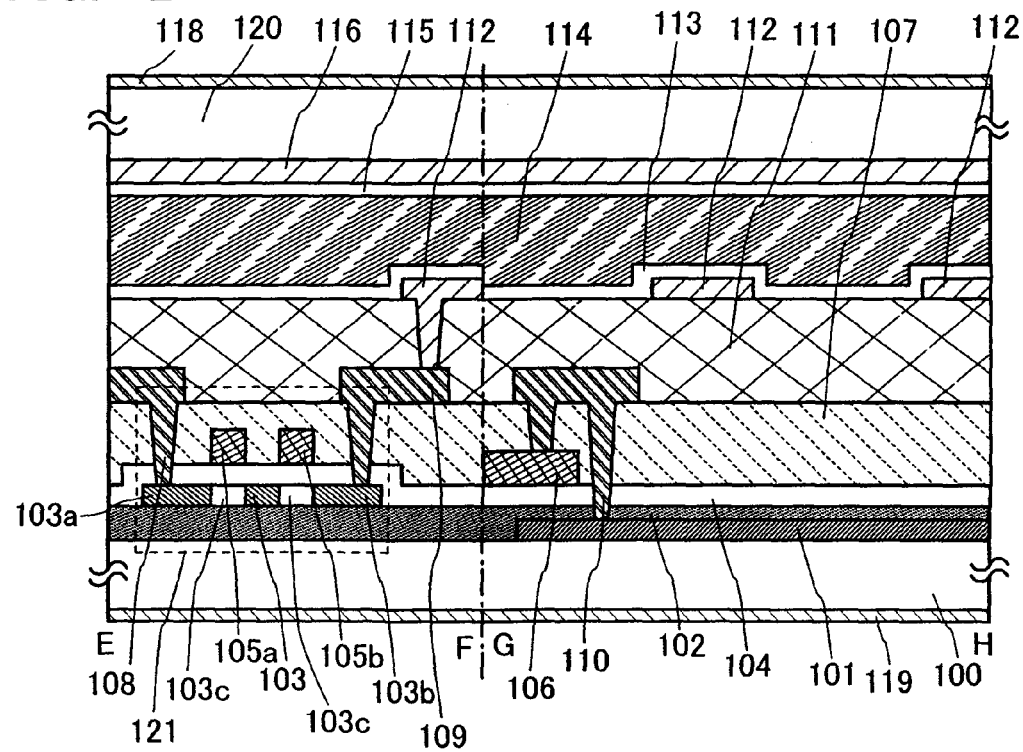
FIG. 1B is a cross-sectional view taken along a line E-F and a line G-H in FIG. 1A.

FIG. 1B is a cross-sectional view taken along a line E-F and a line G-H in FIG. 1A. As shown in FIG. 1B and FIG. 1A, a first electrode 101 which controls an alignment direction of liquid crystals is provided over a part of a substrate 100. Note that another layer may be provided between the substrate 100 and the first electrode 101.

The substrate 100 is a glass substrate, a quartz substrate, a substrate formed of an insulator such as alumina, a plastic substrate having heat resistance that can resist processing temperature of a post-process, a silicon substrate, or a metal substrate. Alternatively, the substrate 100 may be polysilicon.

In the case of operating as a transmissive display device, it is preferable that the substrate 100 have a light-transmitting property.

The first electrode 101 is formed of a conductive film having a light-transmitting property (e.g., an ITO (Indium Tin Oxide) film, an IZO (Indium Zinc Oxide) film, a ZnO film, a polysilicon film or an amorphous silicon film into which an impurity is introduced), and functions as a common electrode. As shown in FIG. 1A, the first electrode 101 is connected up and down. By connecting in this manner, resistance of the common electrode is reduced and a predetermined voltage can be easily applied to the first electrode 101.

An insulating film 102 is formed over the first electrode 101 and the substrate 100. The insulating film 102 is a film for preventing diffusion of an impurity from the substrate 100 and functions as a base film. The insulating film 102 is formed of an insulating substance having oxygen or nitrogen such as silicon oxide ($SiO_x$), silicon nitride ($SiN_x$), silicon oxynitride ($SiO_xN_y$: $x>y$), or silicon nitride oxide ($SiN_xO_y$: $x>y$). In addition, the insulating film 102 may be a stacked-layer film of a plurality of these films. Note that an insulating film having the same function as the insulating film 102 may be provided between the substrate 100 and the first electrode 101.

A semiconductor film 103 is formed over the insulating film 102. An impurity region 103a serving as a source of the thin film transistor 121 and an impurity region 103b serving as a drain thereof are formed in the semiconductor film 103. For example, the impurity regions 103a and 103b are n-type impurity regions. However, the impurity regions 103a and 103b may be p-type impurity regions. Phosphorus (P) and arsenic (As) are given as examples of impurities which impart n-type conductivity, and boron (B) and gallium (Ga) are given as examples of impurities which impart p-type conductivity.

As shown by a dotted line in FIG. 1A, the first electrode 101 has a shape of a rectangle lacking one corner (the upper left corner in the drawing) and is formed in almost the whole area of pixels. Note that the thin film transistor 121 is provided in a portion 101d of the lacked corner of the rectangle. By providing the thin film transistor 121 in this portion 101d of the lacked corner, a region which is effective for display in the pixels can be formed more efficiently. That is, this leads to improvement of the aperture ratio. Note that although the semiconductor film 103 is a polysilicon film, for example, it may be another semiconductor film (e.g., an amorphous silicon film, a single crystalline silicon film, an organic semiconductor film, or a carbon nanotube).

A gate insulating film 104 of the thin film transistor 121 is formed so as to cover the semiconductor film 103.

Note that the gate insulating film 104 is provided only around a channel region and is not provided in the other regions in some cases. In addition, thickness or a stacked-layer structure of the gate insulating film 104 may be different depending on a place. For example, the thickness is thick or the number of layers is many only around the channel region, and the thickness is thin or the number of layers is few in the other regions in some cases. By providing the gate insulating film 104 in this manner, addition of impurities to a source region and a drain region can be easily controlled. In addition, by changing the thickness or the number of layers of the gate insulating film 104 around the channel region, the amount of addition of an impurity to the semiconductor film is changed depending on a place, so that an LDD region can be formed. By forming the LDD region, leakage current can be reduced, and generation of a hot carrier can be suppressed to improve reliability.

The gate insulating film 104 is formed of an insulating substance having oxygen or nitrogen such as silicon oxide ($SiO_x$), silicon nitride ($SiN_x$), silicon oxynitride ($SiO_xN_y$: x>y), or silicon nitride oxide ($SiN_xO_y$: x>y). In addition, the gate insulating film 104 may be a stacked-layer film of a plurality of these films. Gate electrodes 105a and 105b located above the semiconductor film 103 are formed over the gate insulating film 104. As shown in FIG. 1B and FIG. 1A, each of the gate electrodes 105a and 105b is the same wiring layer as the auxiliary wiring 106 and the gate wiring 105 and electrically connected to the gate wiring 105. The semiconductor film 103 located below each of the gate electrodes 105a and 105b functions as channel region 103c. Impurities which are the same as those of the impurity regions 103a and 103b are also introduced into the semiconductor film 103 located between two channel regions 103c. Note that although a multi-gate structure having two gate electrodes is used in this embodiment mode, the invention is not limited to this structure.

A first interlayer insulating film 107 is formed over the gate insulating film 104 and the gate electrodes 105a and 105b. An inorganic material or an organic material can be used for the first interlayer insulating film 107. As an organic material, polyimide, acryl, polyamide, polyimide amide, resist, siloxane, polysilazane, or the like can be used. As an inorganic material, an insulating substance having oxygen or nitrogen such as silicon oxide ($SiO_x$), silicon nitride ($SiN_x$), silicon oxynitride ($SiO_xN_y$: x>y), or silicon nitride oxide ($SiN_xO_y$: x>y) can be used. In addition, a stacked-layer film of a plurality of these films may be used. Further, a stacked-layer film may be used by combining an organic material and an inorganic material. A contact hole located over the impurity region 103a, a contact hole located over the impurity region 103b, a contact hole located over the first electrode 101, and a contact hole located over the auxiliary wiring 106 are formed in the insulating film 102, the gate insulating film 104, and the first interlayer insulating film 107. The source wiring 108, a conductive film for connecting 109, and a conductive film for connecting 110 are formed over the first interlayer insulating film 107.

In the case of using an inorganic material as the insulating film, penetration of moisture or an impurity can be prevented. In particular, a function of blocking moisture or an impurity is high when a layer including nitrogen is used.

Note that in the case of using an organic material as the insulating film, a surface thereof can be flattened. Therefore, an advantageous effect can be produced on a layer formed thereover. For example, since a layer formed over the organic material can also be flattened, random orientation of liquid crystals can be prevented.

The source wiring 108 is located over the impurity region 103a, and is electrically connected to the impurity region 103a by being partially embedded in the contact hole. Accordingly, a source electrode serves as a part of the source wiring 108. The conductive film for connecting 109 is electrically connected to the impurity region 103b by being partially embedded in the contact hole. By providing the conductive film for connecting 109 in this manner, the contact hole can be precisely formed because it is not necessary to open the contact hole deeply.

Figure 2A:
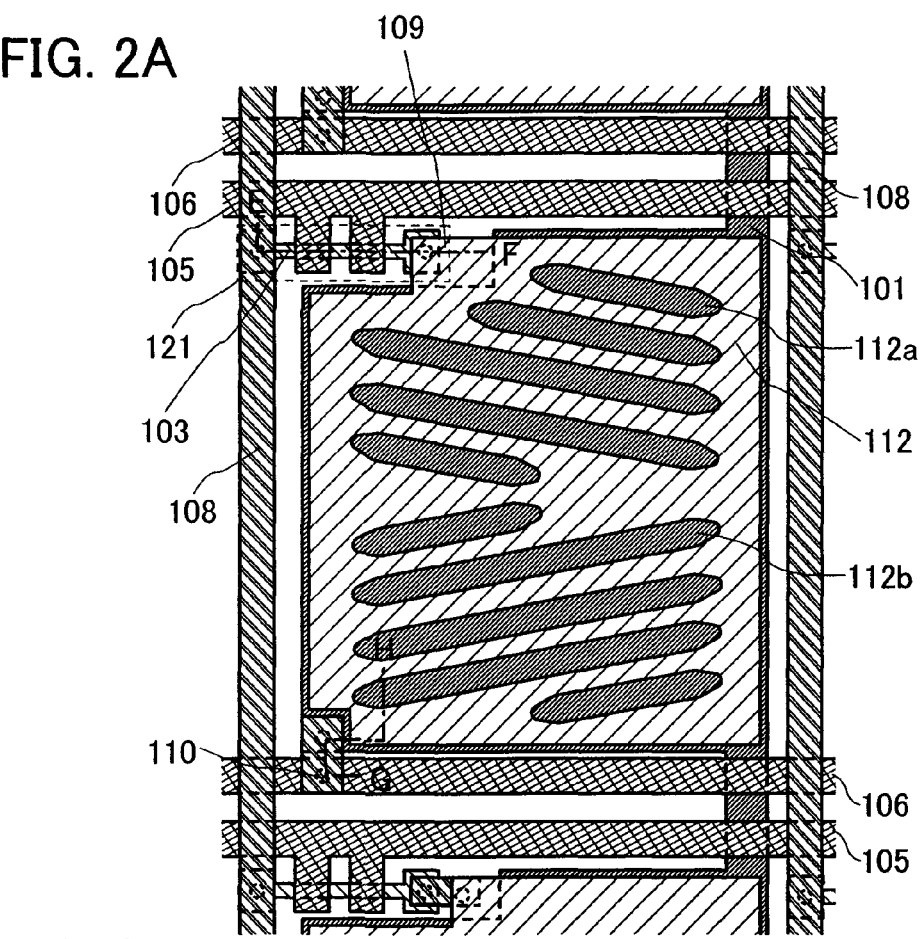
FIG. 2A is a plan view showing a structure of an FFS-mode liquid crystal display device in accordance with Embodiment Mode 2.
Figure 2B:
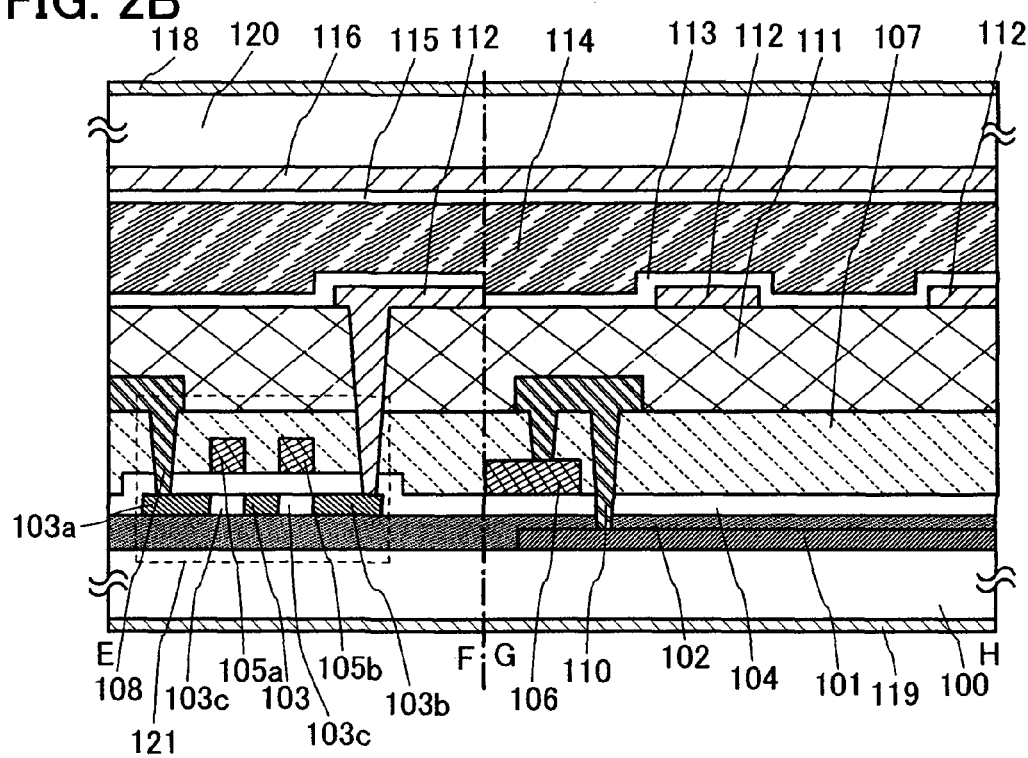
FIG. 2B is a cross-sectional view taken along a line E-F and a line G-H in FIG. 2A.

Note that as shown in FIG. 2B, a second electrode 112 and the impurity region 103b may be directly connected without interposing the conductive film for connecting 109 shown in FIG. 1B therebetween. In this case, although a contact hole for connecting the second electrode 112 and impurity region 103b is required to be opened deeply, the conductive film for connecting 109 is not required so that its region can be utilized as an opening region for displaying an image. Therefore, the aperture ratio is improved and power consumption can be reduced.

The conductive film for connecting 110 is located over the auxiliary wiring 106, and is electrically connected to each of the auxiliary wiring 106 and the first electrode 101 by being partially embedded in the contact hole. The first electrode 101 is electrically connected to the auxiliary wiring 106 through the conductive film for connecting 110 in this manner. Note that a plurality of conductive films for connecting 110 may be provided. Thus, a potential of the first electrode 101 is stabilized. The number of times to open the contact holes can be reduced by connecting the first electrode 101 and the auxiliary wiring 106 through the conductive film for connecting 110, so that process steps can be simplified.

Note that although the conductive film for connecting 110 is formed of the same material and at the same time as the source wiring 108, the invention is not limited to this. The conductive film for connecting 110 may be formed of the same material and at the same time as the second electrode 112.

A second interlayer insulating film 111 is formed over the source wiring 108, the conductive film for connecting 109, the conductive film for connecting 110, and the first interlayer insulating film 107. Note that a structure may be used in which the second interlayer insulating film 111 is not formed. An inorganic material or an organic material can be used for the second interlayer insulating film 111. As an organic material, polyimide, acryl, polyamide, polyimide amide, resist, siloxane, polysilazane, or the like can be used. As an inorganic material, an insulating substance having oxygen or nitrogen such as silicon oxide ($SiO_x$), silicon nitride ($SiN_x$), silicon oxynitride ($SiO_xN_y$: x>y), or silicon nitride oxide ($SiN_xO_y$: x>y) can be used. In addition, a stacked-layer film of a plurality of these films may be used. Further, a stacked-layer film may be used by combining an organic material and an inorganic material. A contact hole located over the conductive film for connecting 109 is formed in the second interlayer insulating film 111.

The second electrode 112 which controls an alignment direction of liquid crystals is provided over the second interlayer insulating film 111. The second electrode 112 functions as a pixel electrode to which an individual voltage depending on a pixel is supplied, and is formed of ITO (Indium Tin Oxide), ZnO (zinc oxide), IZO (Indium Zinc Oxide) which is formed by using a target in which indium oxide is mixed with ZnO at 2 to 20 wt %, or the like. The second electrode 112 is partially located over the conductive film for connecting 109, and is electrically connected to the conductive film for connecting 109 by being partially embedded in the contact hole. In this manner, the second electrode 112 is electrically connected to the impurity region 103b of the thin film transistor 121 with the conductive film for connecting 109 interposed therebetween.

Note that as shown in FIG. 2B, when the conductive film for connecting 109 is not provided, the second electrode 112 is directly connected to the impurity region 103b of the thin film transistor 121.

As shown in FIGS. 2A and 2B and FIG. 1A, the second electrode 112 is almost rectangular, is located over the first electrode 101, and has a plurality of opening patterns 112a and 112b. Opening patterns which are slit shapes and in parallel to each other are often included as examples of the opening patterns 112a and 112b. In the example shown in this embodiment mode, although directions of the opening patterns 112a and 112b are diagonal to the source wiring 108, a direction of the opening pattern 112a located in a upper half of the pixel in the drawing and a direction of the opening pattern 112b located in a lower half of the pixel in the drawing are different from each other. By forming the opening patterns 112a and 112b, an electric field having a component which is between the first electrode 101 and the second electrode 112 and in parallel to the substrate is generated above the second electrode 112. Therefore, an alignment direction of liquid crystals which are described later can be controlled by controlling a potential of the second electrode 112.

By providing opening patterns having different directions like the opening patterns 112a and 112b, a plurality of regions having different moving directions of liquid crystal molecules can also be provided. That is, a multi-domain structure can be formed. By employing a multi-domain structure, a display defect of an image can be prevented when the image is seen from a particular direction. Therefore, a viewing angle can be improved.

Note that the shape of the opening pattern is not limited to the shape of this embodiment mode. Shapes of opening patterns described after Embodiment Mode 3 can also be applied. That is, the opening pattern also includes a space in which a conductor pattern is not formed such as a space between comb-shaped portions in a comb-shaped electrode, for example.

Further, as shown in FIG. 1A, the first electrode 101 functioning as the common electrode protrudes outside the second electrode 112 functioning as the pixel electrode, when seen from a direction which is perpendicular to the substrate 100. Therefore, the problem is suppressed in which the second electrode 112 which is in a floating state after a signal is received is affected by a signal transmitted to another pixel through the source wiring 108. Accordingly, an image defect such as crosstalk can be reduced. Note that the invention is not limited to such an electrode structure, and a part of the common electrode may be provided inside the pixel electrode.

A first alignment film 113 and liquid crystals 114 are stacked over the second interlayer insulating film 111 and the second electrode 112. As the liquid crystals 114, ferroelectric liquid crystals (FLC), nematic liquid crystals, smectic liquid crystals, liquid crystals with homogeneous alignment, liquid crystals with homeotropic alignment, or the like can be used. An opposite substrate 120 is provided over the liquid crystals 114 with a second alignment film 115 and a color filter 116 interposed therebetween. Note that polarizing plates 119 and 118 are provided for the substrate 100 and the opposite substrate 120.

Note also that a retardation plate, a $\lambda/4$ plate, or the like is often provided in addition to such a polarizing plate.

Note that in the above-described structure, a capacitor is formed by a portion in which the opening pattern is not formed in the first electrode 101 and the second electrode 112, and each insulating film located between the first electrode 101 and the second electrode 112. Since this capacitor is formed, storage capacitance is increased.

Next, an example of a method for manufacturing a semiconductor device or a liquid crystal display device of the invention is described. First, a conductive film having a light-transmitting property (e.g., an ITO (Indium Tin Oxide) film, an IZO film, a ZnO film, or a Si film) is formed over the substrate 100. Subsequently, a photoresist film (not shown) is formed over this conductive film, and this photoresist film is exposed and developed. Thus, a resist pattern is formed over the conductive film. Subsequently, the conductive film is etched by using this resist pattern as a mask. Thus, the conductive film is selectively removed to form the first electrode 101 over the substrate 100. After that, the resist pattern is removed.

Subsequently, the insulating film 102 is formed over the substrate 100 and the first electrode 101. It is preferable that the insulating film 102 be formed thicker than the gate insulating film 104 described later. Subsequently, a semiconductor film (e.g., a polysilicon film) is formed over the insulating film 102, and this semiconductor film is selectively removed by etching using a resist pattern. Thus, the island-shaped semiconductor film 103 is formed over the insulating film 102.

Subsequently, the gate insulating film 104 is formed over the semiconductor film 103 and the insulating film 102. For example, the gate insulating film 104 is a silicon oxynitride film or a silicon oxide film, and is formed by plasma CVD. Note that the gate insulating film 104 may be formed of a silicon nitride film or a multi-layer film of silicon nitride and silicon oxide. Subsequently, a conductive film is formed over the gate insulating film 104, and is selectively removed by etching using a resist pattern as the mask. Thus, the gate electrodes 105a and 105b are formed over the gate insulating film 104 located over the semiconductor film 103. In addition, the gate wiring 105 and the auxiliary wiring 106 are formed in this step.

Note that as described above, by providing the auxiliary wiring 106, the potential of the first electrode 101 in each pixel can be stabilized. In addition, the auxiliary wiring 106 is not necessarily provided. Further, the auxiliary wiring 106 may be provided in another layer (e.g., a layer which is the same as the source wiring 108, a layer which is the same as the first electrode 101, or a layer which is the same as the second electrode 112), or may be divided and formed in a plurality of layers. Although the auxiliary wiring 106 is extended in a direction which is perpendicular to the source wiring 108 in FIG. 1B, the auxiliary wiring 106 may be extended in the same direction as the source wiring 108.

Note that the conductive film is formed to have one element or a plurality of elements selected from a group of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), tin (Sn), and oxygen (O), a compound or an alloy material including one or a plurality of the elements selected from the group as a component (e.g., Indium Tin Oxide (ITO), Indium Zinc Oxide (IZO), Indium Tin Oxide to which silicon oxide is added (ITSO), zinc oxide (ZnO), aluminum neodymium (Al—Nd), or magnesium silver (Mg—Ag)), a substance in which these compounds are combined, or the like. Alternatively, the conductive film is formed to have a compound of silicon and the above-described material (silicide) (e.g., aluminum silicon, molybdenum silicon, or nickel silicide) or a compound of nitrogen and the above-described material (e.g., titanium nitride, tantalum nitride, or molybdenum nitride). Note also that a large amount of n-type impurities (e.g., phosphorus) or p-type impurities (e.g., boron) may be included in silicon (Si).

Note that a wiring or an electrode may be formed of the above-described material with a single-layer structure or a multi-layer structure. By forming the wiring or the electrode with a single-layer structure, a manufacturing process can be simplified; the number of days for a process can be reduced; and cost can be reduced. Alternatively, by forming the wiring or the electrode with a multi-layer structure, an advantage of each material is taken and a disadvantage thereof is reduced so that a wiring or an electrode with high performance can be formed. For example, by including a material with low resistance (e.g., aluminum) in a multi-layer structure, resistance in the wiring can be reduced. In addition, by including a material with high heat resistance, for example, by employing a stacked-layer structure in which a material with low heat resistance and having a different advantage is sandwiched with materials with high heat resistance, heat resistance in the wiring or the electrode as a whole can be improved. For example, it is preferable that a stacked-layer structure be employed in which a layer including aluminum is sandwiched with layers including molybdenum or titanium. Further, when there is a portion which is in direct contact with a wiring, an electrode, or the like formed of another material, they may be adversely affected each other. For example, in some cases, one material enters the other material and changes property thereof, so that an original purpose cannot be achieved; and there occurs a problem in manufacturing so that normal manufacturing cannot be performed. In such a case, by sandwiching or covering a certain layer with different layers, the problem can be solved. For example, when Indium Tin Oxide (ITO) is to be in contact with aluminum, it is preferable to interpose titanium or molybdenum therebetween. Moreover, when silicon is to be in contact with aluminum, it is preferable to interpose titanium or molybdenum therebetween.

Subsequently, an impurity is added to the semiconductor film 103 by using the gate electrodes 105a and 105b as masks. Thus, the impurity regions 103a and 103b and an impurity region located between the gate electrodes 105a and 105b are formed in the semiconductor film 103. Note that an n-type impurity element and a p-type impurity element may be separately added, or both of the n-type impurity element and the p-type impurity element may be added to a particular region. In the latter case, the amount of addition of one of the n-type impurity element and the p-type impurity element is to be larger than the other thereof. In this step, a resist pattern may be used as the mask.

In addition, at this time, by changing the thickness or the stacked-layer structure of the gate insulating film 104, an LDD region may be formed. In a portion where the LDD region is to be formed, the gate insulating film 104 may be thickened or the number of layers may be increased. Accordingly, since the amount of addition of impurities decreases, the LDD region can be easily formed.

Note that impurity addition to the semiconductor film 103 may be performed before the gate electrodes 105a and 105b are formed, for example, before or after the gate insulating film 104 is formed. In that case, a resist pattern is used as the mask. Thus, a capacitor can be formed between an electrode of the same layer as a gate and the semiconductor film to which the impurity is added. Since the gate insulating film is provided between the electrode of the same layer as the gate and the semiconductor film to which the impurity is added, a thin and large capacitor can be formed.

Subsequently, the first interlayer insulating film 107 and each contact hole are formed. Subsequently, a conductive film (e.g., a metal film) is formed over the first interlayer insulating film 107 and in each contact hole, and this conductive film is selectively removed by etching using a resist pattern. Thus, the source wiring 108, the conductive film for connecting 109, and the conductive film for connecting 110 are formed.

Subsequently, the second interlayer insulating film 111 and each contact hole are formed. Subsequently, a conductive film (e.g., an ITO film, an IZO film, a ZnO film, or a Si film) having a light-transmitting property is formed over the second interlayer insulating film 111 and in each contact hole, and this conductive film is selectively removed by etching using a resist pattern. Thus, the second electrode 112 is formed.

Positions are different between the contact hole in which a part of the conductive film for connecting 109 is embedded and the contact hole in which a part of the second electrode 112 is embedded. Thus, even when portions located over the contact holes in the conductive film for connecting 109 and the second electrode 112 hollow, these hollows do not overlap with each other. Therefore, a portion which deeply hollows is not formed in the second electrode 112, so that generation of a defect of the above-described resist pattern can be suppressed. After that, the resist pattern is removed.

Subsequently, the first alignment film 113 is formed, so that the liquid crystals 114 are sealed between the first alignment film 113 and the opposite substrate 120 provided with the second alignment film 115 is formed. After that, the polarizing plates 118 and 119, a retardation plate (not shown), an optical film such as a $\lambda/4$ plate (not shown), an optical film such as a diffusion plate or a prism sheet, or the like are provided on sides which are not in contact with the liquid crystals 114 of the opposite substrate 120 and the substrate 100. Further, a backlight or a frontlight is provided. As a backlight, an underneath type or a sidelight type can be used. As a light source, a cold cathode tube or an LED (a light-emitting diode) can be used. As an LED, a white LED or a combination of LEDs of respective colors (e.g., white, red, blue, green, cyan, magenta, and/or yellow) may be used. By using an LED, a peak of a wavelength of light is sharp, so that color purity can be improved. In the case of a sidelight type, a light guide plate is provided and a uniform surface light source is realized. The liquid crystal display device is formed in this manner.

Note that the liquid crystal display device may only mean a substrate, an opposite substrate, and liquid crystals sandwiched therebetween. The liquid crystal display device may further include an optical film such as a polarizing plate or retardation plate. Further, the liquid crystal display device may also include a diffusion plate, a prism sheet, a light source (e.g., a cold cathode tube or an LED), or a light guide plate.

As described above, in accordance with Embodiment Mode 2 of the invention, the first electrode 101 is provided over the substrate 100, that is, below the insulating film 102 in the liquid crystal display device which controls the alignment direction of liquid crystals by the FFS-mode. Therefore, the interval between the first electrode 101 and the second electrode 112 can be more increased compared with the case where the first electrode 101 is provided over the insulating film 102. Accordingly, degree of freedom of the interval between the first electrode 101 and the second electrode 112 is improved. Accordingly, since optimal values for an arrangement interval and width of the opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a viewing angle is widened by applying an optimal electric field.

In addition, an operation or the like of the transistor is not affected even when thickness of the insulating film 102 is changed, so that the thickness thereof can be freely controlled. Therefore, the interval between the first electrode 101 and the second electrode 112 can be freely increased.

By thickening the insulating film 102, the interval between the first electrode 101 and the second electrode 112 is increased even when the gate insulating film 104 is thinned, so that an appropriate electric field can be applied to the liquid crystals 114. When the gate insulating film 104 is thinned, current drive capability of the thin film transistor 121 can be improved and gate capacitance thereof can be improved.

In addition, the gate electrode 105a and the gate wiring 105 may be formed in different layers, or may be formed of different materials.

Although the conductive film for connecting 109 is provided in the same layer as the source wiring 108, the conductive film for connecting 109 may be provided in another wiring layer (e.g., the same layer as the gate wiring 105, the first electrode 101, or the second electrode 112). In addition, the gate insulating film 104 is not necessarily formed over the whole surface.

The contact hole in which a part of the second electrode 112 is embedded may be formed in a position which overlaps with the contact hole in which a part of the conductive film for connecting 109 is embedded. In this case, since the contact holes can be put in one position, layout can be efficiently performed. Therefore, an aperture ratio of the pixel can be improved.

In this embodiment mode, the thin film transistor in which the gate electrode is provided over the channel region, namely, a so-called top-gate thin film transistor is described; however, the invention is not particularly limited to this. A thin film transistor in which a gate electrode is provided below a channel region, namely, a so-called bottom-gate thin film transistor may be formed, or a transistor having a structure in which gate electrodes are provided over and below a channel region may be formed.

In addition, the liquid crystal display device may be a transmissive liquid crystal display device, a semi-transmissive liquid crystal display device, or a reflective liquid crystal display device. The semi-transmissive liquid crystal display device can be achieved by forming the first electrode 101 with a film having a light-transmitting property (e.g., an ITO (Indium Tin Oxide) film, an IZO (Indium Zinc Oxide) film, a ZnO film, or a polysilicon film or an amorphous silicon film into which an impurity is introduced) and forming the second electrode 112 with a metal film. Alternatively, the semi-transmissive liquid crystal display device can be achieved by forming the second electrode 112 with a film having a light-transmitting property, forming a part of the first electrode 101 with a metal film, and forming the other part thereof with a film having a light-transmitting property. Further, in the reflective liquid crystal display device, the first electrode 101 can have a function of a reflector by forming the first electrode 101 with a metal film. By providing an insulating film (e.g., a silicon oxide film) between the substrate 100 and the first electrode 101, a metal film as a reflective film can be formed in this insulating film. Moreover, a reflective sheet as a reflective film (e.g., an aluminum film) can also be formed on a surface outside of the substrate 100. Note that the contents described here can be similarly applied to each embodiment mode described later.

Embodiment Mode 3

Figure 3A:
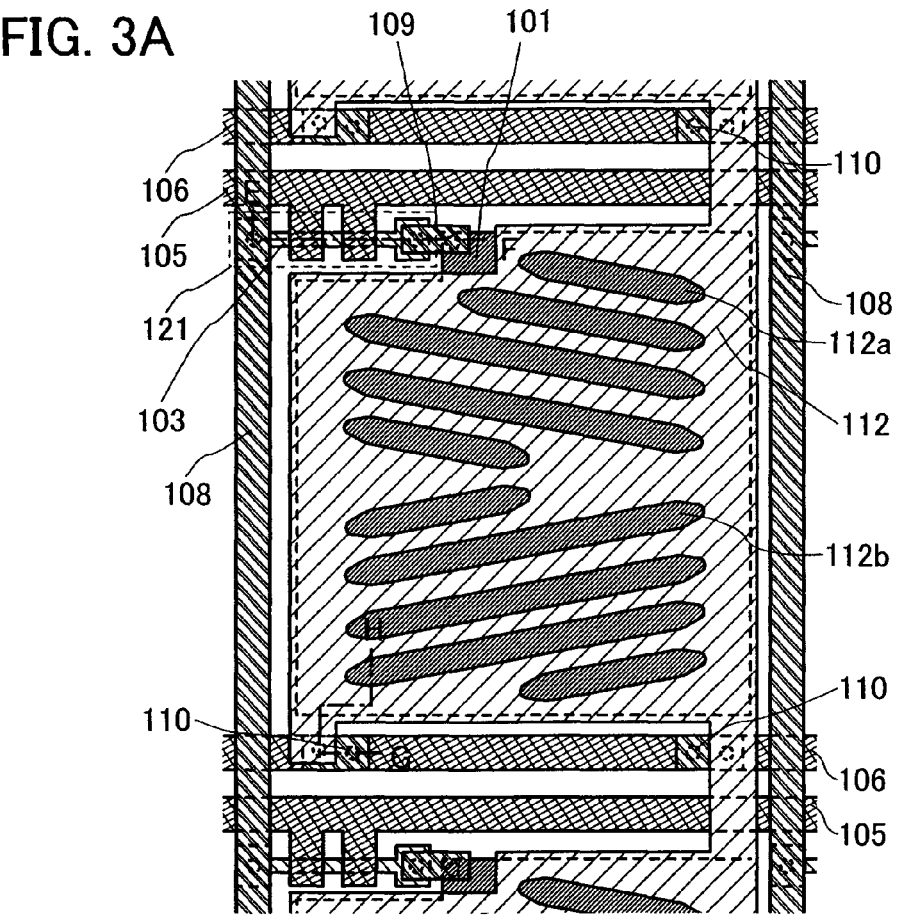
FIG. 3A is a plan view showing a structure of an FFS-mode liquid crystal display device in accordance with Embodiment Mode 3.
Figure 3B:
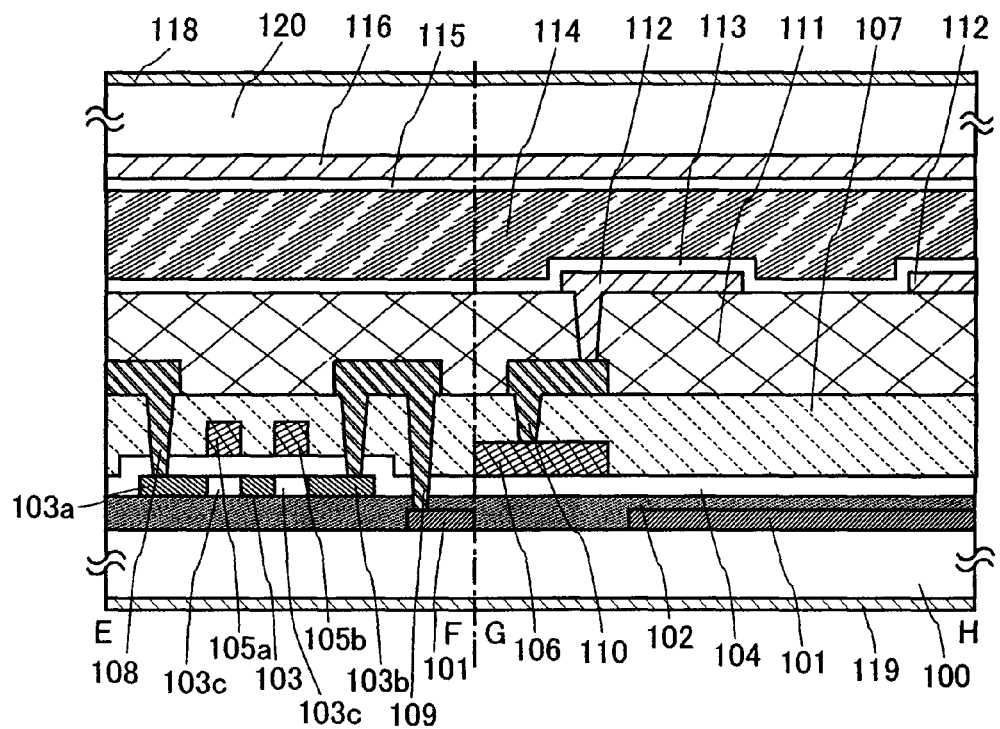
FIG. 3B is a cross-sectional view taken along a line E-F and a line G-H in FIG. 3A.

FIG. 3A is a plan view showing a structure of a liquid crystal display device in accordance with Embodiment Mode 3. FIG. 3B is a cross-sectional view taken along a line E-F and a line G-H in FIG. 3A. This embodiment mode describes a structure which is almost similar to that of Embodiment Mode 2 except for the following points. The first electrode 101 is electrically connected to the impurity region 103b of the thin film transistor 121 and functions as a pixel electrode; the second electrode 112 is electrically connected to the auxiliary wiring 106 and functions as a common electrode; the second electrode 112 protrudes outside of the first electrode 101 when seen from a direction which is perpendicular to the substrate 100; and connection structures of the first electrode 101 and the second electrode 112 to each wiring are different. In addition, a manufacturing method of the liquid crystal display device in accordance with this embodiment mode is almost similar to that of Embodiment Mode 2. Accordingly, the contents described in Embodiment Mode 2 can also be applied to this embodiment mode. Hereinafter, common reference numerals are used for portions having similar structures to Embodiment Mode 2 and description thereof is omitted.

In this embodiment, a contact hole located over the first electrode 101 is formed in the first interlayer insulating film 107, the gate insulating film 104, and the insulating film 102. Contact holes located over the impurity regions 103a and 103b of the thin film transistor 121 are formed in the first interlayer insulating film 107 and the gate insulating film 104. In addition, a contact hole located over the auxiliary wiring 106 is formed in the first interlayer insulating film 107.

The conductive film for connecting 109 is extended above from the impurity region 103b to the first electrode 101, and is electrically connected to each of the impurity region 103b and the first electrode 101 by being partially embedded in the contact hole. In this manner, the first electrode 101 is electrically connected to the impurity region 103b with the conductive film for connecting 109 interposed therebetween. In addition, the conductive film for connecting 110 is electrically connected to the auxiliary wiring 106 by being partially embedded in the contact hole.

The first electrode 101 may be provided with a conductive film for connecting formed in the same layer as the second electrode 112 and may be electrically connected to the impurity region 103b with the conductive film for connecting interposed therebetween.

In addition, a contact hole located over the conductive film for connecting 110 is formed in the second interlayer insulating film 111. The second electrode 112 is electrically connected to the conductive film for connecting 110 by being partially embedded in the contact hole. In this manner, the second electrode 112 is electrically connected to the auxiliary wiring 106 with the conductive film for connecting 110 interposed therebetween. Note that as shown in FIG. 3A, the second electrodes 112 located above and below are partially connected to each other.

Note that the auxiliary wiring 106 and the second electrode 112 may also be directly connected without providing the conductive film for connecting 110.

In this embodiment mode, the conductive film for connecting 110 is formed above each of three corners except for a corner near the thin film transistor among four corners of the first electrode 101.

In accordance with this embodiment mode also, an advantageous effect which is similar to that of Embodiment Mode 2 can be obtained. Note that in this embodiment mode, the conductive film for connecting 110 is not necessarily provided. In this case, a contact hole located over the auxiliary wiring 106 is formed in the first and second interlayer insulating films 107 and 111. Then, the second electrode 112 is partially embedded in this contact hole, so that the auxiliary wiring 106 and the second electrode 112 are electrically connected. In this case, an aperture ratio can be improved. Note also that by providing the conductive film for connecting 110, location deviation can be suppressed by the conductive film for connecting 110 even when location deviation is generated in the contact holes formed in the first and second interlayer insulating films 107 and 111.

In addition, as shown in FIG. 3B, the first electrode 101 functions as the pixel electrode and the second electrode 112 functions as the common electrode, and the common electrode is provided to be closer to the liquid crystals than the pixel electrode. Accordingly, since a voltage of the common electrode is constant even when a voltage of the pixel electrode fluctuates for each pixel, an electric field of a portion in which the liquid crystals are provided is hardly affected by an adjacent pixel, so that crosstalk can be reduced. For example, although signals input into pixels adjacent to each other may be greatly different from each other depending on an image to be displayed, crosstalk can be prevented by employing a structure where a common electrode are provided so as to be close to liquid crystals like this embodiment mode.

Note that although only one pixel is shown in FIG. 3A, a plurality of pixels are actually arranged in matrix. In this case, the second electrodes 112 of the pixels may be connected to each other. Thus, resistance is lowered and a voltage can be sufficiently applied to the second electrode 112.

Note that this embodiment mode shows an example of the case where the contents described in Embodiment Mode 2 are partly changed, improved, or transformed. Accordingly, the contents described in Embodiment Mode 2 can also be applied to this embodiment mode or can be combined with this embodiment mode.

Although description is made by using various drawings, one drawing is made of various components. Accordingly, another structure can also be formed by combining each component in each drawing.

Embodiment Mode 4

Figure 4A:
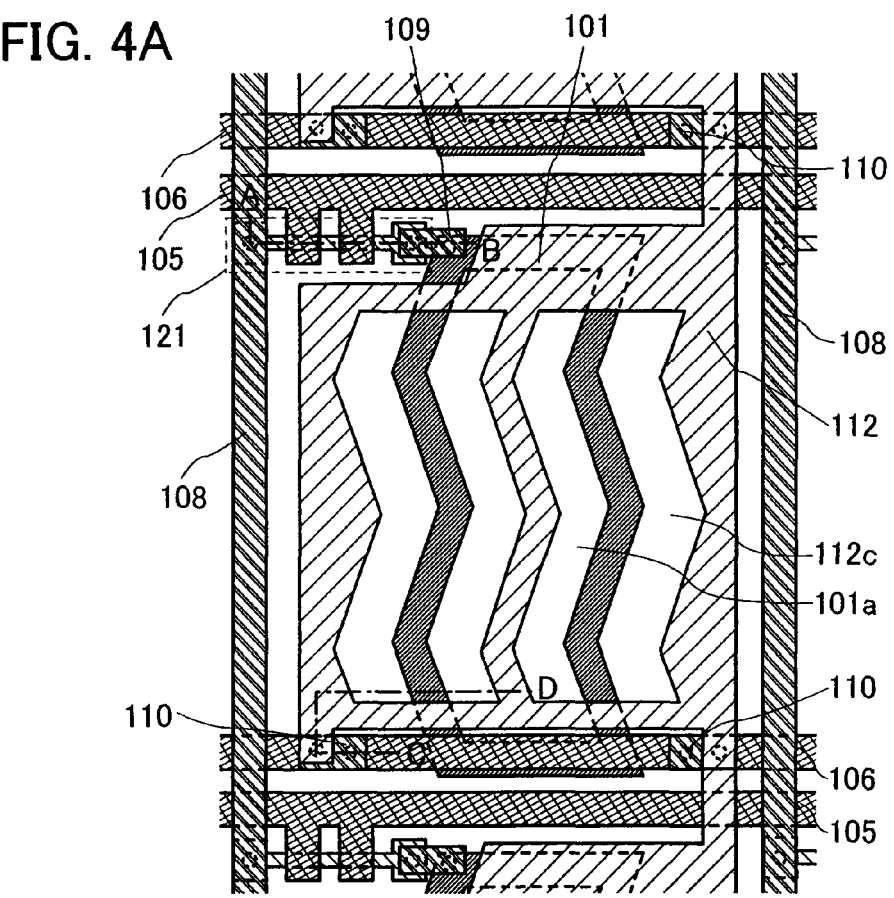
FIG. 4A is a plan view showing a structure of an IPS-mode liquid crystal display device in accordance with Embodiment Mode 4.
Figure 4B:
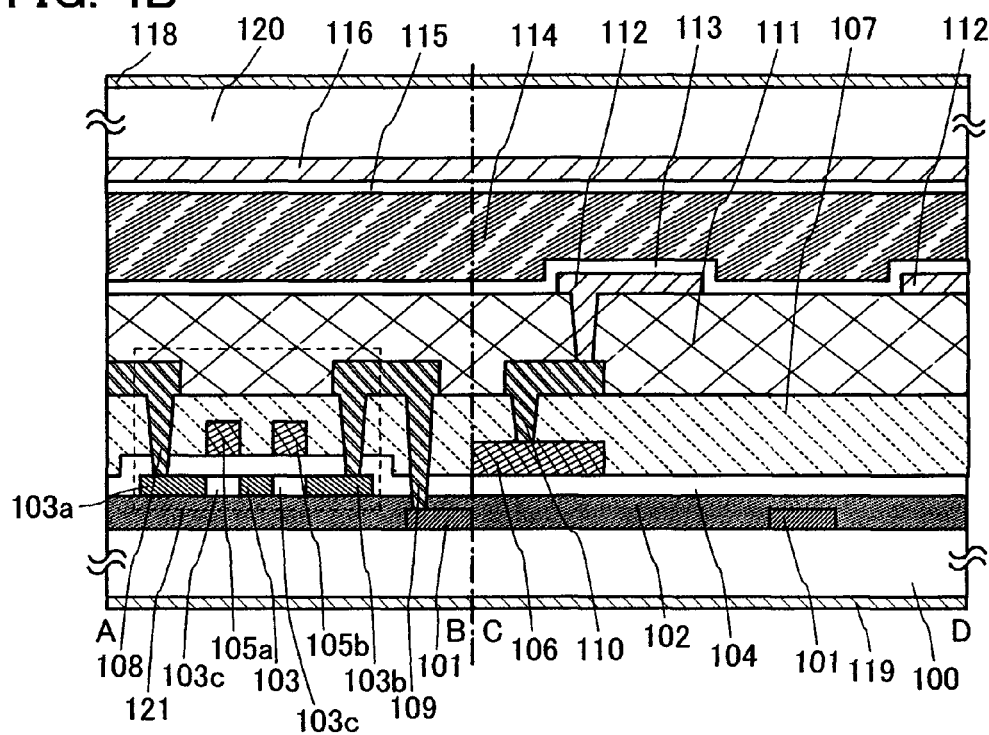
FIG. 4B is a cross-sectional view taken along a line A-B and a line C-D in FIG. 4A.

FIG. 4A is a plan view showing a structure of a liquid crystal display device in accordance with Embodiment Mode 4. FIG. 4B is a cross-sectional view taken along a line A-B and a line C-D in FIG. 4A of the invention. The liquid crystal display device in accordance with this embodiment mode has a structure which is almost similar to that of Embodiment Mode 3 except for the following points. A shape of the opening pattern 112c formed in the second electrode 112 is different; and an opening pattern 101a is formed in the first electrode 101. That is, the liquid crystal display device in accordance with this embodiment mode is a device which controls an alignment direction of liquid crystals by an IPS mode, and a pixel electrode and a common electrode are alternate and almost parallel to each other when seen from a direction which is perpendicular to the liquid crystal display device. In an FFS mode, the electrode located below which is the pixel electrode or the common electrode has an opening pattern. In addition, a manufacturing method of the liquid crystal display device in accordance with this embodiment mode is almost similar to that of Embodiment Mode 3. Accordingly, the contents described in Embodiment Mode 3 can also be applied to this embodiment mode. Note that since the contents described in Embodiment Mode 2 can also be applied to Embodiment Mode 3, the contents described in Embodiment Mode 2 can also be applied to Embodiment Mode 4. Hereinafter, common reference numerals are used for portions having similar structures to Embodiment Mode 3 and description thereof is omitted.

Each of the opening patterns 112c and 101a is extended longitudinally in a zigzag manner in FIG. 4A. The opening pattern 101a is located below and around a region where the opening pattern 112c is not formed in the second electrode 112.

By providing opening patterns having different directions like the opening patterns 112c and 101a, a plurality of regions having different moving directions of liquid crystal molecules can also be provided. That is, a multi-domain structure can be formed. By employing a multi-domain structure, a display defect of an image when the image is seen from a particular direction can be prevented. Therefore, a viewing angle can be improved.

In accordance with this embodiment mode also, an advantageous effect which is similar to that of Embodiment Mode 3 can be obtained. In this embodiment mode, shapes of the second electrode 112 and the opening pattern 112c, and shapes of the first electrode 101 and the opening pattern 101a may be the shapes of the second electrode 112 and the opening pattern 112c in Embodiment Mode 2. Note that it is necessary to provide the opening patterns 101a and 112c so as to be alternate and almost parallel to each other except for peripheral portions of the first electrode 101 and the second electrode 112 when seen from a direction which is perpendicular to the substrate 100. Note also that the invention is not limited to this.

In addition, in the FFS-mode liquid crystal display device shown in Embodiment Mode 2 or 3, the shapes of the second electrode 112 and the opening patterns 112a and 112b may be the shapes shown in this embodiment mode.

Further, a capacitor can be formed by making the first electrode 101 overlap with the second electrode 112 or the auxiliary wiring 106, and the capacitor can be used as a storage capacitor.

Note that this embodiment mode shows an example of the case where the contents described in Embodiment Modes 2 and 3 are partly changed, improved, or transformed. Accordingly, the contents described in Embodiment Modes 2 and 3 can also be applied to this embodiment mode or can be combined with this embodiment mode.

Although description is made by using various drawings, one drawing is made of various components. Accordingly, another structure can also be formed by combining each component in each drawing.

Embodiment Mode 5

Figure 5A:
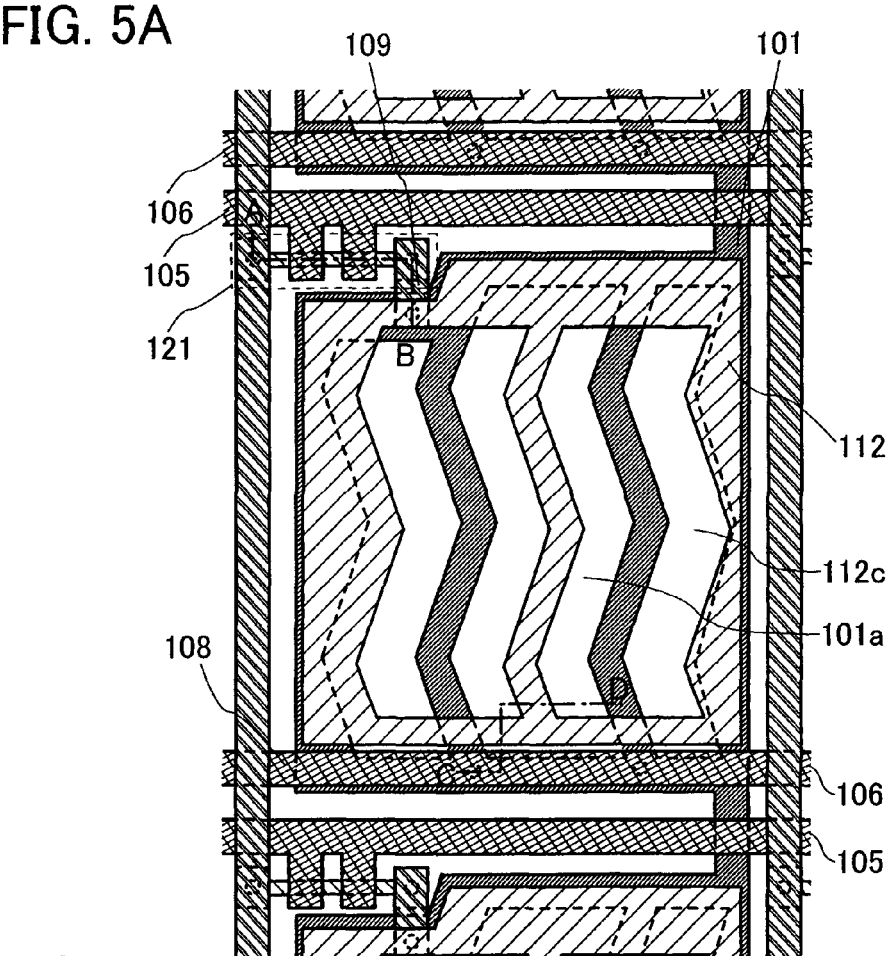
FIG. 5A is a plan view showing a structure of an IPS-mode liquid crystal display device in accordance with Embodiment Mode 5.
Figure 5B:
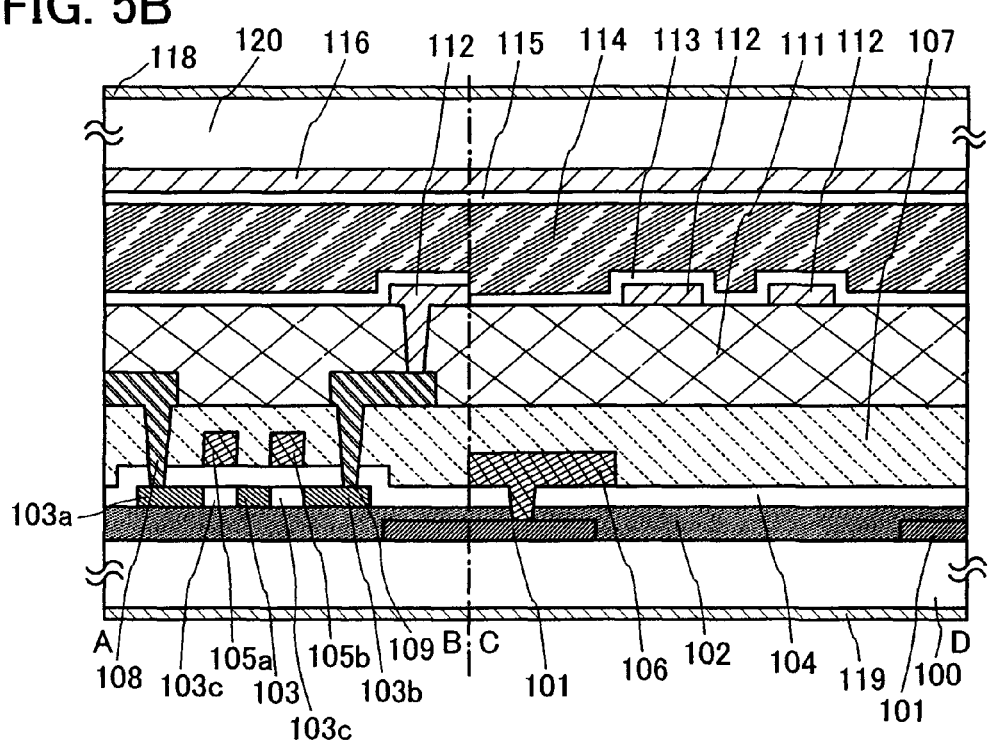
FIG. 5B is a cross-sectional view taken along a line A-B and a line C-D in FIG. 5A.

FIG. 5A is a plan view showing a structure of an IPS-mode liquid crystal display device in accordance with Embodiment Mode 5 of the invention. FIG. 5B is a cross-sectional view taken along a line A-B and a line C-D in FIG. 5A. This embodiment mode describes a structure which is almost similar to that of Embodiment Mode 4 except for the following points. The first electrode 101 is electrically connected to the auxiliary wiring 106 and functions as a common electrode; the second electrode 112 is electrically connected to the conductive film for connecting 109 and functions as a pixel electrode; and connection structures of the first electrode 101 and the second electrode 112 to each wiring are different. In addition, a manufacturing method of the liquid crystal display device in accordance with this embodiment mode is almost similar to that of Embodiment Mode 4. Hereinafter, common reference numerals are used for portions having similar structures to Embodiment Mode 4 and description thereof is omitted.

Accordingly, the contents described in Embodiment Modes 1 to 4 can also be applied to this embodiment mode.

In this embodiment, the conductive film for connecting 110 shown in Embodiment Mode 3 is not formed. Instead, a contact hole located over the first electrode 101 is formed in the gate insulating film 104 and the insulating film 102. The auxiliary wiring 106 is electrically connected to the first electrode 101 by being partially embedded in this contact hole.

Note that this contact hole is formed before the gate electrodes 105a and 105b are formed.

By providing this contact hole in this manner, layout can be efficiently performed and an aperture ratio can be improved.

Further, a contact hole located over the conductive film for connecting 110 is not formed in the second interlayer insulating film 111, and a contact hole located over the conductive film for connecting 109 is formed instead of this. The second electrode 112 is electrically connected to the conductive film for connecting 109 by being partially embedded in this contact hole.

Although the second electrode 112 is electrically connected to the conductive film for connecting 109, the invention is not limited to this. The second electrode 112 may also be electrically connected to the impurity region 103b without providing the conductive film for connecting 109.

In this embodiment mode, shapes of the second electrode 112 and the opening pattern 112c, and shapes of the first electrode 101 and the opening pattern 101a may be the shapes of the second electrode 112 and the opening pattern 112c in Embodiment Mode 2. Note that it is necessary to provide the opening patterns 101a and 112c so as to be alternate and almost parallel to each other except for peripheral portions of the first electrode 101 and the second electrode 112 when seen from a direction which is perpendicular to the substrate 100.

By providing opening patterns having different directions like the opening patterns 112c and 101a, a plurality of regions having different moving directions of liquid crystal molecules can also be provided. That is, a multi-domain structure can be formed. By employing a multi-domain structure, a display defect of an image when the image is seen from a particular direction can be prevented. Therefore, a viewing angle can be improved.

Note that this embodiment mode shows an example of the case where the contents described in Embodiment Modes 2 to 4 are partly changed, improved, or transformed. Accordingly, the contents described in Embodiment Modes 2 to 4 can also be applied to this embodiment mode or can be combined with this embodiment mode.

Although description is made by using various drawings, one drawing is made of various components. Accordingly, another structure can also be formed by combining each component in each drawing.

Embodiment Mode 6

Figure 6A:
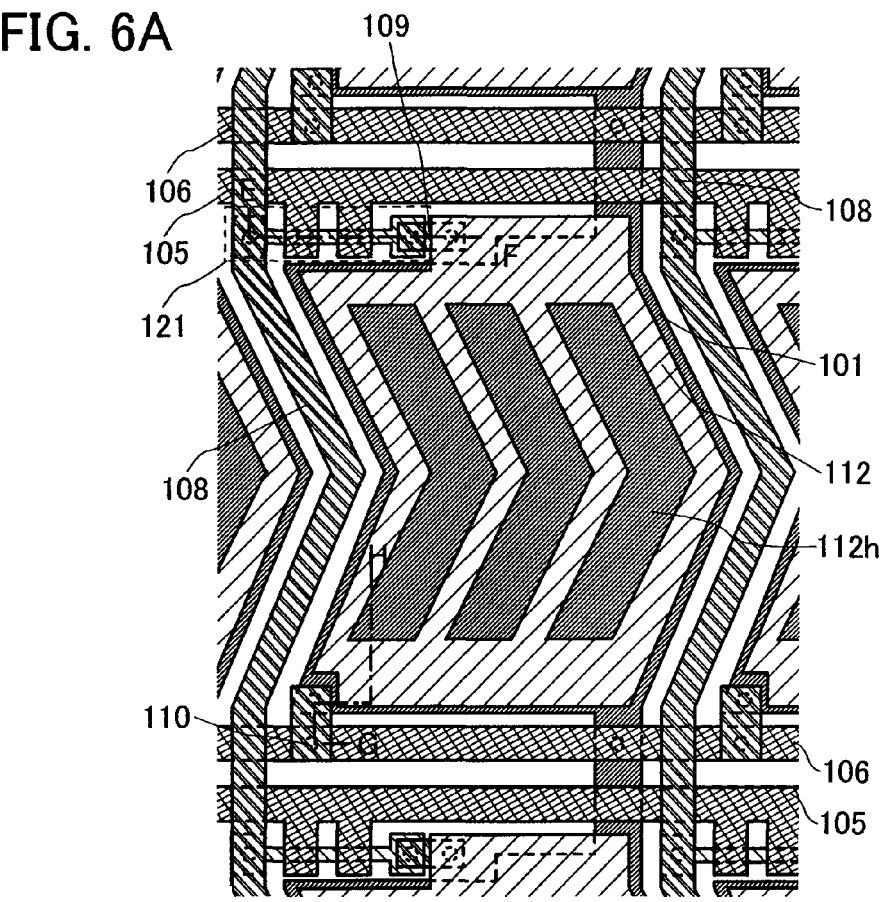
FIG. 6A is a plan view showing a structure of an FFS-mode liquid crystal display device in accordance with Embodiment Mode 6.
Figure 6B:
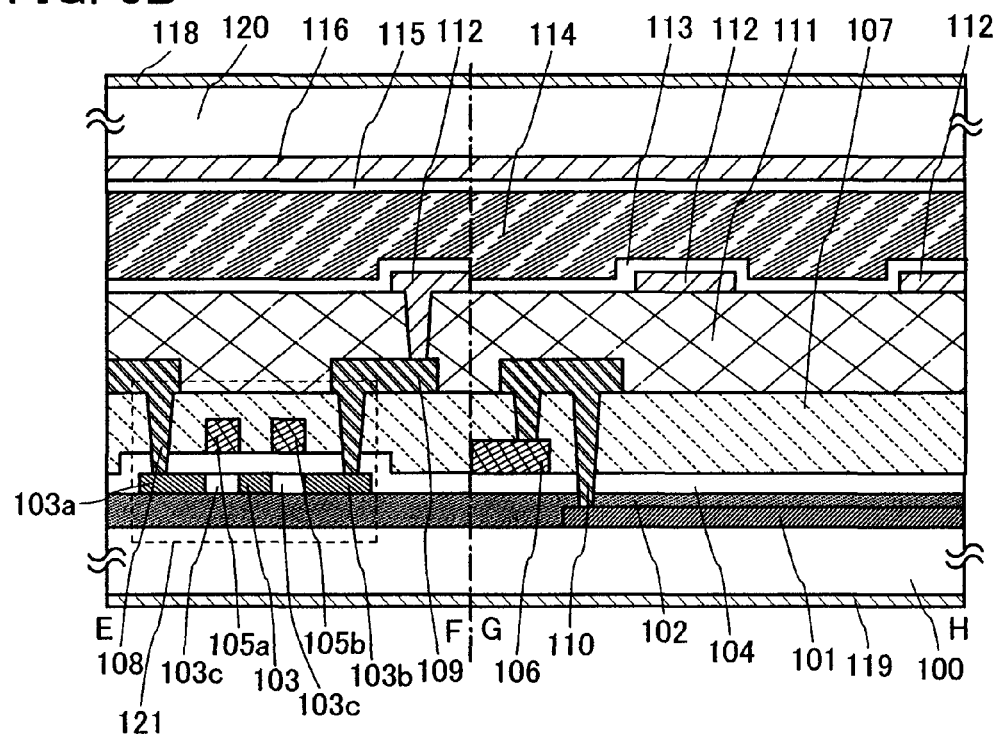
FIG. 6B is a cross-sectional view taken along a line E-F and a line G-H in FIG. 6A.

FIG. 6A is a plan view showing a structure of an FFS-mode liquid crystal display device in accordance with Embodiment Mode 6 of the invention. FIG. 6B is a cross-sectional view taken along a line E-F and a line G-H in FIG. 6A. This embodiment mode describes a structure which is almost similar to that of the FFS-mode liquid crystal display device shown in Embodiment Mode 2 except for the following points. The source wiring 108 is inflected; the first electrode 101 and the second electrode 112 are also inflected in accordance with the source wiring 108; and an opening pattern 112h of the second electrode 112 is extended along the source wiring 108 and is inflected. Therefore, the contents described in Embodiment Mode 2 can also be applied to this embodiment mode. Hereinafter, common reference numerals are used for portions having similar structures to Embodiment Mode 2 and description thereof is omitted.

Accordingly, the contents described in Embodiment Modes 2 to 5 can also be applied to this embodiment mode.

By providing opening patterns having different directions like the opening patterns 112h in FIG. 6A, a plurality of regions having different moving directions of liquid crystal molecules can also be provided. That is, a multi-domain structure can be formed. By employing a multi-domain structure, a display defect of an image when the image is seen from a particular direction can be prevented. Therefore, a viewing angle can be improved.

Further, since the source wiring 108 is also inflected along the opening pattern 112h, layout can be efficiently performed and an aperture ratio can be improved.

In accordance with this embodiment mode also, an advantageous effect which is similar to that of Embodiment Mode 2 can be obtained. In this embodiment mode, a shape of the opening pattern of the second electrode 112 may be the shape shown in Embodiment Mode 2 or 4.

Note that this embodiment mode shows an example of the case where the contents described in Embodiment Modes 2 to 5 are partly changed, improved, or transformed. Accordingly, the contents described in Embodiment Modes 2 to 5 can also be applied to this embodiment mode or can be combined with this embodiment mode.

Although description is made by using various drawings, one drawing is made of various components. Accordingly, another structure can also be formed by combining each component in each drawing.

Embodiment Mode 7

Figure 7A:
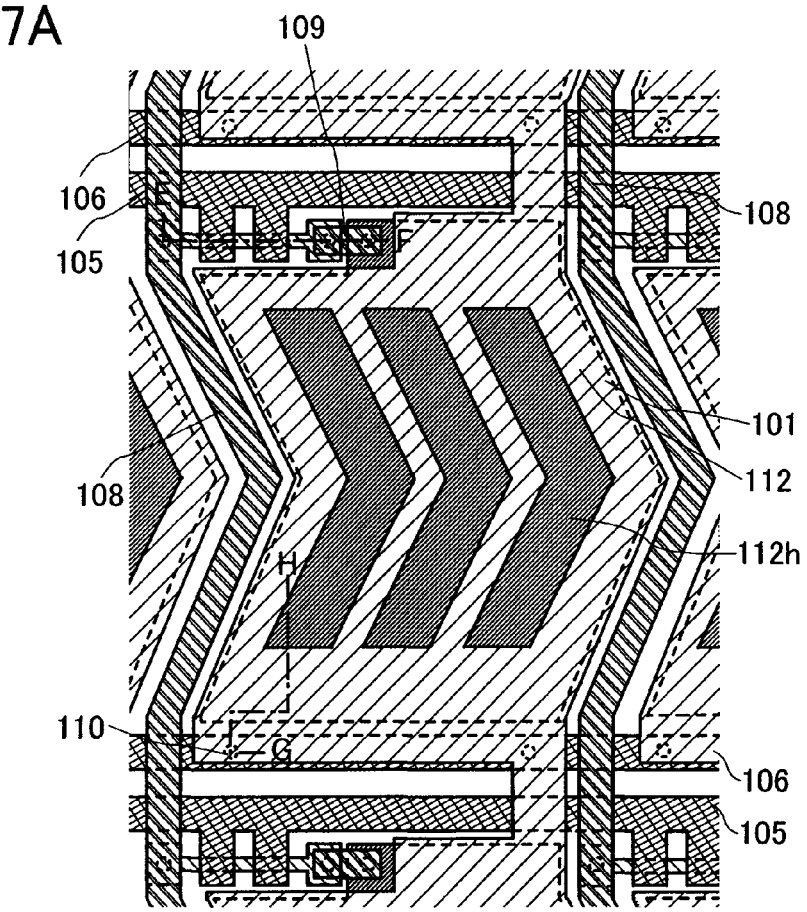
FIG. 7A is a plan view showing a structure of an FFS-mode liquid crystal display device in accordance with Embodiment Mode 7.
Figure 7B:
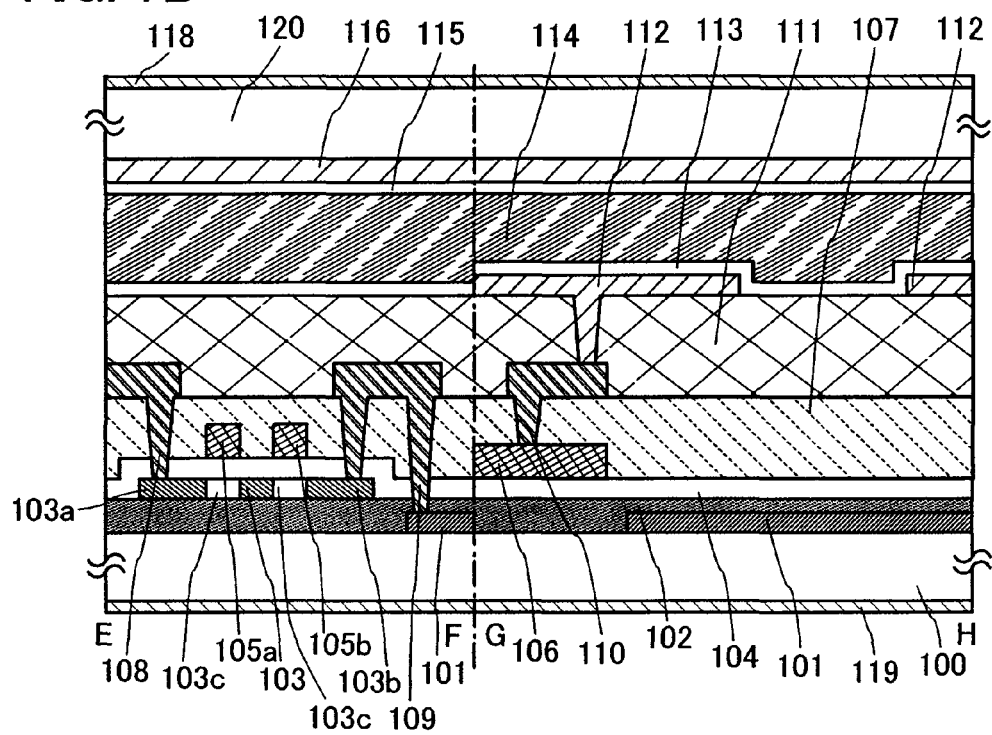
FIG. 7B is a cross-sectional view taken along a line E-F and a line G-H in FIG. 7A.

FIG. 7A is a plan view showing a structure of an FFS-mode liquid crystal display device in accordance with Embodiment Mode 7 of the invention. FIG. 7B is a cross-sectional view taken along a line E-F and a line G-H in FIG. 7A. This embodiment mode describes a structure which is almost similar to that of the FFS-mode liquid crystal display device shown in Embodiment Mode 3 except for the following points. The source wiring 108 is inflected; the first electrode 101 and the second electrode 112 are also inflected in accordance with the source wiring 108; and the opening pattern 112h of the second electrode 112 is extended along the source wiring 108 and is inflected. Therefore, the contents described in Embodiment Mode 3 can also be applied to this embodiment mode. Hereinafter, common reference numerals are used for portions having similar structures to Embodiment Mode 3 and description thereof is omitted.

Accordingly, the contents described in Embodiment Modes 2 to 6 can also be applied to this embodiment mode.

By providing opening patterns having different directions like the opening patterns 112h in FIG. 7A, a plurality of regions having different moving directions of liquid crystal molecules can also be provided. That is, a multi-domain structure can be formed. By employing a multi-domain structure, a display defect of an image when the image is seen from a particular direction can be prevented. Therefore, a viewing angle can be improved.

Further, since the source wiring 108 is also inflected along the opening pattern 112h, layout can be efficiently performed and an aperture ratio can be improved.

In accordance with this embodiment mode also, an advantageous effect which is similar to that of Embodiment Mode 3 can be obtained. In this embodiment mode, a shape of the opening pattern of the second electrode 112 may be the shape shown in Embodiment Mode 2 or 4.

Note that this embodiment mode shows an example of the case where the contents described in Embodiment Modes 2 to 6 are partly changed, improved, or transformed. Accordingly, the contents described in Embodiment Modes 2 to 6 can also be applied to this embodiment mode or can be combined with this embodiment mode.

Although description is made by using various drawings, one drawing is made of various components. Accordingly, another structure can also be formed by combining each component in each drawing.

Embodiment Mode 8

Figure 8A:
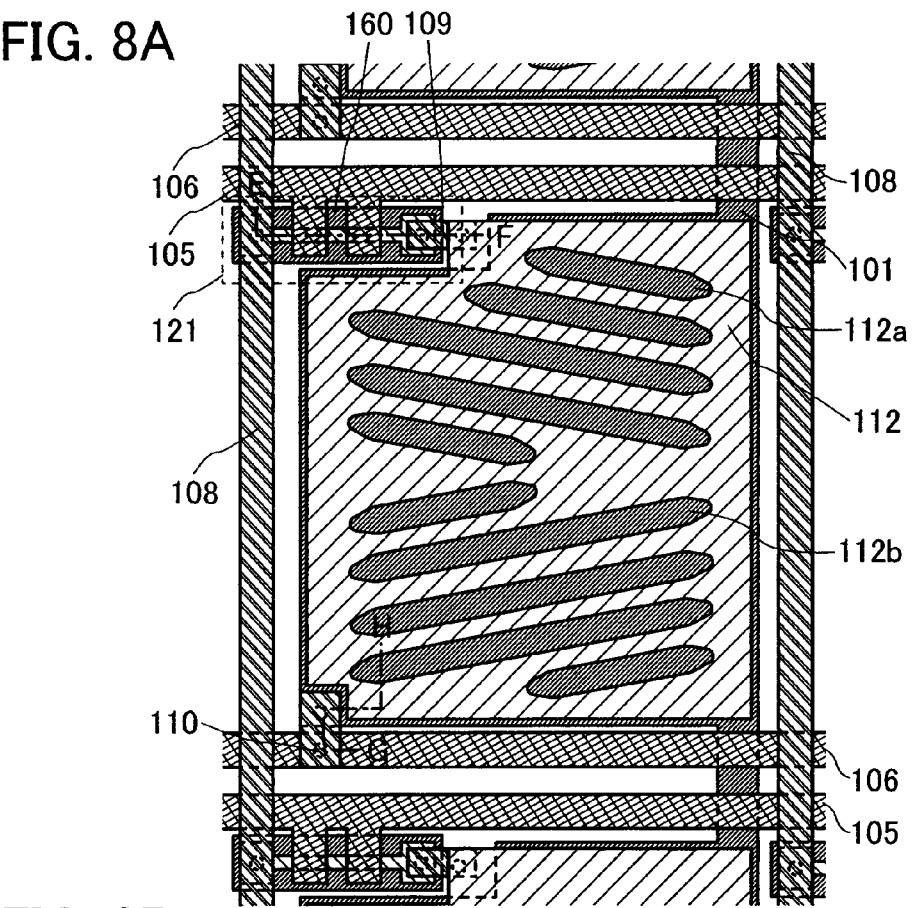
FIG. 8A is a plan view showing a structure of an FFS-mode liquid crystal display device in accordance with Embodiment Mode 8.
Figure 8B:
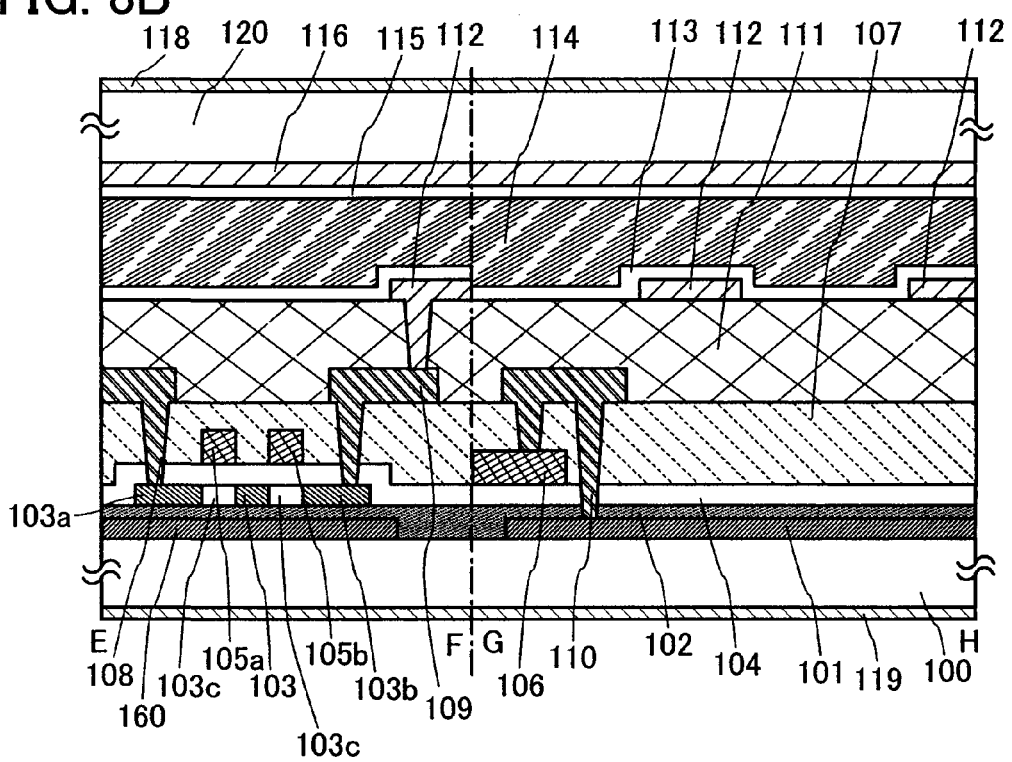
FIG. 8B is a cross-sectional view taken along a line E-F and a line G-H in FIG. 8A.

FIG. 8A is a plan view showing a structure of an FFS-mode liquid crystal display device in accordance with Embodiment Mode 8 of the invention. FIG. 8B is a cross-sectional view taken along a line E-F and a line G-H in FIG. 8A. This embodiment mode describes a structure which is almost similar to that of Embodiment Mode 2 except that a conductive film 160 located below the whole surface of the semiconductor film 103 is formed over the substrate 100. In addition, a manufacturing method of the liquid crystal display device in accordance with this embodiment mode is almost similar to that of Embodiment Mode 2 except that the conductive film 160 is formed in the same step as the first electrode 101. Therefore, the contents described in Embodiment Mode 2 can also be applied to this embodiment mode. Note that the conductive film 160 is not electrically connected to any component and is in a floating state. Hereinafter, common reference numerals are used for portions having similar structures to Embodiment Mode 2 and description thereof is omitted.

Accordingly, the contents described in Embodiment Modes 2 to 7 can also be applied to this embodiment mode.

In accordance with this embodiment mode also, an advantageous effect which is similar to that of Embodiment Mode 2 can be obtained. In addition, since the conductive film 160 located below the semiconductor film 103 is formed over the substrate 100, the insulating film 102 may be a single layer of a silicon oxide film. When the conductive film 160 is not formed and the insulating film 102 is a single layer of a silicon oxide film, there is a possibility that impurity diffusion from the substrate 100 to the semiconductor film 103 cannot be sufficiently suppressed. Therefore, it is necessary to add a silicon nitride film to the insulating film 102. However, an operation of the thin film transistor 121 becomes unstable when the silicon nitride film is made in contact with the semiconductor film 103. However, in this embodiment mode, by forming the conductive film 160, impurity diffusion from the substrate 100 to the semiconductor film 103 can be sufficiently suppressed even when the insulating film 102 is a single layer of a silicon oxide film. Further, by forming the insulating film 102 of the single layer of silicon oxide film, the operation of the thin film transistor 121 can be stabilized.

Note that the insulating film 102 may be a stacked-layer structure of a silicon oxide film and a silicon nitride film. Thus, even when an impurity such as iron is included in the silicon oxide film, diffusion of this impurity to the semiconductor film 103 can be suppressed. In addition, impurity penetration from the substrate 100 can be blocked more efficiently.

Note that by forming the conductive film 160 in each of the FFS-mode liquid crystal display device shown in Embodiment Mode 3, and the IPS-mode liquid crystal display devices shown in Embodiment Mode 4 and 5, an advantageous effect which is similar to that of this embodiment mode can be obtained. In addition, in this embodiment mode, shapes of the second electrode 112 and the opening pattern 112a may be the shapes shown in Embodiment Mode 4.

By providing opening patterns having different directions like the opening patterns 112a and 112b, a plurality of regions having different moving directions of liquid crystal molecules can also be provided. That is, a multi-domain structure can be formed. By employing a multi-domain structure, a display defect of an image when the image is seen from a particular direction can be prevented. Therefore, a viewing angle can be improved.

Note that this embodiment mode shows an example of the case where the contents described in Embodiment Modes 2 to 7 are partly changed, improved, or transformed. Accordingly, the contents described in Embodiment Modes 2 to 7 can also be applied to this embodiment mode or can be combined with this embodiment mode.

Although description is made by using various drawings, one drawing is made of various components. Accordingly, another structure can also be formed by combining each component in each drawing.

Embodiment Mode 9

Figure 9A:
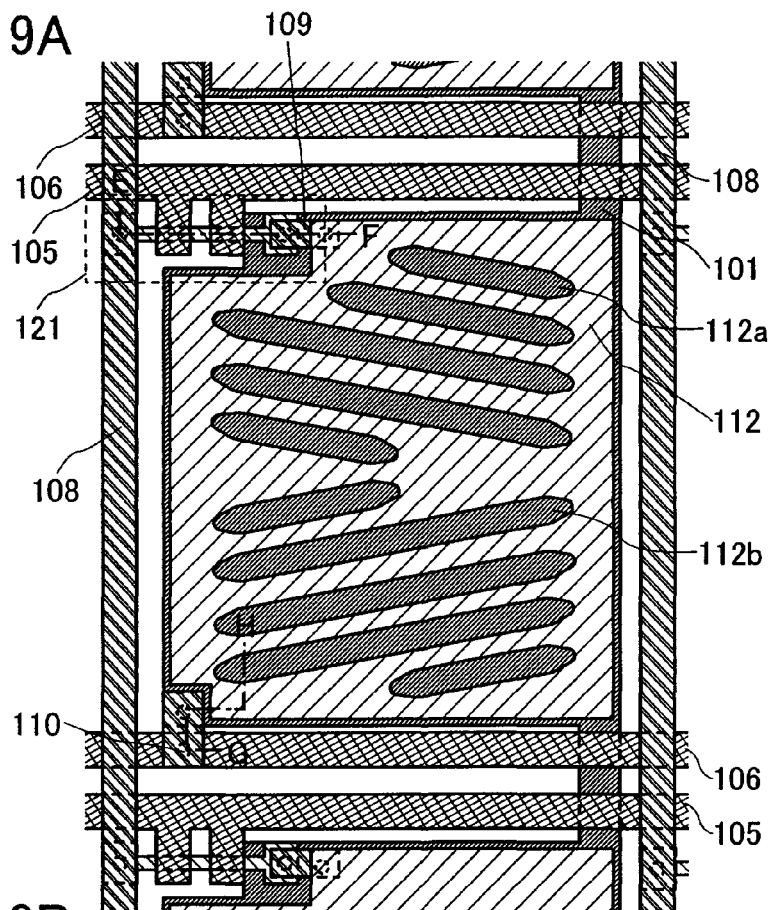
FIG. 9A is a plan view showing a structure of an FFS-mode liquid crystal display device in accordance with Embodiment Mode 9.
Figure 9B:
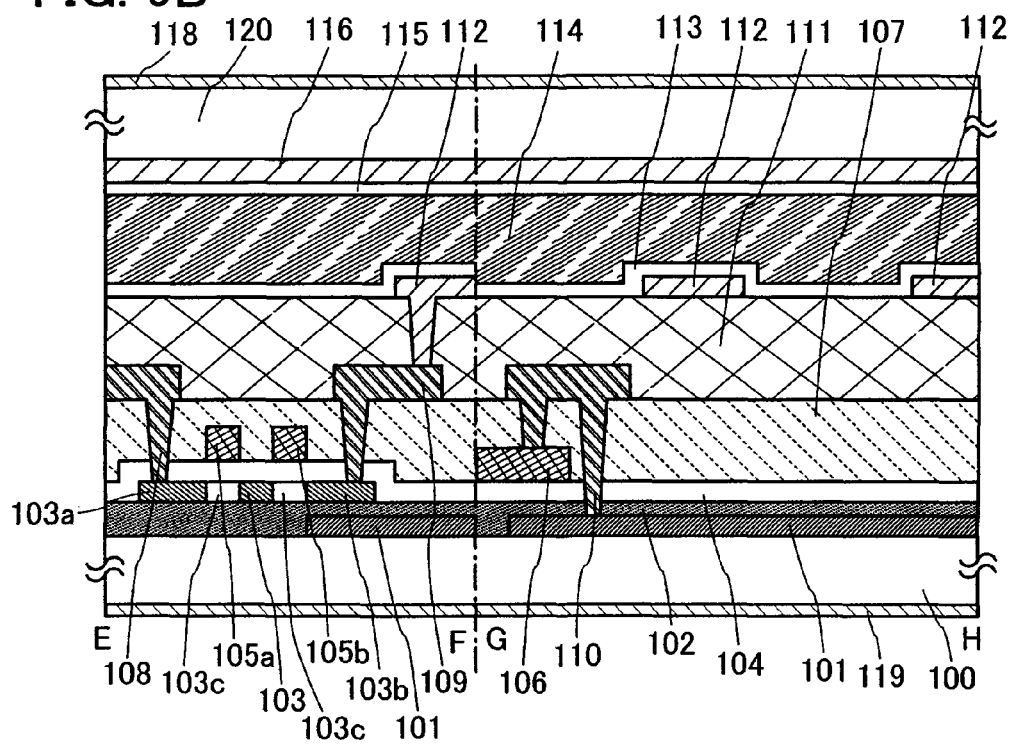
FIG. 9B is a cross-sectional view taken along a line E-F and a line G-H in FIG. 9A.

FIG. 9A is a plan view showing a structure of an FFS-mode liquid crystal display device in accordance with Embodiment Mode 9 of the invention. FIG. 9B is a cross-sectional view taken along a line E-F and a line G-H in FIG. 9A. This embodiment mode describes a structure which is almost similar to that of Embodiment Mode 2 except that a part of the first electrode 101 is extended to below the impurity region 103b in the semiconductor film 103. In addition, a manufacturing method of the liquid crystal display device in accordance with this embodiment mode is almost similar to that of Embodiment Mode 2. Therefore, the contents described in Embodiment Mode 2 can also be applied to this embodiment mode. Hereinafter, common reference numerals are used for portions having similar structures to Embodiment Mode 2 and description thereof is omitted.

Accordingly, the contents described in Embodiment Modes 2 to 8 can also be applied to this embodiment mode.

Although description is made by using various drawings, one drawing is made of various components. Accordingly, another structure can also be formed by combining each component in each drawing.

In accordance with this embodiment mode also, an advantageous effect which is similar to that of Embodiment Mode 2 can be obtained. In this embodiment mode, shapes of the second electrode 112 and the opening pattern 112a may be the shapes shown in Embodiment Mode 4. In addition, in each of the FFS-mode liquid crystal display device shown in Embodiment Mode 6 and the IPS-mode liquid crystal display device shown in Embodiment Mode 5, a part of the first electrode 101 may be located below the impurity region 103b, similarly to this embodiment mode.

In addition, in each of the FFS-mode liquid crystal display devices shown in Embodiment Modes 3 and 7, and the IPS-mode liquid crystal display device shown in Embodiment Mode 4, a part of the first electrode 101 may be located below the impurity region 103b, similarly to this embodiment mode. Thus, since a voltage of the first electrode 101 is the same as a voltage of the impurity region 103b, the liquid crystal display device is hardly affected by noise or the like so that the voltage of the impurity region 103b is stabilized. Accordingly, since an interval between the opening patterns 112a can be reduced and an electric field is applied smoothly, liquid crystal molecules can be easily controlled. Further, since the voltage can be lowered by reducing the interval between the opening patterns 112a, power consumption can be reduced. Moreover, since electric field crowding can be relieved, reliability of the thin film transistor 121 can also be improved.

In addition, in this embodiment mode, a portion located below the impurity region 103b in the first electrode 101 may be separated from a main body of the first electrode 101 and be electrically connected to the conductive film for connecting 109. Thus, the advantageous effect can also be obtained. That is, the liquid crystal molecules are easily controlled, power consumption is reduced, and reliability of the thin film transistor 121 is improved.

Embodiment Mode 10

Figure 10A:
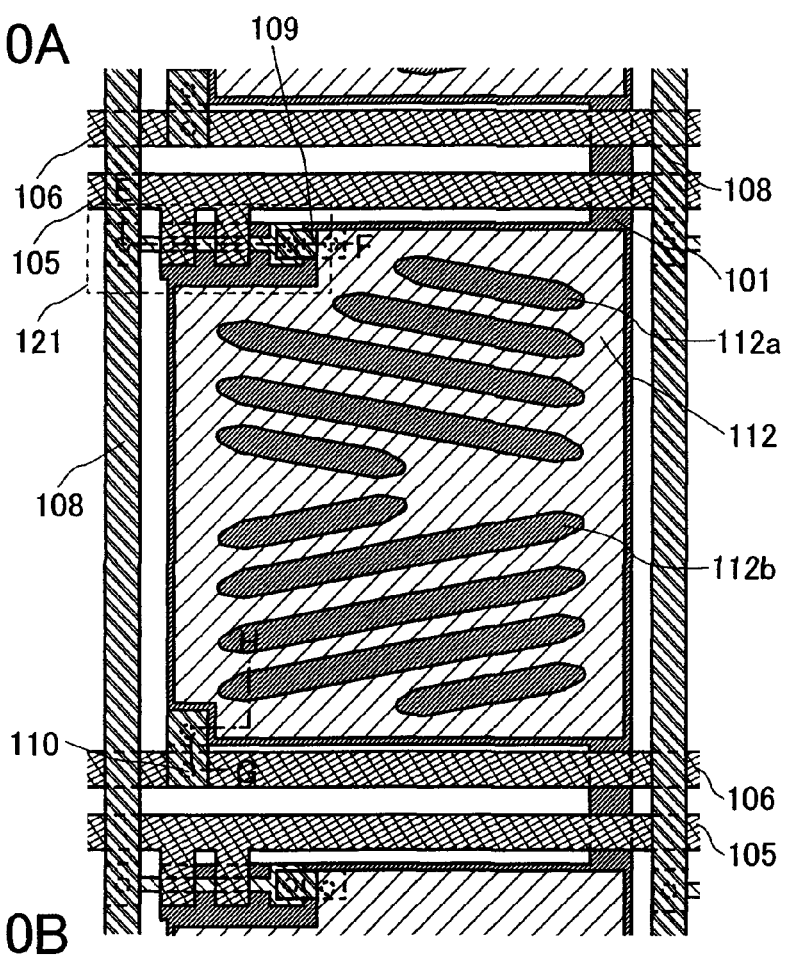
FIG. 10A is a plan view showing a structure of an FFS-mode liquid crystal display device in accordance with Embodiment Mode 10.
Figure 10B:
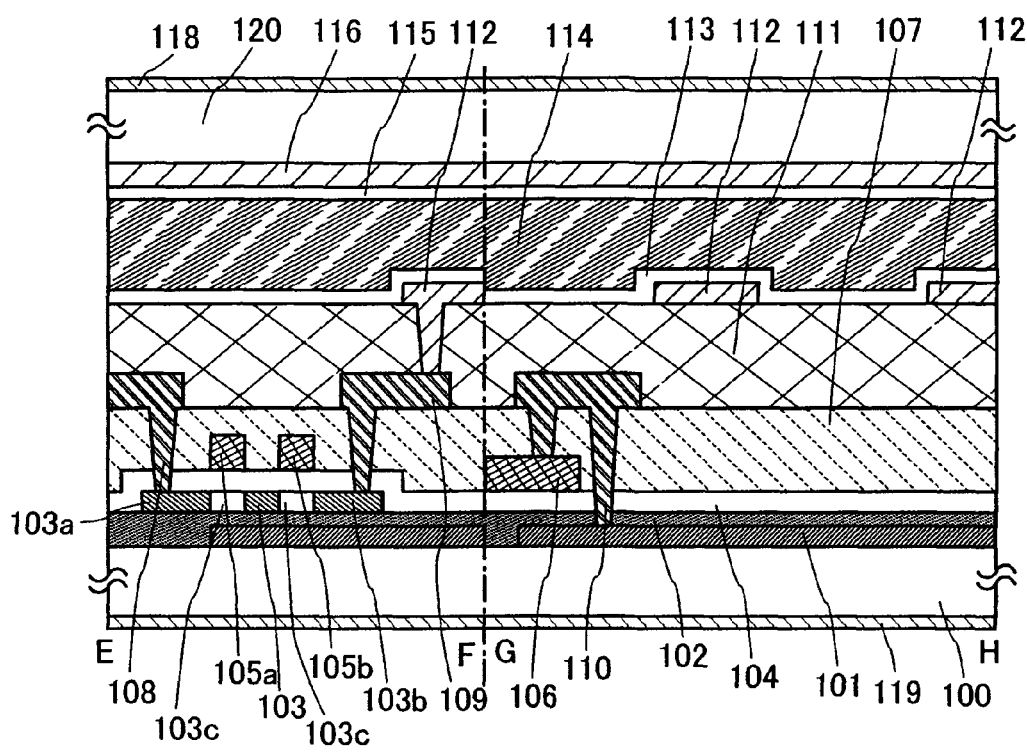
FIG. 10B is a cross-sectional view taken along a line E-F and a line G-H in FIG. 10A.

FIG. 10A is a plan view showing a structure of an FFS-mode liquid crystal display device in accordance with Embodiment Mode 10 of the invention. FIG. 10B is a cross-sectional view taken along a line E-F and a line G-H in FIG. 1A. This embodiment mode describes a structure which is almost similar to that of Embodiment Mode 9 except that a part of the first electrode 101 is extended to below each of the impurity region 103b, two channel regions 103c, and an impurity region between the channel regions 103c in the semiconductor film 103. In addition, a manufacturing method of the liquid crystal display device in accordance with this embodiment mode is almost similar to that of Embodiment Mode 9. Therefore, the contents described in Embodiment Mode 9 can also be applied to this embodiment mode. Hereinafter, common reference numerals are used for portions having similar structures to Embodiment Mode 9 and description thereof is omitted.

Accordingly, the contents described in Embodiment Modes 2 to 9 can also be applied to this embodiment mode.

Although description is made by using various drawings, one drawing is made of various components. Accordingly, another structure can also be formed by combining each component in each drawing.

In accordance with this embodiment mode also, an advantageous effect which is similar to that of Embodiment Mode 9 can be obtained. In addition, in each of the FFS-mode liquid crystal display device shown in Embodiment Mode 6 and the IPS-mode liquid crystal display device shown in Embodiment Mode 5, a part of the first electrode 101 may also be extended to below each of the impurity region 103b, the two channel regions 103c, and the impurity region between the channel regions 103c, similarly to this embodiment mode.

Note that in this embodiment mode, shapes of the second electrode 112 and the opening pattern 112a may be the shapes shown in Embodiment Mode 4.

In addition, in each of the FFS-mode liquid crystal display devices shown in Embodiment Mode 3 and 7, and the IPS-mode liquid crystal display device shown in Embodiment Mode 4, a part of the first electrode 101 may also be extended to below each of the impurity region 103b, the two channel regions 103c, and the impurity region between the channel regions 103c, similarly to this embodiment mode. Thus, since a voltage of the first electrode 101 is the same as a voltage of the impurity region 103b, the liquid crystal display device is hardly affected by noise or the like so that the voltage of the impurity region 103b is stabilized. Accordingly, since an interval between the opening patterns 112a can be reduced and an electric field is applied smoothly, liquid crystal molecules can be easily controlled. Further, since the voltage can be lowered by reducing the interval between the opening patterns 112a, power consumption can be reduced. Moreover, since electric field crowding can be relieved, reliability of the thin film transistor 121 can also be improved.

In addition, in this embodiment mode, a portion located below each of the impurity region 103b, the two channel regions 103c, and the impurity region between the channel regions 103c in the first electrode 101 may be separated from the main body of the first electrode 101 and be electrically connected to the conductive film for connecting 109. Thus, the advantageous effect can also be obtained. That is, the liquid crystal molecules are easily controlled, power consumption is reduced, and reliability of the thin film transistor 121 is improved.

Embodiment Mode 11

Figure 11A:
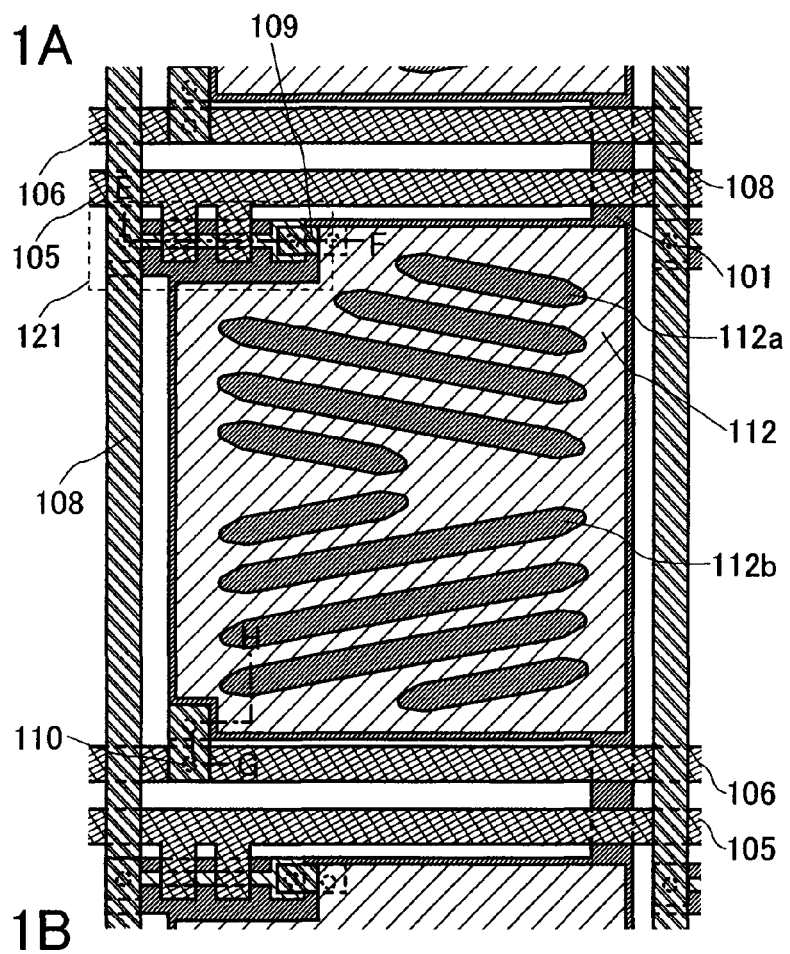
FIG. 11A is a plan view showing a structure of an FFS-mode liquid crystal display device in accordance with Embodiment Mode 11.
Figure 11B:
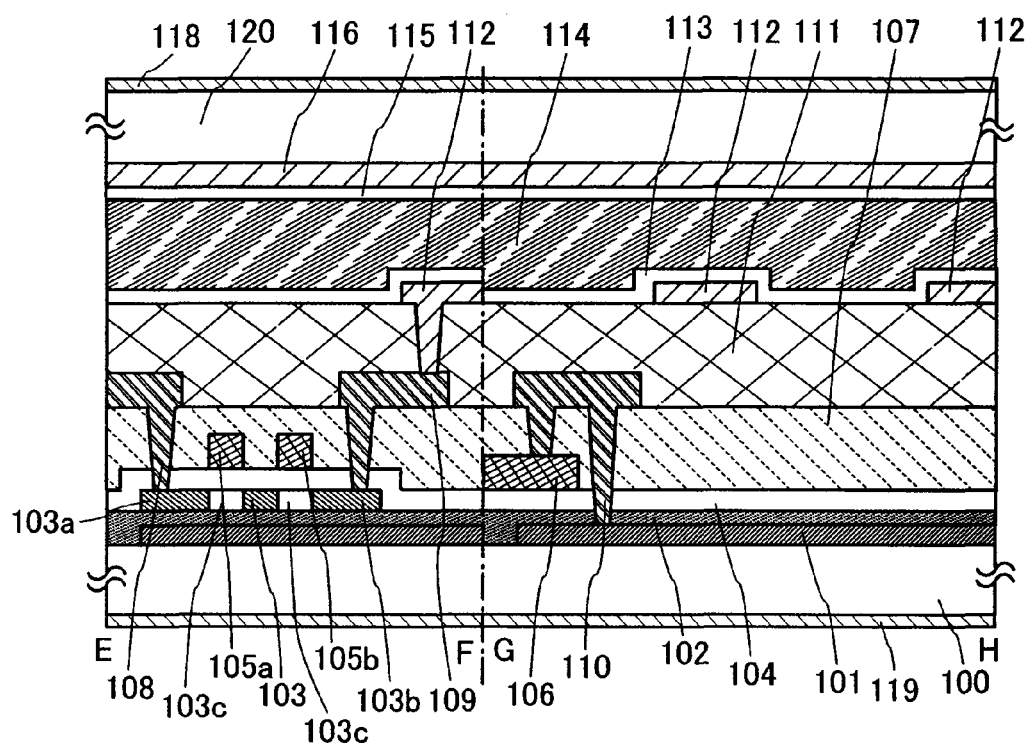
FIG. 11B is a cross-sectional view taken along a line E-F and a line G-H in FIG. 11A.

FIG. 11A is a plan view showing a structure of an FFS-mode liquid crystal display device in accordance with Embodiment Mode 11 of the invention. FIG. 11B is a cross-sectional view taken along a line E-F and a line G-H in FIG. 11A. This embodiment mode describes a structure which is almost similar to that of Embodiment Mode 10 except that a part of the first electrode 101 is extended to below the whole surface of the semiconductor film 103. In addition, a manufacturing method of the liquid crystal display device in accordance with this embodiment mode is almost similar to that of Embodiment Mode 10. Therefore, the contents described in Embodiment Mode 10 can also be applied to this embodiment mode. Hereinafter, common reference numerals are used for portions having similar structures to Embodiment Mode 10 and description thereof is omitted.

Accordingly, the contents described in Embodiment Modes 2 to 10 can also be applied to this embodiment mode.

Although description is made by using various drawings, one drawing is made of various components. Accordingly, another structure can also be formed by combining each component in each drawing.

In accordance with this embodiment mode also, an advantageous effect which is similar to that of Embodiment Mode 10 can be obtained. In addition, by an action which is similar to that of Embodiment Mode 8, even when the insulating film 102 is formed of a single-layer of a silicon oxide film, impurity diffusion from the substrate 100 to the semiconductor film 103 can be sufficiently suppressed. In addition, by forming the insulating film 102 of the single layer of the silicon oxide film, the operation of the thin film transistor 121 can be stabilized.

Note that in this embodiment mode, shapes of the second electrode 112 and the opening pattern 112a may be the shapes shown in Embodiment Mode 4. In addition, in each of the FFS-mode liquid crystal display device shown in Embodiment Mode 6 and the IPS-mode liquid crystal display device shown in Embodiment Mode 5, a part of the first electrode 101 may also be extended to below the whole of the semiconductor film 103, similarly to this embodiment mode.

In addition, in each of the FFS-mode liquid crystal display devices shown in Embodiment Mode 3 and 7, and the IPS-mode liquid crystal display device shown in Embodiment Mode 4, a part of the first electrode 101 may also be extended to below each of the impurity region 103b, the two channel regions 103c, and the impurity region between the channel regions 103c, similarly to this embodiment mode. Thus, since a voltage of the first electrode 101 is the same as a voltage of the impurity region 103b, the liquid crystal display device is hardly affected by noise or the like so that the voltage of the impurity region 103b is stabilized. Accordingly, since an interval between the opening patterns 112a can be reduced and an electric field is applied smoothly, liquid crystal molecules can be easily controlled. Further, since the voltage can be lowered by reducing the interval between the opening patterns 112a, power consumption can be reduced. Moreover, since electric field crowding can be relieved, reliability of the thin film transistor 121 can also be improved.

In addition, in this embodiment mode, a portion located below the semiconductor film 103 in the first electrode 101 may be separated from the main body of the first electrode 101 and be electrically connected to the conductive film for connecting 109. Thus, the advantageous effect can also be obtained. That is, the liquid crystal molecules are easily controlled, power consumption is reduced, and reliability of the thin film transistor 121 is improved.

Embodiment Mode 12

Figure 12A:
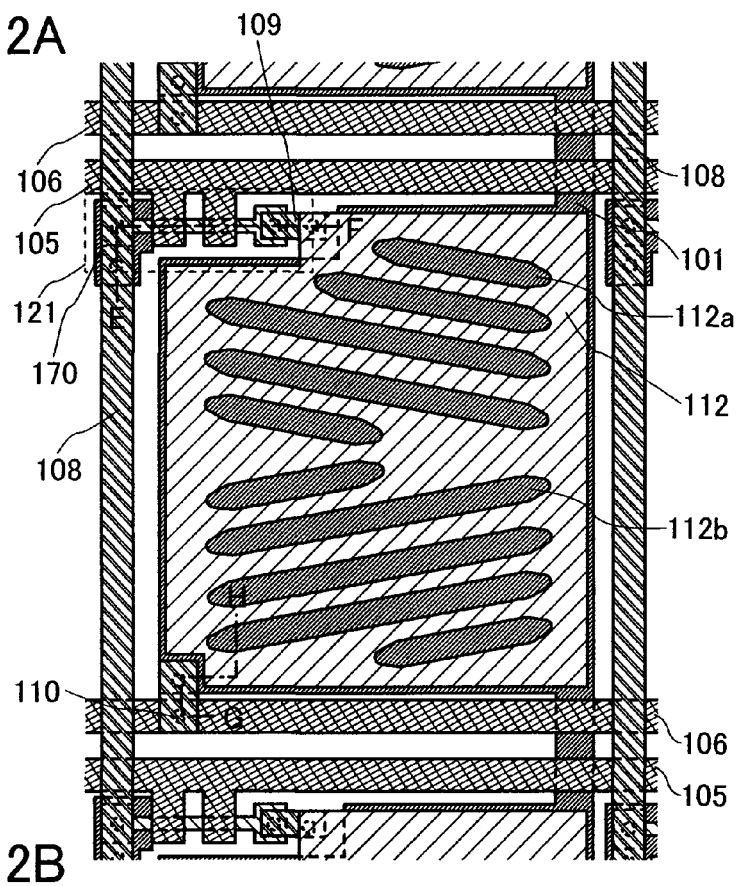
FIG. 12A is a plan view showing a structure of an FFS-mode liquid crystal display device in accordance with Embodiment Mode 12.
Figure 12B:
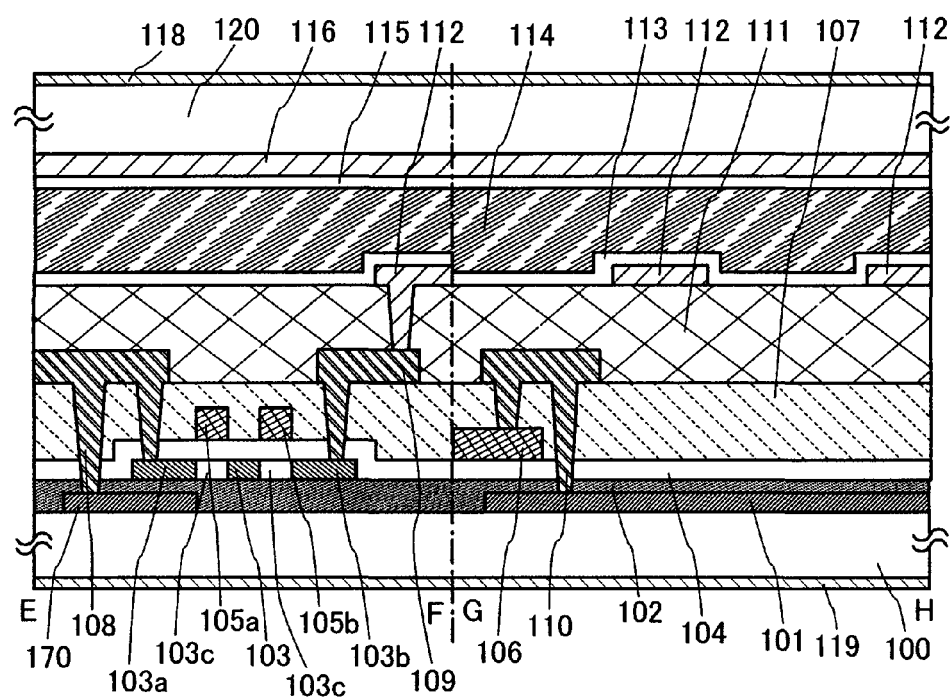
FIG. 12B is a cross-sectional view taken along a line E-F and a line G-H in FIG. 12A.

FIG. 12A is a plan view showing a structure of an FFS-mode liquid crystal display device in accordance with Embodiment Mode 12 of the invention. FIG. 12B is a cross-sectional view taken along a line E-F and a line G-H in FIG. 12A. This embodiment mode describes a structure which is almost similar to that of Embodiment Mode 2 except for the following points. A conductive film 170 located below the impurity region 103a which is electrically connected to the source wiring 108 in semiconductor film 103 is formed over the substrate 100; and the conductive film 170 is electrically connected to the source wiring 108. In addition, a manufacturing method of the liquid crystal display device in accordance with this embodiment mode is almost similar to that of Embodiment Mode 2 except that the conductive film 170 is formed in the same step as the first electrode 101. Therefore, the contents described in Embodiment Mode 2 can also be applied to this embodiment mode. Hereinafter, common reference numerals are used for portions having similar structures to Embodiment Mode 2 and description thereof is omitted.

Accordingly, the contents described in Embodiment Modes 2 to 11 can also be applied to this embodiment mode.

Although description is made by using various drawings, one drawing is made of various components. Accordingly, another structure can also be formed by combining each component in each drawing.

A contact hole located over the conductive film 170 is formed in the first interlayer insulating film 107, the gate insulating film 104, and the insulating film 102. The source wiring 108 is electrically connected to the conductive film 170 by being partially embedded in this contact hole.

In accordance with this embodiment mode also, an advantageous effect which is similar to that of Embodiment Mode 2 can be obtained. The same voltage as that of the impurity region 103a is also applied to the conductive film 170 located below the impurity region 103a which is electrically connected to the source wiring 108. Accordingly, the voltage of the impurity region 103a is stabilized.

Note that in each of the FFS-mode liquid crystal display devices shown in Embodiment Modes 3, 6, 7, 9, and 10, and the IPS-mode liquid crystal display devices shown in Embodiment Modes 4 and 5, the conductive film 170 which is similar to that of this embodiment mode may also be formed. Thus, an advantageous effect which is similar to that of this embodiment mode can be obtained, for example, the voltage of the impurity region 103a can be stabilized. In addition, in this embodiment mode, shapes of the second electrode 112 and the opening pattern 112a may be the shapes shown in Embodiment Mode 4.

Embodiment Mode 13

Figure 13A:
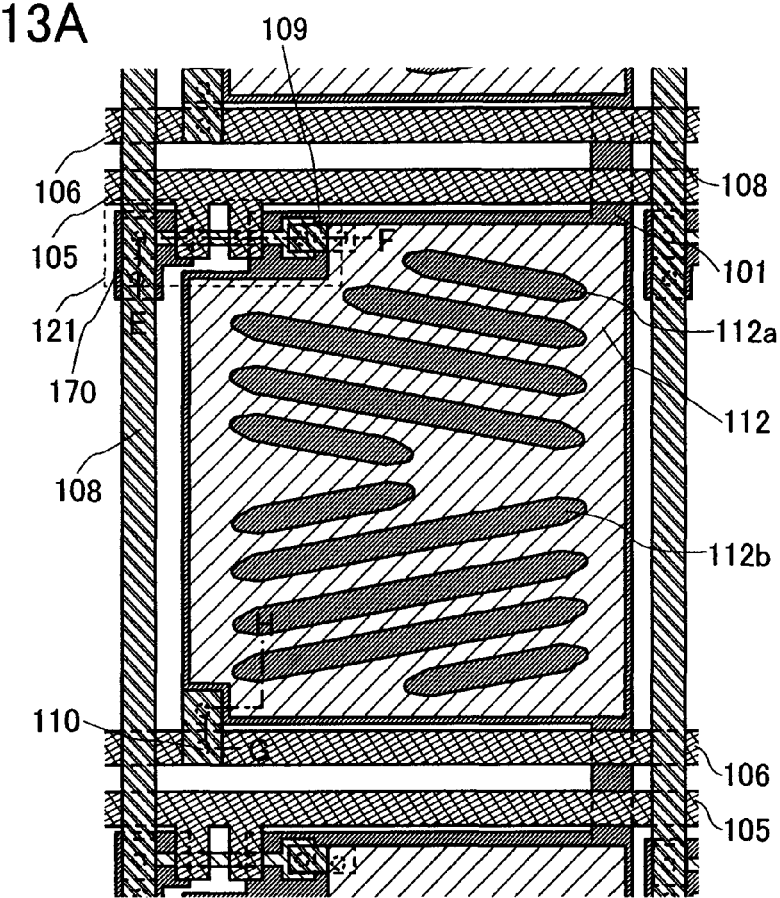
FIG. 13A is a plan view showing a structure of an FFS-mode liquid crystal display device in accordance with Embodiment Mode 13.
Figure 13B:
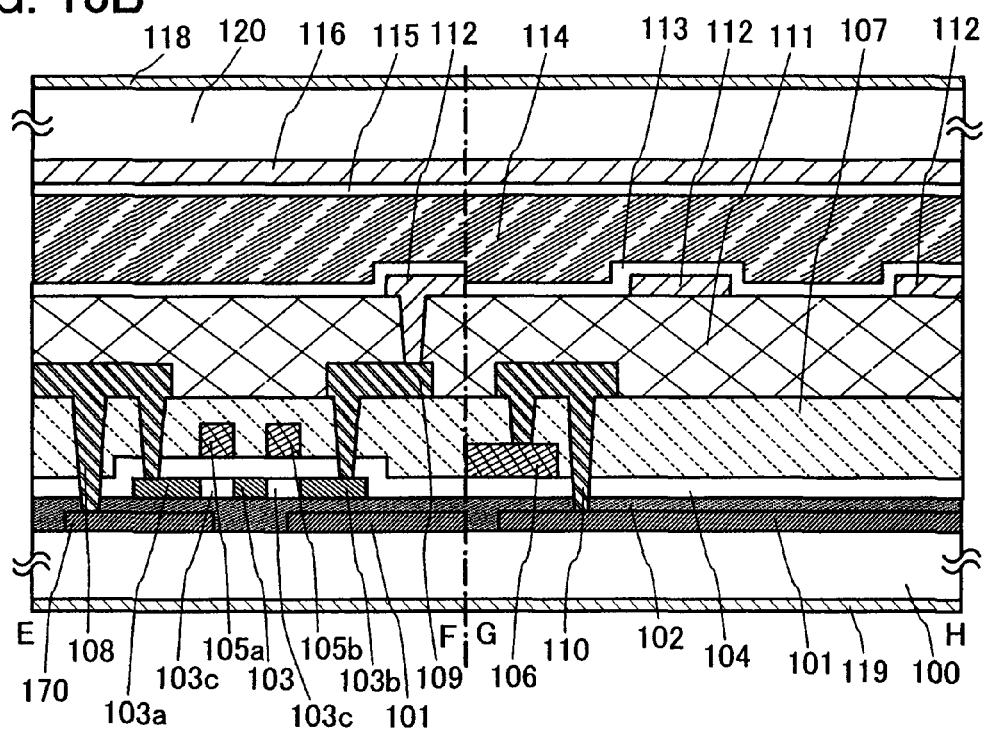
FIG. 13B is a cross-sectional view taken along a line E-F and a line G-H in FIG. 13A.

FIG. 13A is a plan view showing a structure of an FFS-mode liquid crystal display device in accordance with Embodiment Mode 13 of the invention. FIG. 13B is a cross-sectional view taken along a line E-F and a line G-H in FIG. 13A. This embodiment mode describes a structure which is almost similar to that of Embodiment Mode 12 except for the following points. The conductive film 170 is formed below the channel region 103c which is adjacent to the impurity region 103a and the impurity region 103a in the semiconductor film 103; and a part of the first electrode 101 is formed below the channel region 103c which is adjacent to the impurity region 103b and the impurity region 103b in the semiconductor film 103. In addition, a manufacturing method of the liquid crystal display device in accordance with this embodiment mode is almost similar to that of Embodiment Mode 12. Therefore, the contents described in Embodiment Mode 12 can also be applied to this embodiment mode. Hereinafter, common reference numerals are used for portions having similar structures to Embodiment Mode 12 and description thereof is omitted.

Accordingly, the contents described in Embodiment Modes 2 to 12 can also be applied to this embodiment mode.

Although description is made by using various drawings, one drawing is made of various components. Accordingly, another structure can also be formed by combining each component in each drawing. In accordance with this embodiment mode also, advantageous effects which are similar to those of Embodiment Modes 9 and 12 can be obtained. Note that in each of the FFS-mode liquid crystal display devices shown in Embodiment Mode 3, 6, and 7, and the IPS-mode liquid crystal display devices shown in Embodiment Mode 4 and 5, the conductive film 170 which is similar to that of this embodiment mode may also be formed and a shape of the first electrode 101 may also be similar to that of this embodiment mode. Thus, an advantageous effect which is similar to that of this embodiment mode can be obtained. In addition, in this embodiment mode, shapes of the second electrode 112 and the opening pattern 112*a* may be the shapes shown in Embodiment Mode 4.

Embodiment Mode 14

Figure 14A:
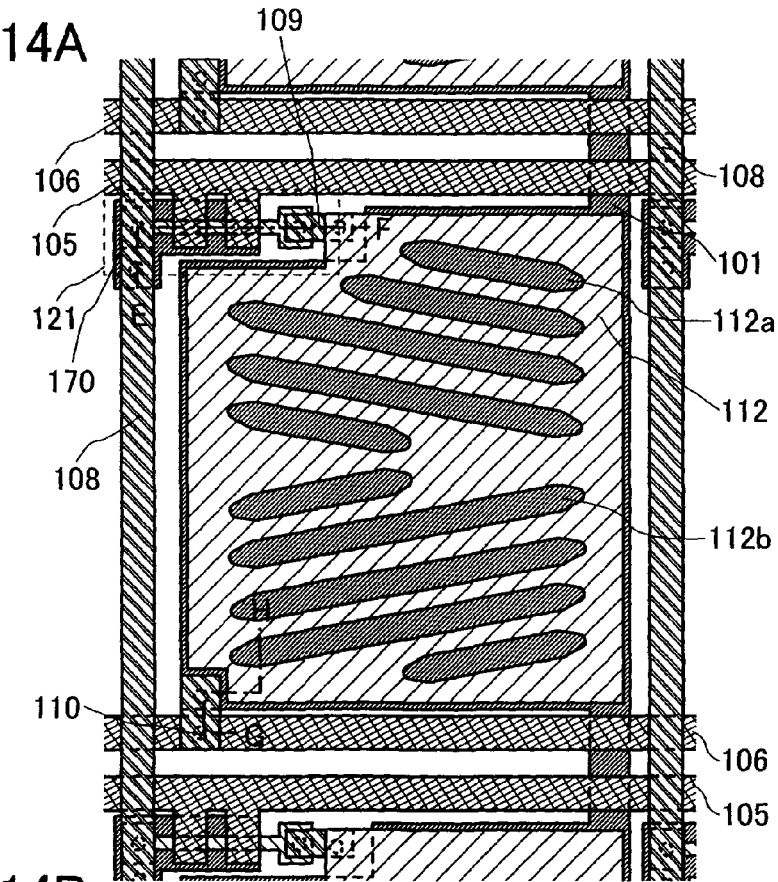
FIG. 14A is a plan view showing a structure of an FFS-mode liquid crystal display device in accordance with Embodiment Mode 14.
Figure 14B:
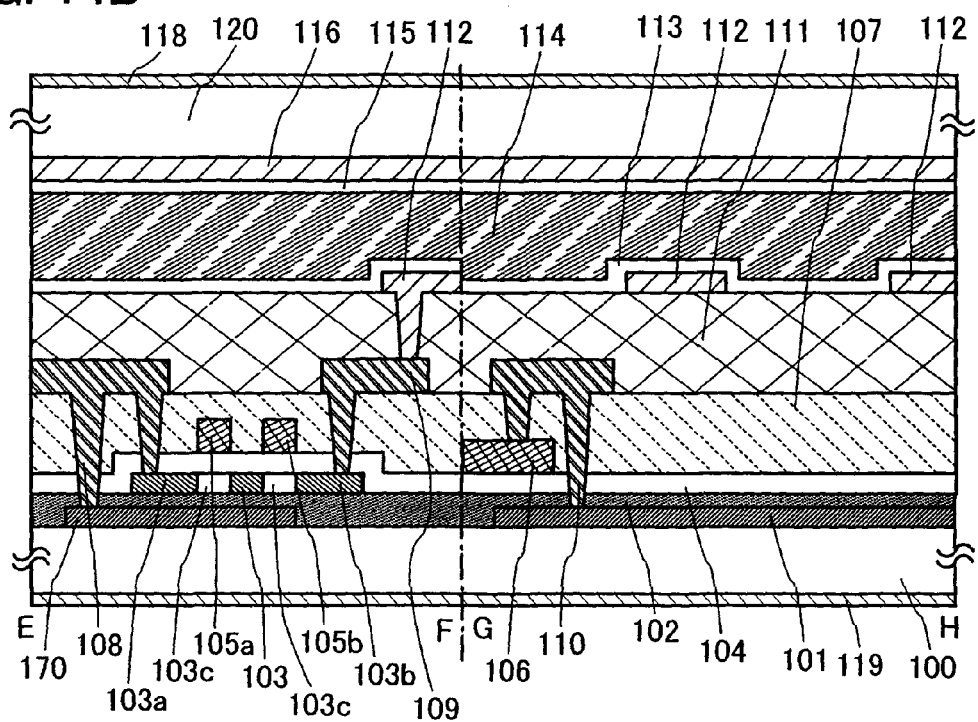
FIG. 14B is a cross-sectional view taken along a line E-F and a line G-H in FIG. 14A.

FIG. 14A is a plan view showing a structure of an FFS-mode liquid crystal display device in accordance with Embodiment Mode 14 of the invention. FIG. 14B is a cross-sectional view taken along a line E-F and a line G-H in FIG. 14A. This embodiment mode describes a structure which is almost similar to that of Embodiment Mode 12 except that the conductive film 170 is formed below each of the impurity region 103*a*, two channel regions 103*c*, and the impurity region between the channel regions 103*c* in the semiconductor film 103. In addition, a manufacturing method of the liquid crystal display device in accordance with this embodiment mode is almost similar to that of Embodiment Mode 12. Therefore, the contents described in Embodiment Mode 12 can also be applied to this embodiment mode. Hereinafter, common reference numerals are used for portions having similar structures to Embodiment Mode 12 and description thereof is omitted.

Accordingly, the contents described in Embodiment Modes 2 to 13 can also be applied to this embodiment mode.

Although description is made by using various drawings, one drawing is made of various components. Accordingly, another structure can also be formed by combining each component in each drawing.

An advantageous effect which is similar to that of Embodiment Mode 12 can be obtained In accordance with this embodiment mode also, for example, the voltage of the impurity region 103*a* can be stabilized. Note that in each of the FFS-mode liquid crystal display devices shown in Embodiment Modes 3, 6, 7, and 9, and the IPS-mode liquid crystal display devices shown in Embodiment Modes 4 and 5, the conductive film 170 which is similar to that of this embodiment mode may also be formed. Thus, an advantageous effect which is similar to that of this embodiment mode can be obtained, for example, the voltage of the impurity region 103*a* can be stabilized. In addition, in this embodiment mode, shapes of the second electrode 112 and the opening pattern 112*a* may be the shapes shown in Embodiment Mode 4.

Embodiment Mode 15

Figure 15A:
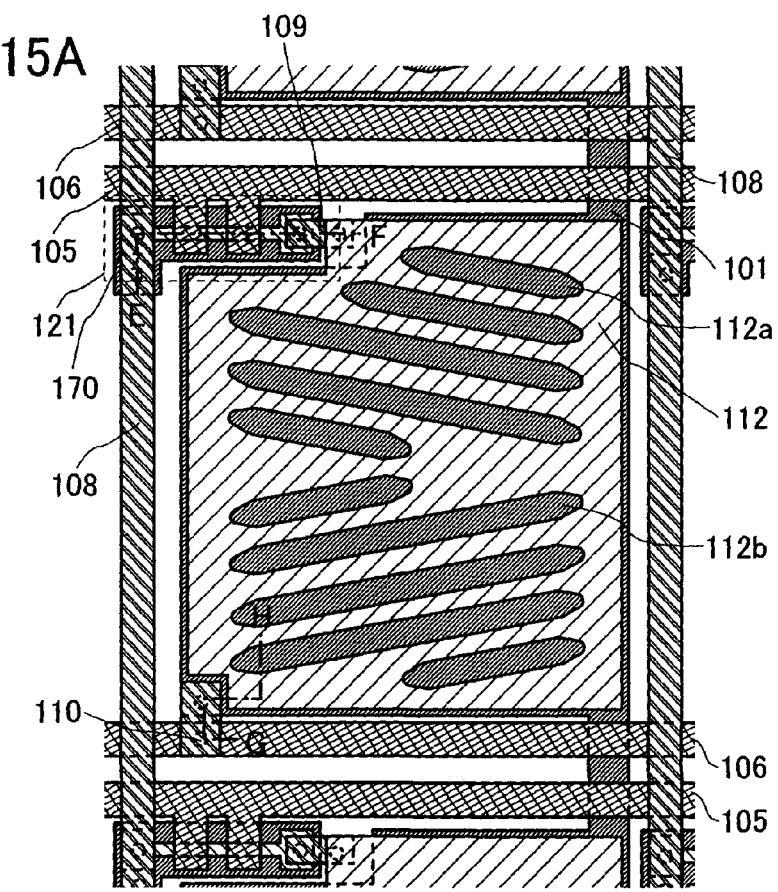
FIG. 15A is a plan view showing a structure of an FFS-mode liquid crystal display device in accordance with Embodiment Mode 15.
Figure 15B:
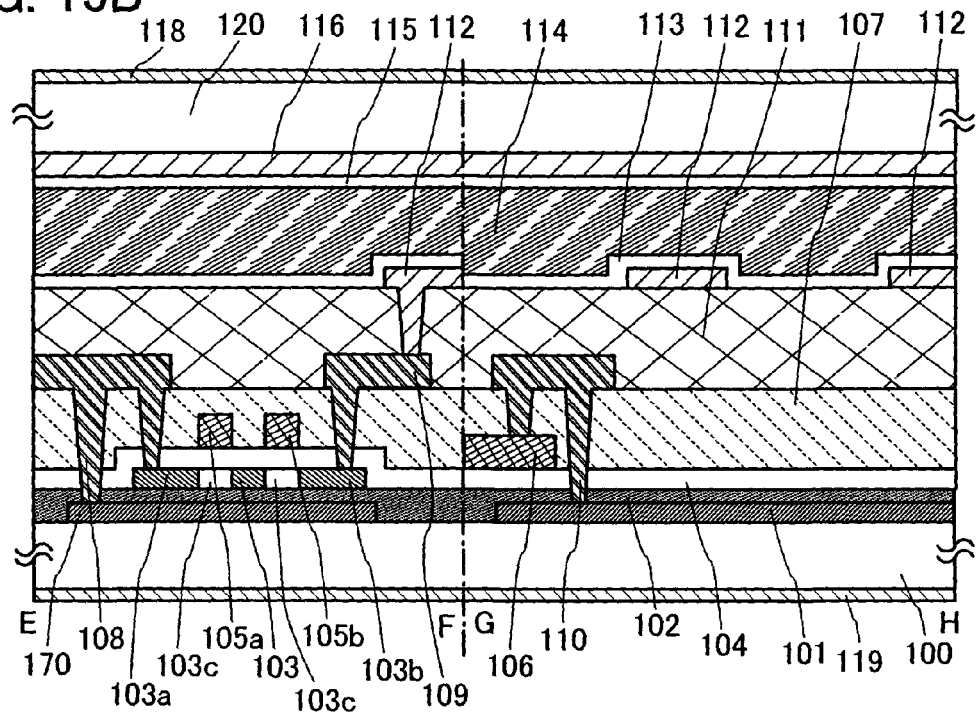
FIG. 15B is a cross-sectional view taken along a line E-F and a line G-H in FIG. 15A.

FIG. 15A is a plan view showing a structure of an FFS-mode liquid crystal display device in accordance with Embodiment Mode 15 of the invention. FIG. 15B is a cross-sectional view taken along a line E-F and a line G-H in FIG. 15A. This embodiment mode describes a structure which is almost similar to that of Embodiment Mode 14 except that the conductive film 170 is formed below the whole surface of the semiconductor film 103. In addition, a manufacturing method of the liquid crystal display device in accordance with this embodiment mode is almost similar to that of Embodiment Mode 14. Hereinafter, common reference numerals are used for portions having similar structures to Embodiment Mode 14 and description thereof is omitted.

Accordingly, the contents described in Embodiment Modes 2 to 14 can also be applied to this embodiment mode.

Although description is made by using various drawings, one drawing is made of various components. Accordingly, another structure can also be formed by combining each component in each drawing.

An advantageous effect which is similar to that of Embodiment Mode 14 can be obtained In accordance with this embodiment mode also, for example, the voltage of the impurity region 103*a* can be stabilized. Note that in each of the FFS-mode liquid crystal display devices shown in Embodiment Modes 3, 6, and 7, and the IPS-mode liquid crystal display devices shown in Embodiment Modes 4 and 5, the conductive film 170 which is similar to that of this embodiment mode may also be formed. Thus, an advantageous effect which is similar to that of this embodiment mode can be obtained, for example, the voltage of the impurity region 103*a* can be stabilized. In addition, in this embodiment mode, shapes of the second electrode 112 and the opening pattern 112*a* may be the shapes shown in Embodiment Mode 4.

Embodiment Mode 16

Figure 16A:
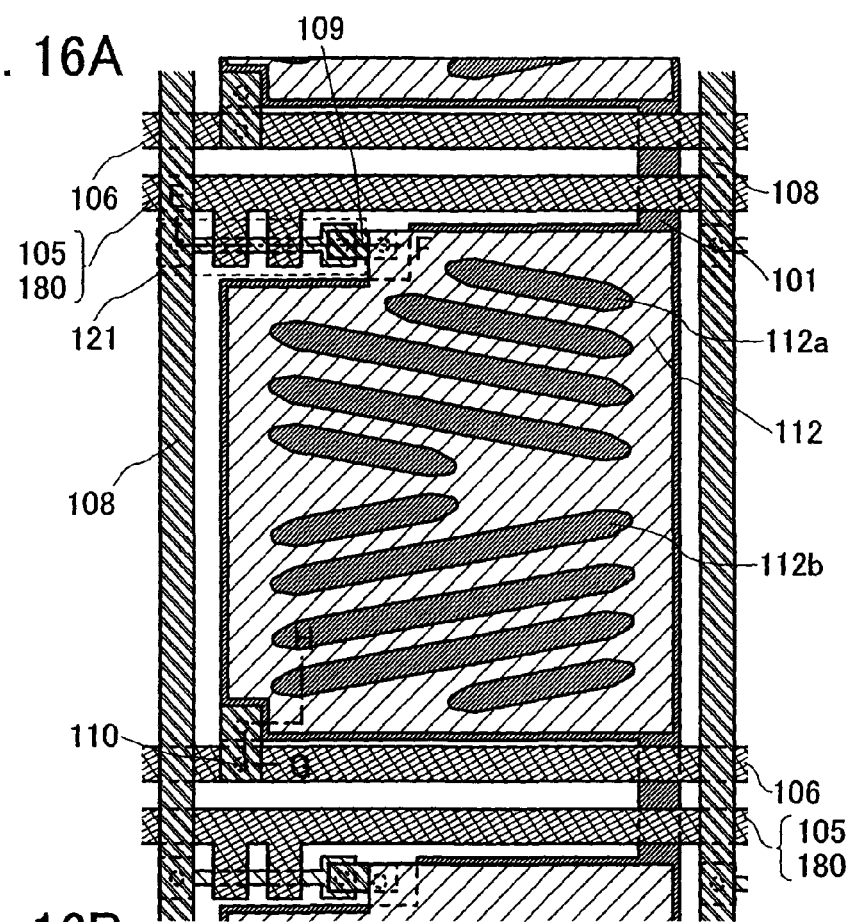
FIG. 16A is a plan view showing a structure of an FFS-mode liquid crystal display device in accordance with Embodiment Mode 16.
Figure 16B:
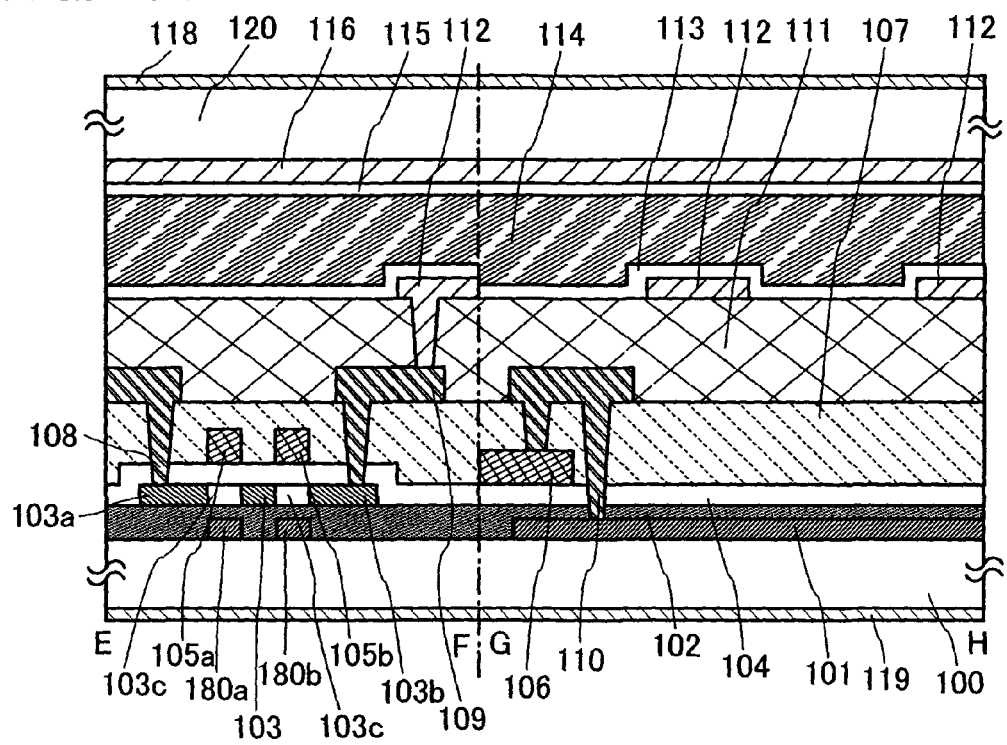
FIG. 16B is a cross-sectional view taken along a line E-F and a line G-H in FIG. 16A.

FIG. 16A is a plan view showing a structure of an FFS-mode liquid crystal display device in accordance with Embodiment Mode 16 of the invention. FIG. 16B is a cross-sectional view taken along a line E-F and a line G-H in FIG. 16A. This embodiment mode describes a structure which is almost similar to that of Embodiment Mode 2 except that a second gate wiring 180, and second gate electrodes 180*a* and 180*b* are formed over the substrate 100. When seen from a direction which is almost perpendicular to the substrate 100, the second gate wiring 180, and the second gate electrodes 180*a* and 180*b* almost overlap with the gate wiring 105, and the gate electrodes 105*a* and 105*b*, respectively.

In addition, a manufacturing method of the liquid crystal display device in accordance with this embodiment mode is almost similar to that of Embodiment Mode 2 except that the second gate wiring 180, and the second gate electrodes 180*a* and 180*b* are formed in the same step as the first electrode 101. Accordingly, the contents described in Embodiment Mode 2 can also be applied to this embodiment mode. Hereinafter, common reference numerals are used for portions having similar structures to Embodiment Mode 2 and description thereof is omitted.

Accordingly, the contents described in Embodiment Modes 2 to 15 can also be applied to this embodiment mode.

Although description is made by using various drawings, one drawing is made of various components. Accordingly, another structure can also be formed by combining each component in each drawing.

In accordance with this embodiment mode also, an advantageous effect which is similar to that of Embodiment Mode 2 can be obtained. In addition, two channel regions 103*c* of the semiconductor film 103 are sandwiched between the gate electrode 105*a* and the second gate electrode 180*a* or between the gate electrode 105b and the second gate electrode 180b. Accordingly, since each channel region is substantially doubled, the amount of current flowing through the thin film transistor 121 is increased.

Note that in each of the FFS-mode liquid crystal display devices shown in Embodiment Modes 3, 6, 7, 9, and 12, and the IPS-mode liquid crystal display devices shown in Embodiment Modes 4 and 5, the second gate wiring 180, and the second gate electrodes 180a and 180b may also be formed in the same step as the first electrode 101, similarly to this embodiment mode. Thus, an advantageous effect which is similar to that of this embodiment mode can be obtained. In addition, in this embodiment mode, shapes of the second electrode 112 and the opening pattern 112a may be the shapes shown in Embodiment Mode 4.

Embodiment Mode 17

Figure 17A:
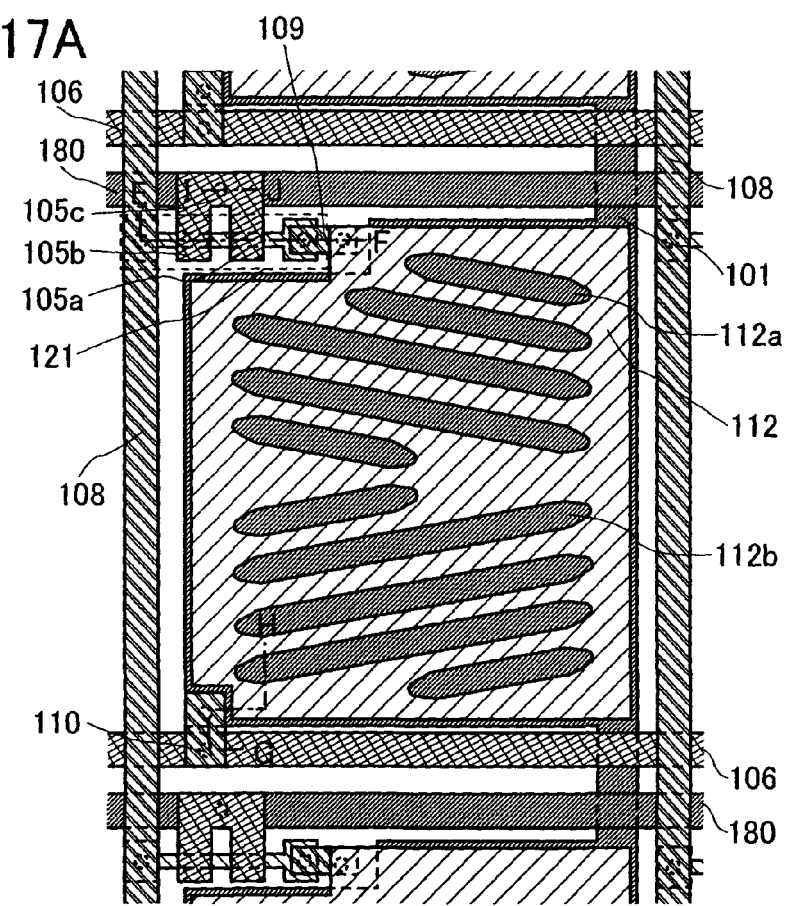
FIG. 17A is a plan view showing a structure of an FFS-mode liquid crystal display device in accordance with Embodiment Mode 17.
Figure 17B:
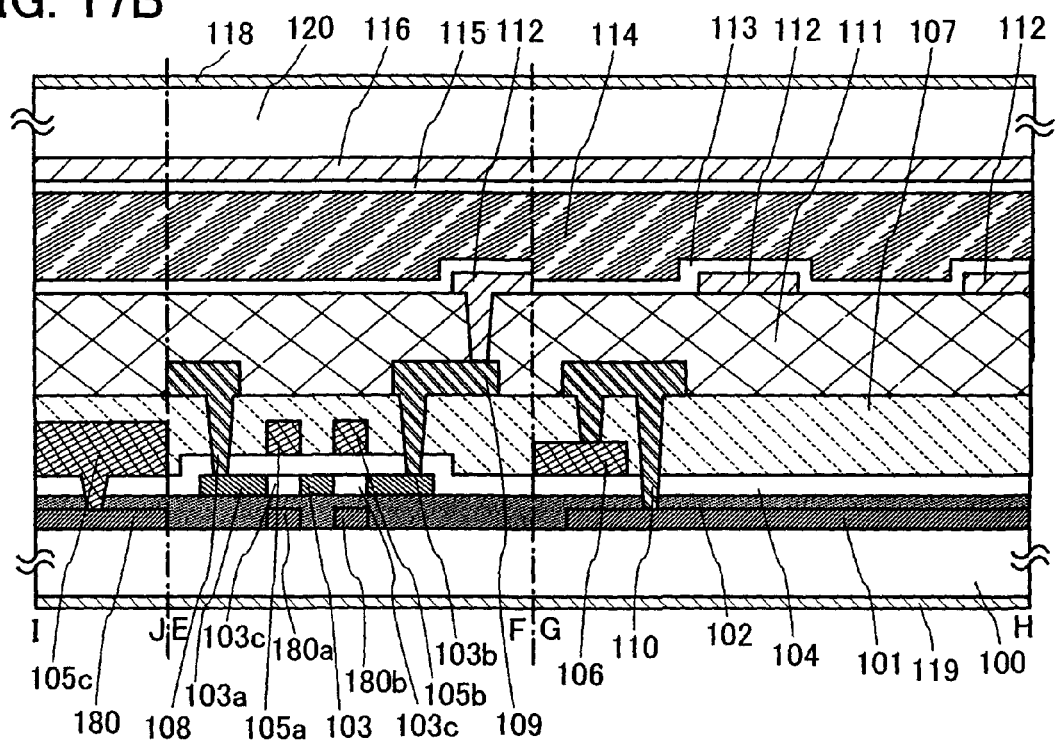
FIG. 17B is a cross-sectional view taken along a line E-F, a line G-H, a line I-J in FIG. 17A.

FIG. 17A is a plan view showing a structure of an FFS-mode liquid crystal display device in accordance with Embodiment Mode 17 of the invention. FIG. 17B is a cross-sectional view taken along a line E-F, a line G-H, and a line I-J in FIG. 17A. This embodiment mode describes a structure which is almost similar to that of Embodiment Mode 16 except that the gate wiring 105 is not formed and the gate electrodes 105a and 105b are electrically connected to the second gate wiring 180 through a wiring for connecting 105c. Accordingly, the contents described in Embodiment Mode 16 can also be applied to this embodiment mode. The wiring for connecting 105c is formed in the same wiring layer as the gate electrodes 105a and 105b.

Accordingly, the contents described in Embodiment Modes 2 to 16 can also be applied to this embodiment mode.

Although description is made by using various drawings, one drawing is made of various components. Accordingly, another structure can also be formed by combining each component in each drawing.

A contact hole located over the second gate wiring 180 is formed in the insulating film 102 and the gate insulating film 104. The wiring for connecting 105c is electrically connected to the second gate wiring 180 by being partially embedded in this contact hole.

In addition, a manufacturing method of the liquid crystal display device in accordance with this embodiment mode is almost similar to that of Embodiment Mode 2 except that the wiring for connecting 105c is formed in the same step as the gate electrodes 105a and 105b. Hereinafter, common reference numerals are used for portions having similar structures to Embodiment Mode 2 and description thereof is omitted.

In accordance with this embodiment mode also, an advantageous effect which is similar to that of Embodiment Mode 16 can be obtained. Note that in each of the FFS-mode liquid crystal display devices shown in Embodiment Modes 3, 6, 7, 9, and 12, and the IPS-mode liquid crystal display devices shown in Embodiment Modes 4 and 5, a structure may be employed in which the second gate wiring 180 and the second gate electrodes 180a and 180b are formed in the same steps as the first electrode 101, and the gate wiring 105 is not formed and the gate electrodes 105a and 105b are electrically connected to the second gate wiring 180 through the wiring for connecting 105c, similarly to this embodiment mode. Thus, an advantageous effect which is similar to that of this embodiment mode can be obtained. In addition, in this embodiment mode, shapes of the second electrode 112 and the opening pattern 112a may be the shapes shown in Embodiment Mode 4.

Embodiment Mode 18

Figure 18A:
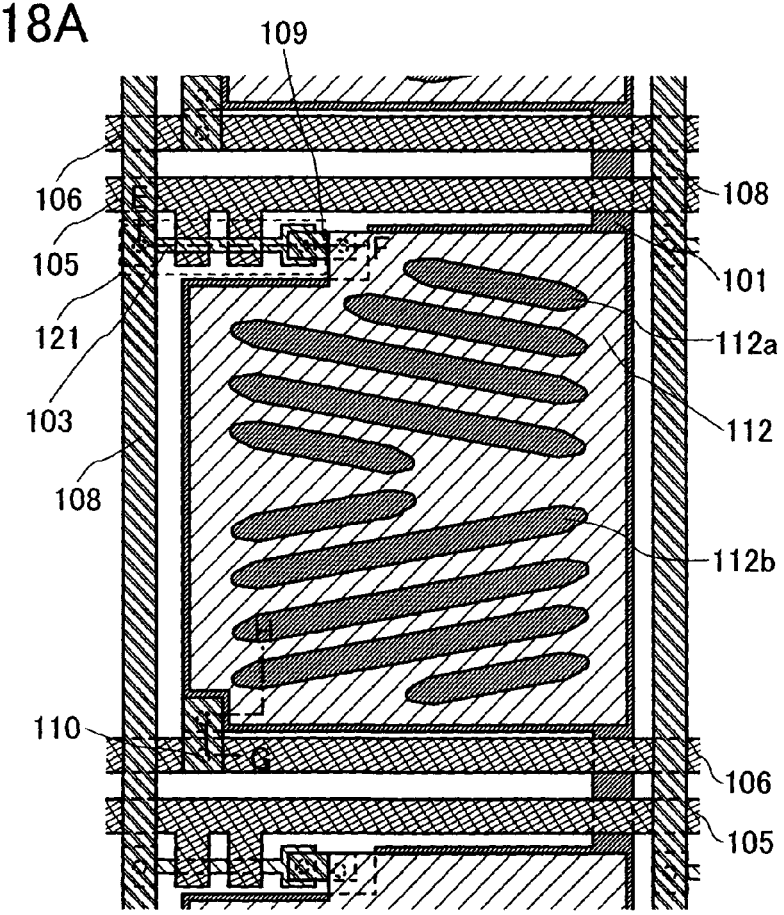
FIG. 18A is a plan view showing a structure of an FFS-mode liquid crystal display device in accordance with Embodiment Mode 18.
Figure 18B:
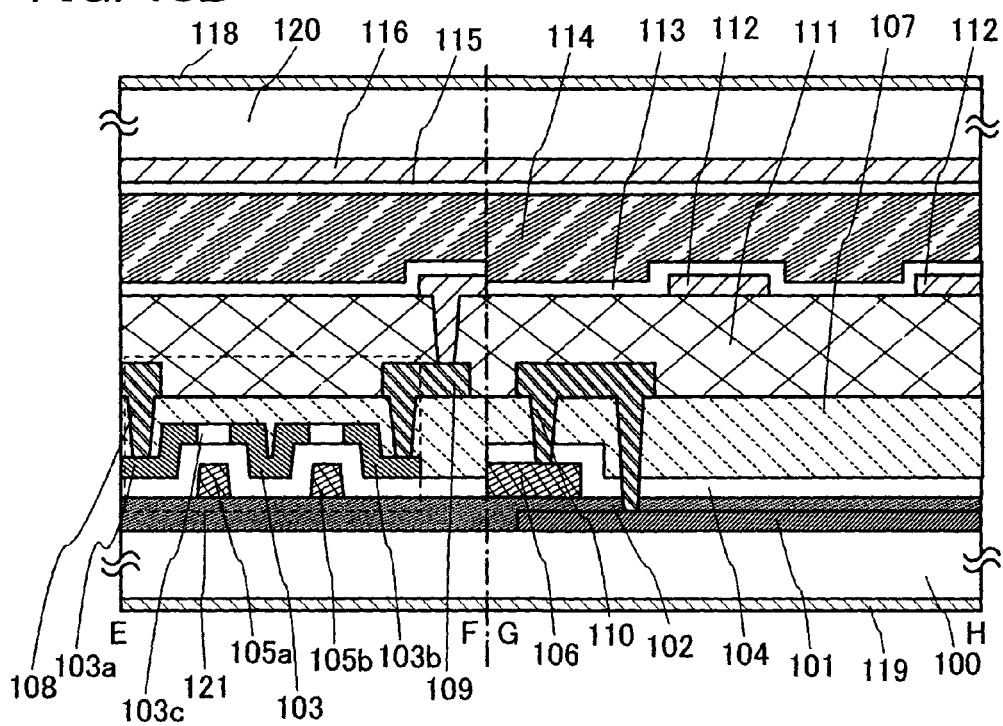
FIG. 18B is a cross-sectional view taken along a line E-F and a line G-H in FIG. 18A.

FIG. 18A is a plan view showing a structure of an FFS-mode liquid crystal display device in accordance with Embodiment Mode 18 of the invention. FIG. 18B is a cross-sectional view taken along a line E-F and a line G-H in FIG. 18A. This embodiment mode describes a structure which is almost similar to that of Embodiment Mode 2 except that the thin film transistor 121 is a bottom-gate transistor. Accordingly, the contents described in Embodiment Mode 2 can also be applied to this embodiment mode. Hereinafter, common reference numerals are used for portions having similar structures to Embodiment Mode 2 and description thereof is omitted.

Accordingly, the contents described in Embodiment Modes 2 to 17 can also be applied to this embodiment mode.

Although description is made by using various drawings, one drawing is made of various components. Accordingly, another structure can also be formed by combining each component in each drawing.

In this embodiment, the gate electrodes 105a and 105b, the auxiliary wiring 106, and the gate wiring 105 are formed over the substrate 100, and the gate insulating film 104 is formed over each of the substrate 100, the gate electrodes 105a and 105b, the auxiliary wiring 106, and the gate wiring 105. In addition, the semiconductor film 103 is formed over the gate insulating film 104.

A manufacturing method of the liquid crystal display device in accordance with this embodiment mode is as follows. First, the first electrode 101 and the insulating film 102 are formed over the substrate 100. Subsequently, a conductive film is formed over the insulating film 102.

The conductive film is formed of one element or a plurality of elements selected from a group of aluminum (Al), tantalum (Ta), titanium (Ti), molybdenum (Mo), tungsten (W), neodymium (Nd), chromium (Cr), nickel (Ni), platinum (Pt), gold (Au), and silver (Ag), a compound including one element or a plurality of the elements selected from the group as a component, a substance in which these compounds are combined, or a compound of silicon and one element or a plurality of the elements selected from the group (silicide). Alternatively, silicon (Si) into which an n-type impurity is introduced may be used.

Subsequently, this conductive film is selectively removed by etching using a resist pattern. Thus, the gate electrodes 105a and 105b, the auxiliary wiring 106, and the gate wiring 105 are formed over the insulating film 102. After that, the resist pattern is removed. Subsequently, the gate insulating film 104 is formed.

Subsequently, a semiconductor film is formed over the gate insulating film 104, and this semiconductor film is selectively removed by etching using a resist pattern. Thus, the semiconductor film 103 is formed. After that, the resist pattern is removed.

Subsequently, a resist pattern is formed over the semiconductor film 103, and an impurity is added to the semiconductor film 103 by using this resist pattern as a mask. Thus, the impurity regions 103a and 103b and an impurity region located between the gate electrodes 105a and 105b are formed. Note that when the substrate 100 is formed of a material having a transmitting property such as glass, in the case of forming the resist pattern, the resist pattern is formed by light exposure from a back side of the substrate 100 by using the gate wiring as a light-exposure pattern without using a light-exposure mask, in some cases. In this case, the number of steps can be reduced since the light-exposure mask is not used, so that manufacturing cost can be reduced. In addition, since the resist pattern can be formed in a self-aligned manner, there is an advantage such that misalignment of the resist pattern is suppressed so that it is not necessary to consider this misalignment. The subsequent steps are similar to those of Embodiment Mode 2.

In accordance with this embodiment mode also, an advantageous effect which is similar to that of Embodiment Mode 2 can be obtained. Note that in each of the FFS-mode or IPS-mode liquid crystal display devices shown in Embodiment Modes 3 to 14, a thin film transistor for driving a pixel may also be a bottom-gate thin film having a structure which is similar to this embodiment mode. In addition, in this embodiment mode, shapes of the second electrode 112 and the opening pattern 112a may be the shapes shown in Embodiment Mode 4.

Embodiment Mode 19

Figure 19A:
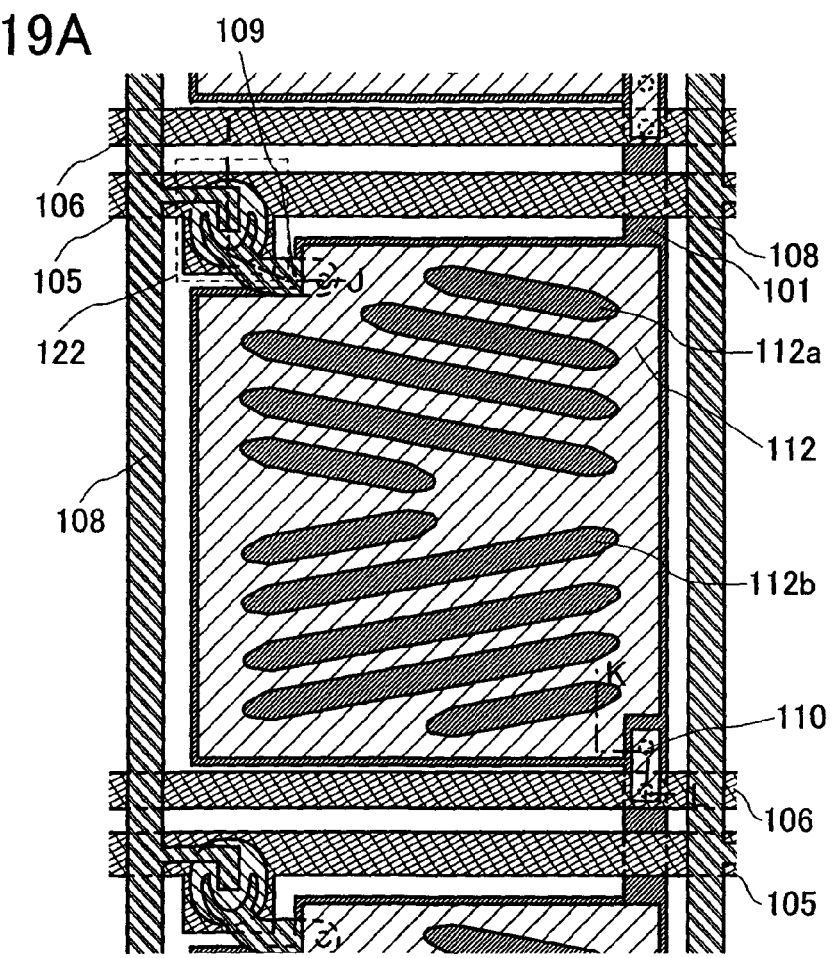
FIG. 19A is a plan view showing a structure of an FFS-mode liquid crystal display device in accordance with Embodiment Mode 19.
Figure 19B:
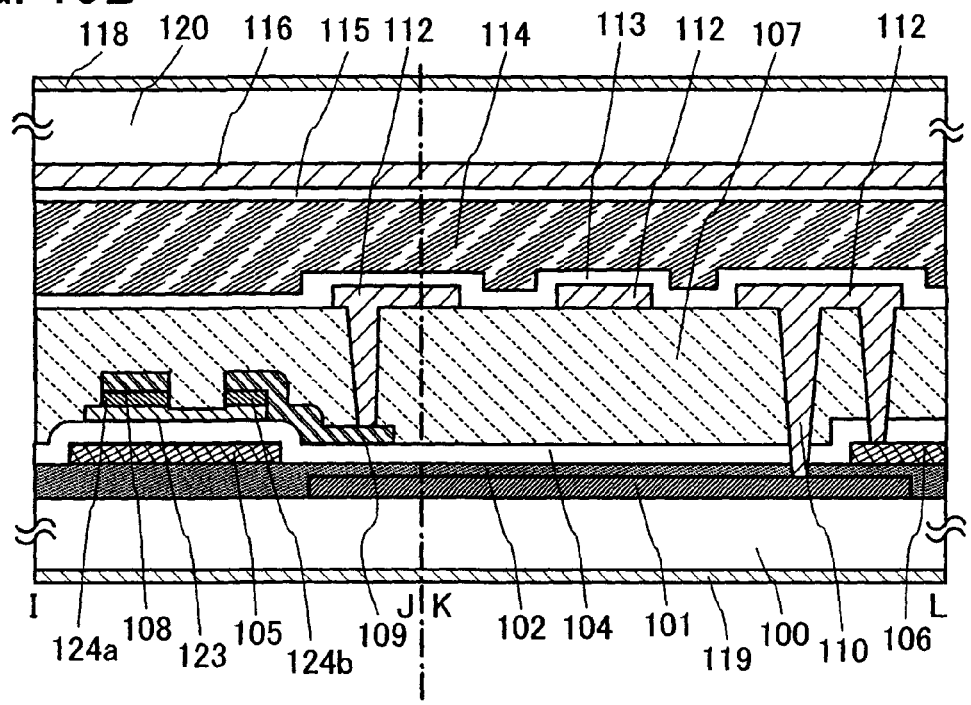
FIG. 19B is a cross-sectional view taken along a line K-L and a line I-J in FIG. 19A.

FIG. 19A is a plan view showing a structure of an FFS-mode liquid crystal display device in accordance with Embodiment Mode 19 of the invention. FIG. 19B is a cross-sectional view taken along a line I-J and a line K-L in FIG. 19A. This embodiment mode describes a structure which is almost similar to that of Embodiment Mode 2 except for the following points. A structure of a thin film transistor which controls the second electrode 112 serving as a pixel electrode is different; the second interlayer insulating film 111 is not provided; the second electrode 112 and the first alignment film 113 are formed over the first interlayer insulating film 107; the source wiring 108 and the conductive film for connecting 109 are formed over the gate insulating film 104; and the conductive film for connecting 110 is formed in the same layer as the second electrode 112. Hereinafter, common reference numerals are used for portions having similar structures to Embodiment Mode 2 and description thereof is omitted.

Accordingly, the contents described in Embodiment Modes 2 to 18 can also be applied to this embodiment mode.

Although description is made by using various drawings, one drawing is made of various components. Accordingly, another structure can also be formed by combining each component in each drawing.

In this embodiment mode, a thin film transistor 122 is a bottom-gate transistor, and the gate insulating film 104 is formed over the gate wiring 105. A semiconductor film 123 serving as a channel region is formed over the gate insulating film 104. For example, the semiconductor film 123 is an amorphous silicon film.

The semiconductor film 123 is electrically connected to the source wiring 108 with an n-type semiconductor film 124a interposed therebetween, and is electrically connected to the conductive film for connecting 109 with an n-type semiconductor film 124b interposed therebetween. For example, each of the n-type semiconductor films 124a and 124b is a polysilicon film into which phosphorus or arsenic is introduced and functions as a source or a drain.

A manufacturing method of the liquid crystal display device in accordance with this embodiment mode is as follows. First, the first electrode 101 and the insulating film 102 are formed over the substrate 100. Subsequently, a conductive film is formed over the insulating film 102.

The conductive film is formed of one element or a plurality of elements selected from a group of aluminum (Al), tantalum (Ta), titanium (Ti), molybdenum (Mo), tungsten (W), neodymium (Nd), chromium (Cr), nickel (Ni), platinum (Pt), gold (Au), and silver (Ag), a compound including one element or a plurality of the elements selected from the group as a component, a substance in which these compounds are combined, or a compound of silicon and one element or a plurality of the elements selected from the group (silicide). Alternatively, silicon (Si) into which an n-type impurity is introduced may be used.

Subsequently, this conductive film is selectively removed by etching using a resist pattern. Thus, the gate wiring 105 and the auxiliary wiring 106 are formed over the insulating film 102. After that, the resist pattern is removed. Subsequently, the gate insulating film 104 is formed.

Subsequently, a semiconductor film is formed over the gate insulating film 104 by CVD, for example, and this semiconductor film is selectively removed by etching using a resist pattern. Thus, the semiconductor film 123 is formed. After that, the resist pattern is removed.

Subsequently, a semiconductor film is formed over the semiconductor film 123 and the gate insulating film 104, and an n-type impurity is added to this semiconductor film. Subsequently, this semiconductor film is selectively removed by etching using a resist pattern. Thus, the n-type semiconductor films 124a and 124b are formed over the semiconductor film 123. After that, the resist pattern is removed.

Subsequently, a conductive film is formed over each of the semiconductor film 123, the n-type semiconductor films 124a and 124b, and the gate insulating film 104, and this conductive film is selectively removed by etching using a resist pattern. Thus, the source wiring 108 and the conductive film for connecting 109 are formed. After that, the resist pattern is removed.

Subsequently, the first interlayer insulating film 107 is formed. Subsequently, a contact hole located over the conductive film for connecting 109 is formed in the first interlayer insulating film 107. In this step, a contact hole located over the auxiliary wiring 106 is formed in the first interlayer insulating film 107 and the gate insulating film 104, and a contact hole located over the first electrode 101 is formed in the first interlayer insulating film 107, the gate insulating film 104, and the insulating film 102.

Subsequently, a conductive film having a light-transmitting property (e.g., an ITO film, an IZO film, a ZnO film, or a Si film) is formed over the first interlayer insulating film 107 and in each contact hole, and this conductive film is selectively removed by etching using a resist pattern. Thus, the second electrode 112 and the conductive film for connecting 110 are formed. Subsequently, the first alignment film 113 is formed over each of the first interlayer insulating film 107, the second electrode 112, and the conductive film for connecting 110. The subsequent steps are similar to the manufacturing method of the liquid crystal display device in accordance with Embodiment Mode 2.

In accordance with this embodiment mode also, an advantageous effect which is similar to that of Embodiment Mode 2 can be obtained. Note that the source wiring 108 and the conductive film for connecting 109 may also be directly connected to the semiconductor film 123 without forming the n-type semiconductor films 124a and 124b. In addition, a shape of an opening pattern of the second electrode 112 may also be similar to that of Embodiment Mode 5.

Further, in each of the FFS-mode liquid crystal display devices shown in Embodiment Modes 6 to 18, and the IPS-mode liquid crystal display device shown in Embodiment Mod 5, the structure of the thin film transistor may be changed similarly to this embodiment mode such that the second interlayer insulating film 111 is not provided, the second electrode 112 and the first alignment film 113 are formed over the first interlayer insulating film 107, the source wiring 108 and the conductive film for connecting 109 are formed over the gate insulating film 104, and the conductive film for connecting 110 is formed in the same layer as the second electrode 112.

Embodiment Mode 20

Figure 20A:
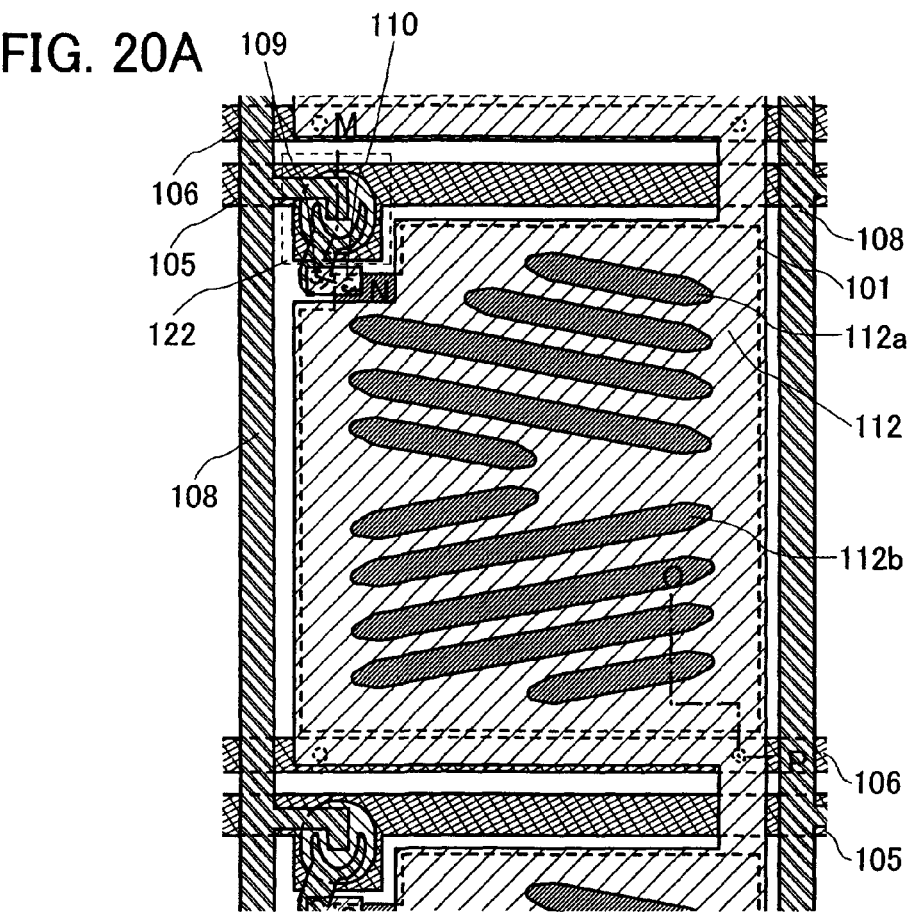
FIG. 20A is a plan view showing a structure of an FFS-mode liquid crystal display device in accordance with Embodiment Mode 20.
Figure 20B:
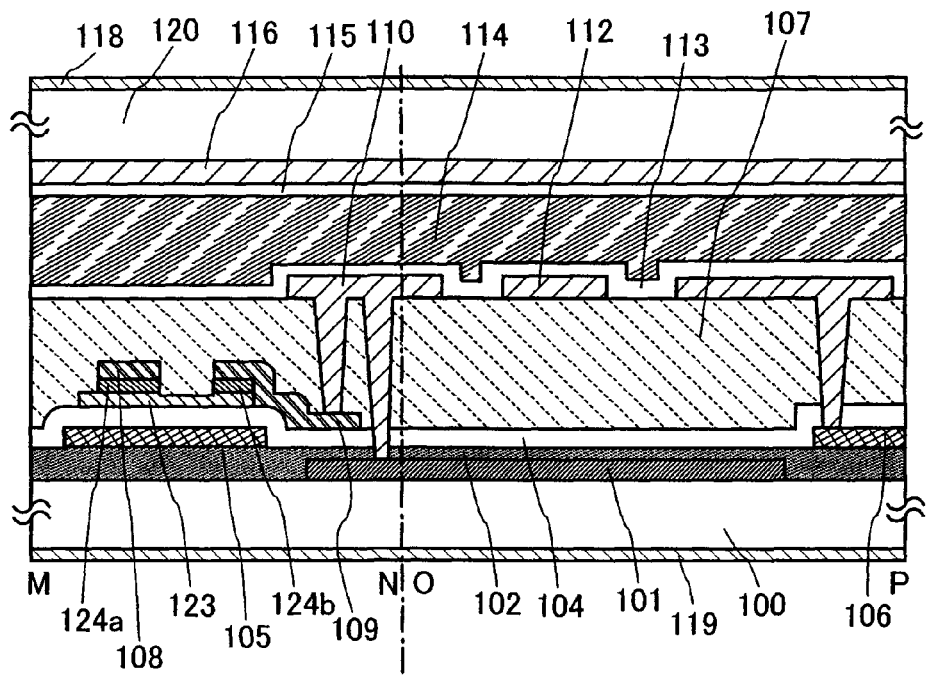
FIG. 20B is a cross-sectional view taken along a line M-N and a line O-P in FIG. 20A.

FIG. 20A is a plan view showing a structure of an FFS-mode liquid crystal display device in accordance with Embodiment Mode 20 of the invention. FIG. 20B is a cross-sectional view taken along a line M-N and a line O-P in FIG. 20A. This embodiment mode describes a structure which is almost similar to that of Embodiment Mode 2 except for the following points. The conductive film for connecting 110 electrically connects the conductive film for connecting 109 to the first electrode 101; the second electrode 112 is connected to the auxiliary wiring 106; and the second electrode 112 protrudes outside of the first electrode 101 when seen from a direction which is perpendicular to the substrate 100. The first electrode 101 functions as a pixel electrode and the second electrode 112 functions as a common electrode.

In addition, a manufacturing method of the liquid crystal display device in accordance with this embodiment mode is similar to that of Embodiment Mode 19. Accordingly, the contents described in Embodiment Mode 19 can also be applied to this embodiment mode.

Accordingly, the contents described in Embodiment Modes 2 to 19 can also be applied to this embodiment mode.

Although description is made by using various drawings, one drawing is made of various components. Accordingly, another structure can also be formed by combining each component in each drawing.

In accordance with this embodiment mode also, an advantageous effect which is similar to that of Embodiment Mode 2 can be obtained. Note that the source wiring 108 and the conductive film for connecting 109 may also be directly connected to the semiconductor film 123 without forming the n-type semiconductor films 124*a* and 124*b*. In addition, in this embodiment mode, a shape of an opening pattern of the second electrode 112 may be similar to that of Embodiment Mode 4.

Further, an opening pattern may also be formed in the first electrode 101. In this case, the liquid crystal display device in this embodiment mode becomes a device which controls an alignment direction of liquid crystals by an IPS mode. Note that shapes of the first electrode 101, the second electrode 112, opening patterns of these electrodes are the shapes shown in Embodiment Mode 4, for example.

Embodiment Mode 21

Figure 21A:
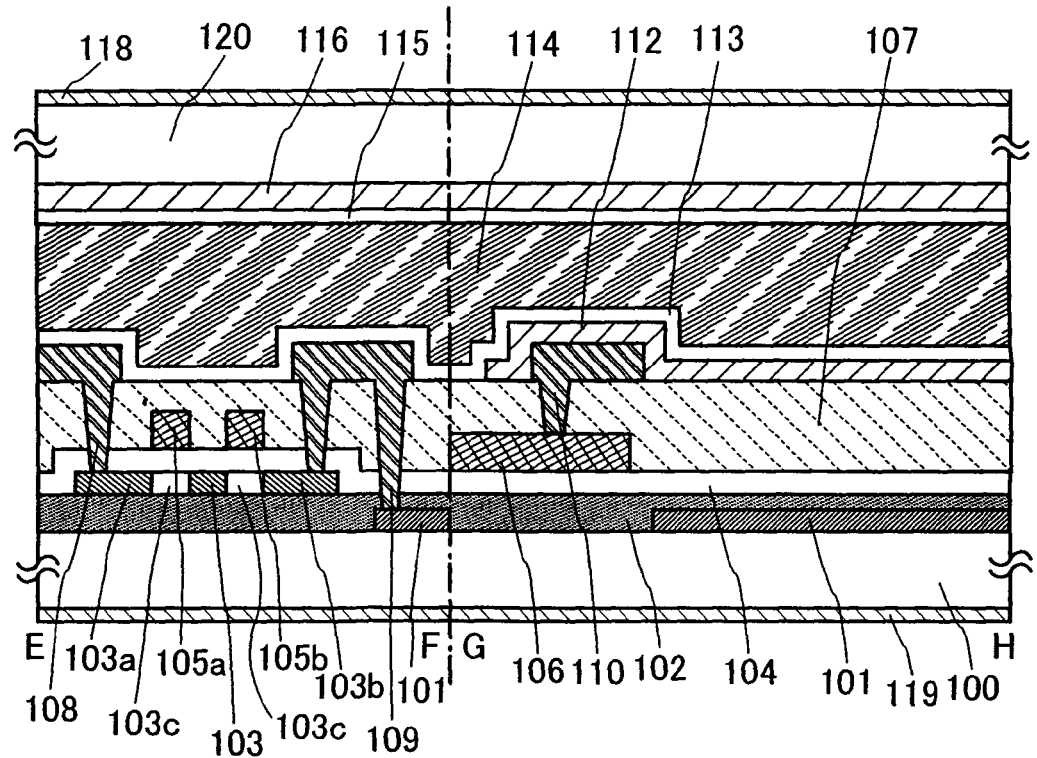
FIG. 21A is a cross-sectional view showing a structure of an FFS-mode liquid crystal display device in accordance with Embodiment Mode 21.

FIG. 21A is a cross-sectional view showing a structure of an FFS-mode liquid crystal display device in accordance with Embodiment Mode 21 of the invention. This cross-sectional view shows a cross section corresponding to a cross section taken along a line E-F and a line G-H in FIG. 3A. This embodiment mode describes a structure which is almost similar to that of Embodiment Mode 3 except for the following points. The second interlayer insulating film 111 shown in FIG. 3B is not formed; the second electrode 112 is located over the first interlayer insulating film 107; and a part of the second electrode 112 is located over the conductive film for connecting 110.

A manufacturing method of the liquid crystal display device in accordance with this embodiment mode is almost similar to that of Embodiment Mode 3 except that the step of forming the second interlayer insulating film 111 is omitted. Accordingly, the contents described in Embodiment Mode 3 can also be applied to this embodiment mode. Hereinafter, common reference numerals are used for portions having similar structures to Embodiment Mode 3 and description thereof is omitted.

Note that the second electrode 112 may also be formed at the same time as the source wiring 108 or the like. That is, the second electrode 112 may be formed of a similar material to and processed at the same time as the source wiring 108 or the like. Accordingly, the step of forming the second electrode 112 by using an electrode having a light-transmitting property can be omitted, so that cost can be reduced.

Therefore, the second electrode 112 does not necessarily have a light-transmitting property. That is, the second electrode 112 may reflect light.

Accordingly, the contents described in Embodiment Modes 2 to 20 can also be applied to this embodiment mode.

Although description is made by using various drawings, one drawing is made of various components. Accordingly, another structure can also be formed by combining each component in each drawing.

In accordance with this embodiment mode also, an advantageous which is similar to that of Embodiment Mode 3 can be obtained. In addition, since the step of forming the second interlayer insulating film 111 is omitted, manufacturing cost can be reduced. Even when such a structure is employed, an interval between the first electrode 101 and the second electrode 112 can be sufficiently increased because the first electrode 101 is provided below the insulating film 102 functioning as a base film, so that an appropriate electric field can be applied to the liquid crystals 114.

Note that in each of the FFS-mode liquid crystal display devices shown in Embodiment Modes 2, and 6 to 18, and the IPS-mode liquid crystal display devices shown in Embodiment Modes 4 and 5, the second electrode 112 may also be provided over the first interlayer insulating film 107 without forming the second interlayer insulating film 111, and a part of the second electrode 112 may also be located over the conductive film for connecting 110, similarly to this embodiment mode. An advantageous effect which is similar to that of this embodiment mode can be obtained also in this case.

Embodiment Mode 22

Figure 21B:
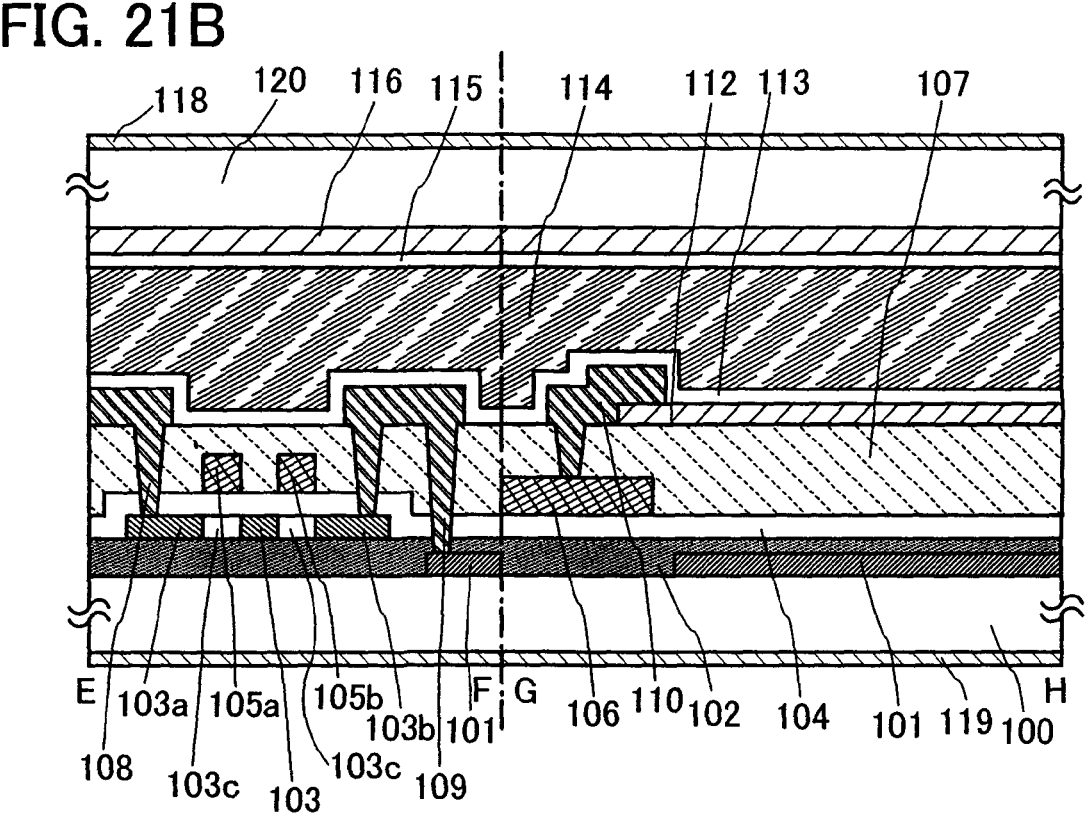
FIG. 21B is a cross-sectional view showing a structure of an FFS-mode liquid crystal display device in accordance with Embodiment Mode 22.

FIG. 21B is a cross-sectional view showing a structure of an FFS-mode liquid crystal display device in accordance with Embodiment Mode 22 of the invention. This cross-sectional view shows a cross section corresponding to a cross section taken along a line E-F and a line G-H in FIG. 1A. This embodiment mode describes a structure which is almost similar to that of Embodiment Mode 21 except for the following points. All of the second electrode 112 is located over the first interlayer insulating film 107; and a part of the conductive film for connecting 110 is located over the second electrode 112.

A manufacturing method of the liquid crystal display device in accordance with this embodiment mode is almost similar to that of Embodiment Mode 21 except that the source wiring 108, the conductive film for connecting 109, and the conductive film for connecting 110 are formed after the second electrode 112 is formed. Accordingly, the contents described in Embodiment Mode 21 can also be applied to this embodiment mode. Hereinafter, common reference numerals are used for portions having similar structures to Embodiment Mode 21 and description thereof is omitted.

Accordingly, the contents described in Embodiment Modes 2 to 21 can also be applied to this embodiment mode.

Although description is made by using various drawings, one drawing is made of various components. Accordingly, another structure can also be formed by combining each component in each drawing.

In accordance with this embodiment mode also, an advantageous which is similar to that of Embodiment Mode 21 can be obtained. In addition, since the conductive film for connecting 110 is located over the second electrode 112, breaking of the second electrode 112 can be prevented. That is, when the second electrode 112 is formed over the conductive film for connecting 110 like Embodiment Mode 21, the conductive film for connecting 110 is often formed to be thicker than the second electrode 112, so that the second electrode 112 may cause breaking in an end portion of the conductive film for connecting 110. On the other hand, by forming the second electrode 112 below the conductive film for connecting 110 like this embodiment mode, breaking of the second electrode 112 can be prevented. Note that since the conductive film for connecting 110 is often formed to be thick as described above, breaking of the conductive film for connecting 110 is rare. In addition, since the step of forming the second interlayer insulating film 111 is omitted, manufacturing cost can be reduced. Even when such a structure is employed, an interval between the first electrode 101 and the second electrode 112 can be sufficiently increased because the first electrode 101 is provided below the insulating film 102 functioning as a base film, so that an appropriate electric field can be applied to the liquid crystals 114.

Note that in each of the FFS-mode liquid crystal display devices shown in Embodiment Modes 2, and 6 to 18, and the IPS-mode liquid crystal display devices shown in Embodiment Modes 4 and 5, an advantageous effect which is similar to that of this embodiment mode can be obtained, by providing the second electrode 112 over the first interlayer insulating film 107 without forming the second interlayer insulating film 111 and locating a part of the conductive film for connecting 110 over the second electrode 112, similarly to this embodiment mode.

Embodiment Mode 23

Figure 22:
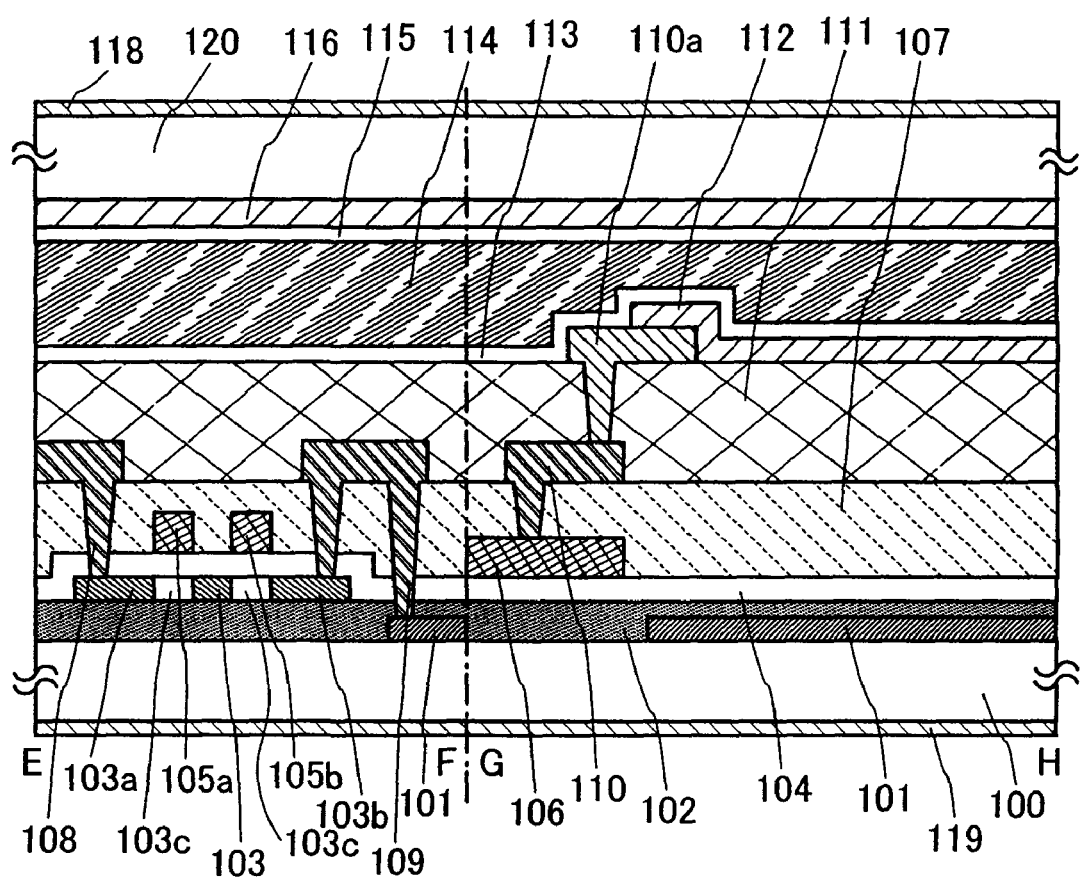
FIG. 22 is a cross-sectional view showing a structure of an FFS-mode liquid crystal display device in accordance with Embodiment Mode 23.

FIG. 22 is a cross-sectional view showing a shape of an electrode of an FFS-mode liquid crystal display device in accordance with Embodiment Mode 23 of the invention. This cross-sectional view shows a cross section corresponding to a cross section taken along a line E-F and a line G-H in FIG. 3A. This embodiment mode describes a structure which is almost similar to that of Embodiment Mode 3 except that a metal film 110a is formed over the second interlayer insulating film 111, and the second electrode 112 and the conductive film for connecting 110 are electrically connected with this metal film 110a interposed therebetween. Accordingly, the contents described in Embodiment Mode 3 can also be applied to this embodiment mode. Hereinafter, common reference numerals are used for portions having similar structures to Embodiment Mode 3 and description thereof is omitted.

Accordingly, the contents described in Embodiment Modes 2 to 22 can also be applied to this embodiment mode.

Although description is made by using various drawings, one drawing is made of various components. Accordingly, another structure can also be formed by combining each component in each drawing.

The metal film 110a is electrically connected to the conductive film for connecting 110 by being partially embedded in a contact hole formed in the second interlayer insulating film 111. The second electrode 112 is electrically connected to the metal film 110a by being partially located in the metal film 110a.

A manufacturing method of the liquid crystal display device in accordance with this embodiment mode is similar to that of Embodiment Mode 3 except that a step of forming the metal film 110a exists between the step of forming the contact hole in the second interlayer insulating film 111 and the step of forming the second electrode 112. The metal film 110a is formed by forming a metal film over the second interlayer insulating film 111 and in the contact hole, and selectively removing this metal film by etching using a resist pattern.

In accordance with this embodiment mode also, an advantageous which is similar to that of Embodiment Mode 3 can be obtained.

Note that in the IPS-mode liquid crystal display device shown in Embodiment Mode 4, the metal film 110a may also be formed. In addition, in each of the FFS-mode liquid crystal display devices shown in Embodiment Modes 2, and 6 to 18, and the IPS-mode liquid crystal display device shown in Embodiment Mode 5, a metal film which is similar to the metal film 110a may also be provided over the conductive film for connecting 109, so that the conductive film for connecting 109 and the second electrode 112 are electrically connected through this metal film.

Embodiment Mode 24

Figure 23:
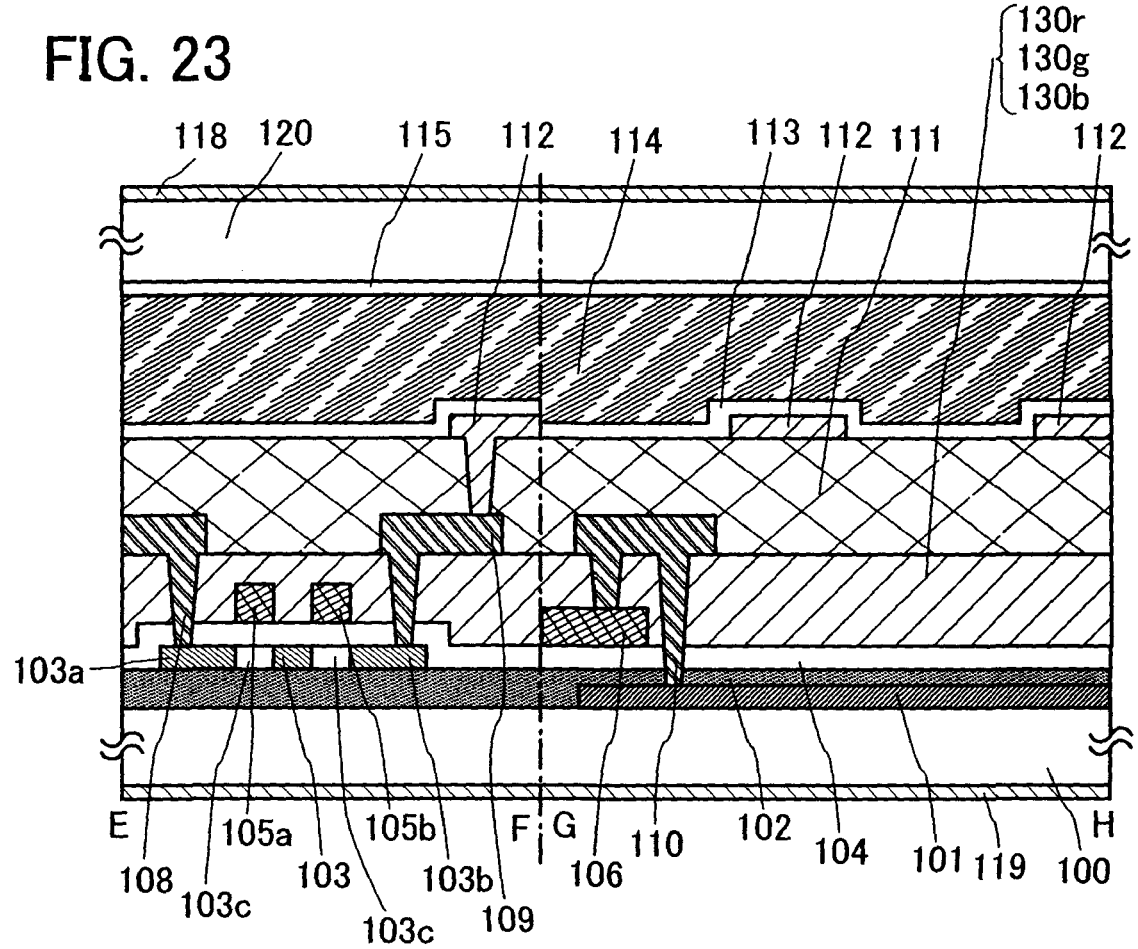
FIG. 23 is a cross-sectional view showing a structure of a liquid crystal display device in accordance with Embodiment Mode 24.

FIG. 23 is a cross-sectional view showing a structure of a pixel portion of an FFS-mode liquid crystal display device in accordance with Embodiment Mode 24 of the invention. The pixel portion of the liquid crystal display device in accordance with This embodiment mode describes a structure which is almost similar to that of Embodiment Mode 2 except that a red color filter 130r, a blue color filter 130b, and a green color filter 130g are provided instead of the first interlayer insulating film 107 without providing a color filter on an opposite substrate 120 side. Accordingly, the contents described in Embodiment Modes 2 to 23 can also be applied to this embodiment mode. Hereinafter, common reference numerals are used for portions having similar structures to Embodiment Mode 2 and description thereof is omitted. Note that since the gate insulating film 104 is located between the color filters 130r, 130b, and 130g, and the semiconductor film 103, the gate insulating film 104 also has a function of suppressing impurity diffusion from each color filter to the semiconductor film 103.

Note that an insulating film of an inorganic material may also be provided between the color filters and the gate electrodes 105a and 105b. As an inorganic material, an insulating substance having oxygen or nitrogen such as silicon oxide ($SiO_x$), silicon nitride ($SiN_x$), silicon oxynitride ($SiO_xN_y$: x>y), or silicon nitride oxide ($SiN_xO_y$: x>y) can be used. In order to block impurity penetration, it is preferable to use a material including a large amount of nitrogen.

Note that colors of the color filters may be colors other than red, blue, and green or may be more than 3 colors, for example, four colors or six colors may be used. For example, yellow, cyan, magenta, and/or white may be added. Further, not only the color filters but also a black matrix may be provided.

By providing the color filters over the substrate 100 in this manner, it is not necessary to precisely perform alignment to the opposite substrate 120, so that the liquid crystal display device can be manufactured easily, cost is reduced, and a manufacturing yield is improved.

A manufacturing method of the liquid crystal display device in accordance with this embodiment mode is almost similar to those of Embodiment Modes 2 to 23 except that steps of forming the color filters 130r, 130g, and 130b exist instead of the step of forming the first interlayer insulating film 107. The color filters 130r, 130g, and 130b are formed by repeating the following steps three times: a step of forming a color filter layer; a step of forming a resist pattern over the color filter layer; and a step of selectively dry etching the color filter layer by using the resist pattern as a mask. Alternatively, the color filters 130r, 130g, and 130b are formed by using a photosensitive material, pigment, or the like without using resist. Note that a space is generated between the color filter layers, and the second interlayer insulating film 111 is embedded in this space. Alternatively, an inorganic material or an organic material is further stacked. Further alternatively, a black matrix or the like is stacked. In addition, the color filters 130r, 130g, and 130b, or the black matrix can also be formed by using a droplet-discharge method (e.g., an inkjet method).

Therefore, the number of manufacturing steps of the liquid crystal display device can be reduced. Since the color filters are provided on the substrate 100 side, decrease in aperture ratio can be suppressed even when misalignment to the opposite substrate is generated between the substrate 100, compared with the case where the color filters are provided for the opposite substrate. That is, a margin to misalignment of the opposite substrate increases.

Figure 24A:
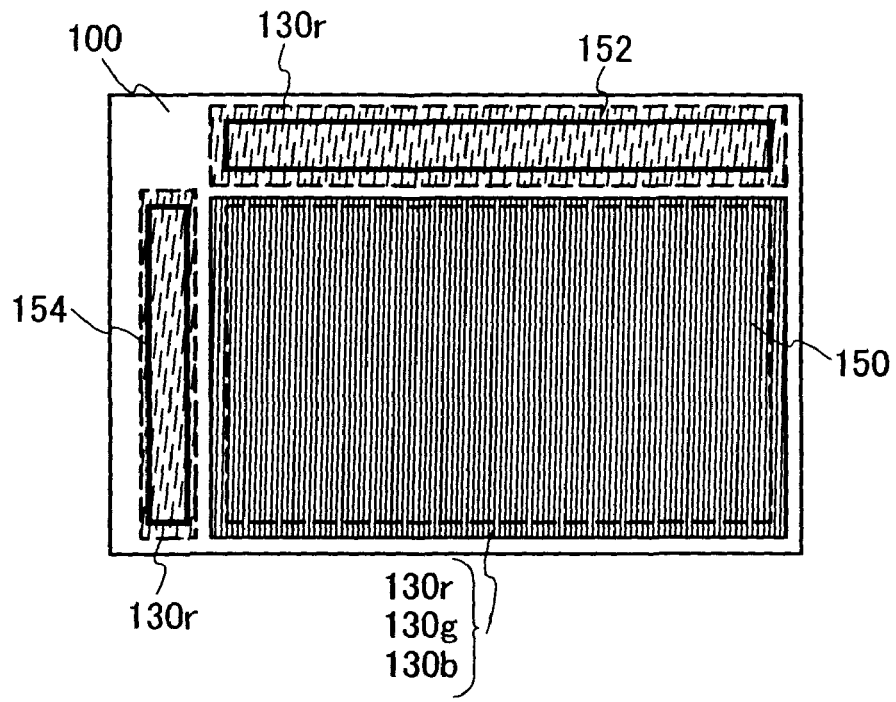
FIG. 24A is a plan view of the liquid crystal display device shown in FIG. 23.

FIG. 24A is a plan view of the liquid crystal display device shown in FIG. 23. As shown in FIG. 24A, in this liquid crystal display device, a source line driver circuit 152 and a gate line driver circuit 154 which are peripheral driver circuits are provided around a pixel portion 150. The red color filter 130r may also be provided over each of the source line driver circuit 152 and the gate line driver circuit 154. By providing the color filter 130r, light deterioration of an active layer of each thin film transistor included in the source line driver circuit 152 and the gate line driver circuit 154 is prevented and planarization is performed.

Figure 24B:
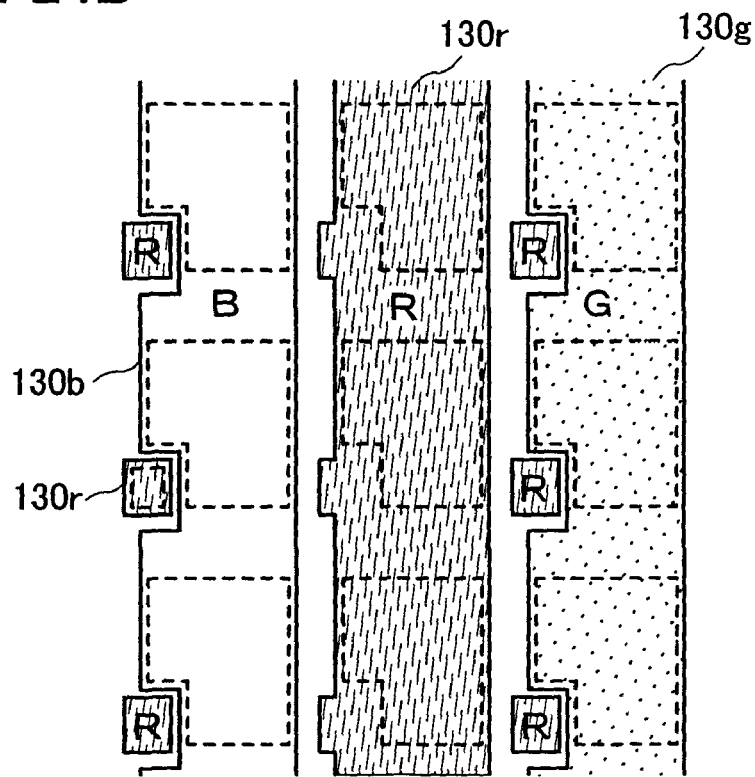
FIG. 24B is an enlarged view of a pixel portion in FIG. 24A.

FIG. 24B is an enlarged view of a part of the pixel portion 150 (3 rows×3 columns) in FIG. 24A. In the pixel portion 150, the red color filter 130r, the blue color filter 130b, and the green color filter 130g are arranged in stripes alternately. In addition, the red color filter 130r is provided over a thin film transistor included in each pixel.

Since a source wiring (not shown) and a gate wiring (not shown) are provided so as to overlap with a space between the color filters, generation of light leakage is suppressed.

Since the color filter 130r functions as a black matrix in this manner, the step of forming a black matrix, which is conventionally required, can also be omitted.

As described above, in accordance with this embodiment mode, an advantageous effect which is similar to those of Embodiment Modes 2 to 23 can be obtained. In addition, since the color filter 130r, 130b, and 130g are provided instead of the first interlayer insulating film 107, the number of the manufacturing steps of the liquid crystal display device can be reduced. Further, decrease in aperture ratio can be suppressed even when misalignment to the opposite electrode is generated, compared with the case where the color filters are provided for the opposite substrate. That is, a margin to misalignment of the opposite substrate increases.

Although the color filters are provided between the gate electrodes 105a and 105b, and the source wiring 108 in FIG. 23, the invention is not limited to this. The color filters may also be provided between the source wiring 108 and the second electrode 112.

In addition, not only the color filters but also a black matrix may be provided.

Note that an insulating film of an inorganic material may also be provided between the color filters and the source wiring 108, or between the color filters and the second electrode 112. As an inorganic material, an insulating substance having oxygen or nitrogen such as silicon oxide ($SiO_x$), silicon nitride ($SiN_x$), silicon oxynitride ($SiO_xN_y$: x>y), or silicon nitride oxide ($SiN_xO_y$: x>y) can be used. In order to block impurity penetration, it is preferable to use a material including a large amount of nitrogen.

By providing the color filters or the black matrix below the second electrode 112 in this manner, a portion which is in contact with liquid crystals or an alignment film can be planarized. By planarization, random orientation of liquid crystal molecules can be suppressed, light leakage is suppressed, so that contrast can be improved.

Note that in each of the FFS-mode or IPS-mode liquid crystal display devices shown in Embodiment Modes 3 to 18, and 22, the color filters 130r, 130b, and 130g may be provided instead of the first interlayer insulating film 107 or the second interlayer insulating film 111, similarly to this embodiment mode. An advantageous effect which is similar to that of this embodiment mode can be obtained also in this case.

Embodiment Mode 25

Figure 25A:
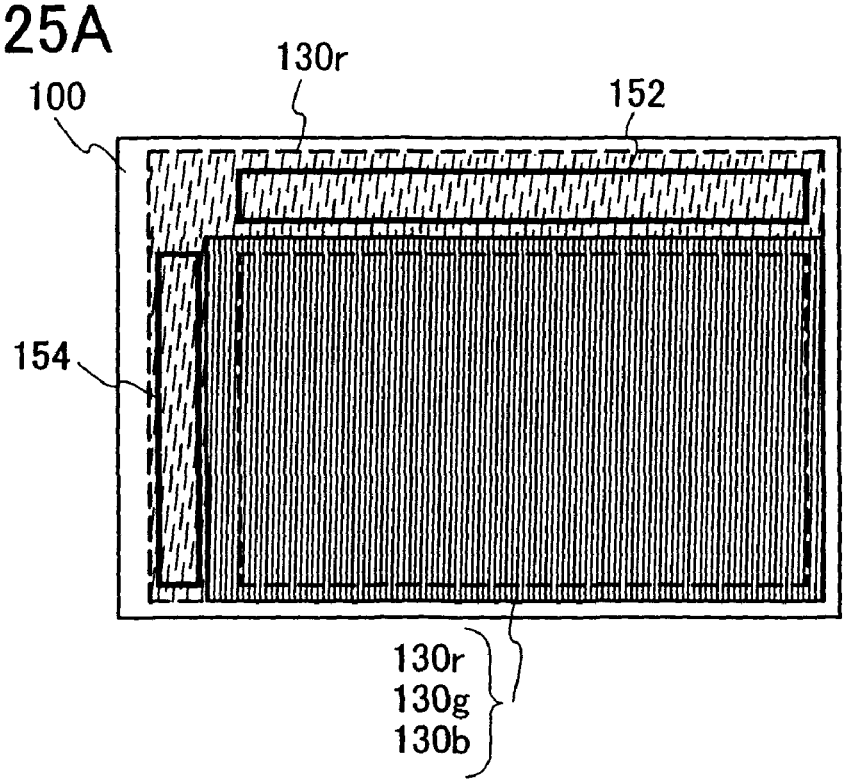
FIG. 25A is a plan view of a liquid crystal display device in accordance with Embodiment Mode 25.
Figure 25B:
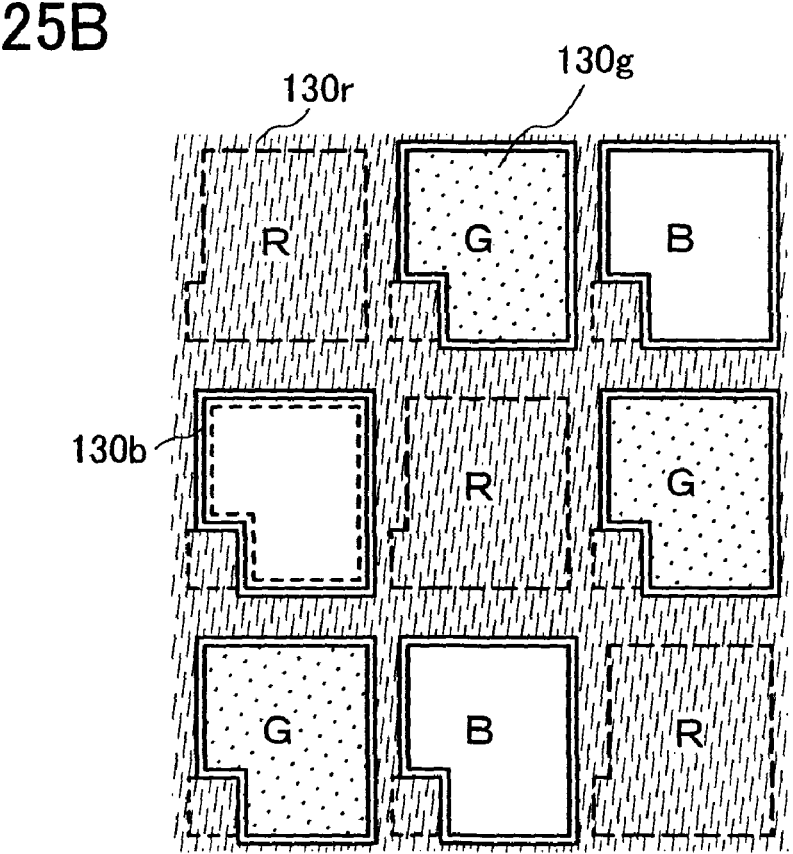
FIG. 25B is an enlarged view of a pixel portion in FIG. 25A.

FIG. 25A is a plan view showing a structure of an FFS-mode liquid crystal display device in accordance with Embodiment Mode 25 of the invention. FIG. 25B is an enlarged view showing a structure of a pixel portion in FIG. 25A. This embodiment mode describes a structure which is almost similar to that of Embodiment Mode 24 except for layout of the color filters 130r, 130b, and 130g. Accordingly, the contents described in Embodiment Mode 24 can also be applied to this embodiment mode. Hereinafter, common reference numerals are used for portions having similar structures to Embodiment Mode 24 and description thereof is omitted.

In this embodiment mode, the color filters 130r, 130b, and 130g are arranged in matrix alternately per pixel. Specifically, the red color filter 130r is provided so as to fill a space between the blue color filter 130b and the green color filter 130g. Although the color filter 130r is provided over the source line driver circuit 152 and the gate line driver circuit 154 which are peripheral driver circuits, the color filter 130r is also provided in a space between each of the source line driver circuit 152, the gate line driver circuit 154, and the pixel portion 150. Therefore, generation of a space between the color filter layers is suppressed.

In accordance with this embodiment mode also, an advantageous effect which is similar to that of Embodiment Mode 24 can be obtained. Note that after the first interlayer insulating film 107 is formed, the color filters 130r, 130b, and 130g may also be provided instead of the second interlayer insulating film 111. An advantageous effect which is similar to that of this embodiment mode can be obtained also in this case.

Note that in each of the FFS-mode or IPS-mode liquid crystal display devices shown in Embodiment Modes 3 to 18, and 23, the color filters 130r, 130b, and 130g may be provided instead of the first interlayer insulating film 107 or the second interlayer insulating film 111, similarly to this embodiment mode. An advantageous effect which is similar to that of this embodiment mode can be obtained also in this case.

Embodiment Mode 26

Figure 26:
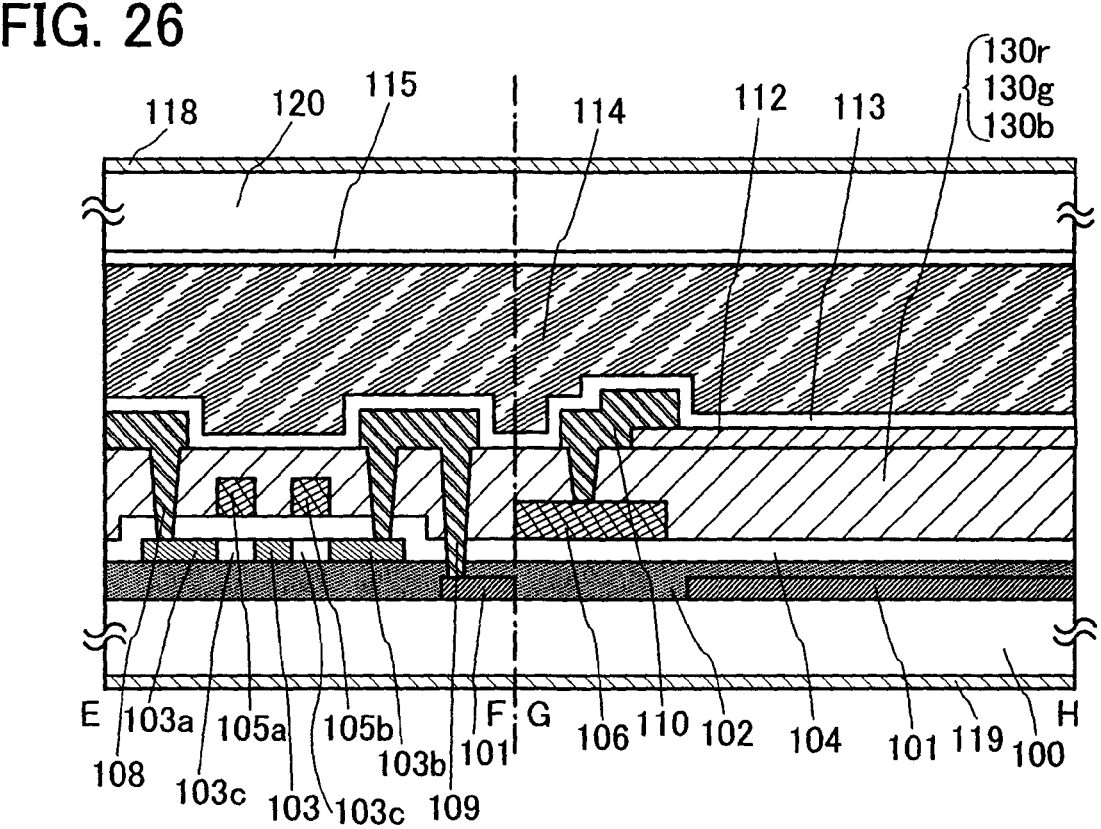
FIG. 26 is a cross-sectional view showing a structure of a liquid crystal display device in accordance with Embodiment Mode 26.

FIG. 26 is a cross-sectional view showing a structure of an FFS-mode liquid crystal display device in accordance with Embodiment Mode 26 of the invention. The liquid crystal display device in accordance with this embodiment mode has a structure which is almost similar to that of Embodiment Mode 22 except that the color filters 130r, 130b, and 130g are provided instead of the first interlayer insulating film 107. Layout of the color filters 130r, 130b, and 130g in this embodiment mode is similar to the layout shown in Embodiment Mode 25. Accordingly, the contents described in Embodiment Modes 22 and 25 can also be applied to this embodiment mode. Hereinafter, common reference numerals are used for portions having similar structures to Embodiment Modes 22 and 25 and description thereof is omitted.

An advantageous effect which is similar to that of Embodiment Mode 25 can be obtained in this embodiment mode. Note that in each of the FFS-mode liquid crystal display devices shown in Embodiment Mode 19 to 21, the color filter 130r, 130b, and 130g may also be provided instead of the first interlayer insulating film 107, similarly to this embodiment mode. An advantageous effect which is similar to that of this embodiment mode can be obtained also in this case.

Note that the layout of the color filters 130r, 130b, and 130g is not limited to each layout shown in Embodiment Modes 23 to 25, and various layout such as triangle mosaic arrangement, RGBG four-pixels arrangement, RGBW four-pixels arrangement, and the like can be used. Note also that the red color filter 130r is preferably provided over the active layer of the thin film transistor, also in such a case.

Embodiment Mode 27

FIGS. 27A to 27D are plan views each showing a shape of an electrode of an FFS-mode liquid crystal display device in accordance with Embodiment Mode 27 of the invention. Since this embodiment mode describes a structure which is similar to Embodiment Mode 2 except for a shape of the second electrode 112, illustration is omitted except for the first electrode 101 and the second electrode 112.

Figure 27A:
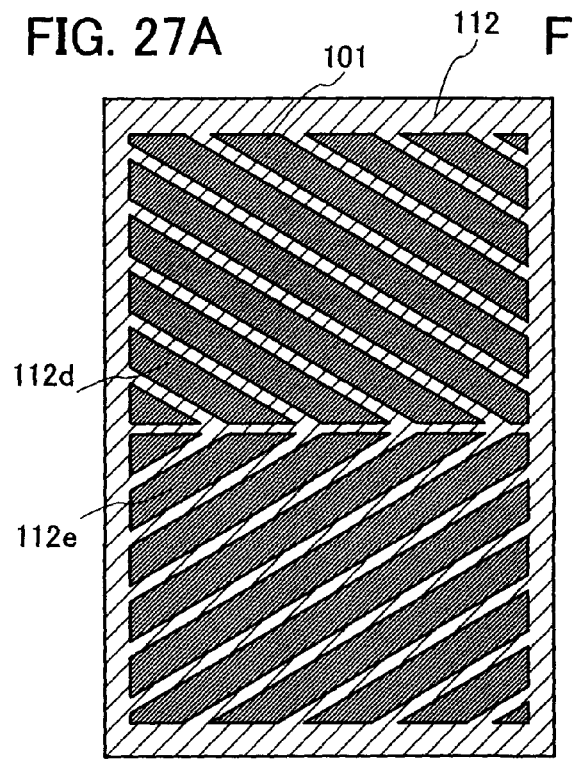
FIGS. 27A to 27D are plan views each showing a shape of an electrode of an FFS-mode liquid crystal display device in accordance with Embodiment Mode 27.

In FIG. 27A, a plurality of slit-shaped opening patterns 112d and 112e are formed in the second electrode 112. The opening patterns 112d and 112e are diagonal to the source wiring. Although the opening patterns 112d are formed in an upper half of the second electrode 112 in the drawing and the opening patterns 112e are formed in a lower half of the second electrode 112 in the drawing, they have different angles from each other.

Figure 27B:
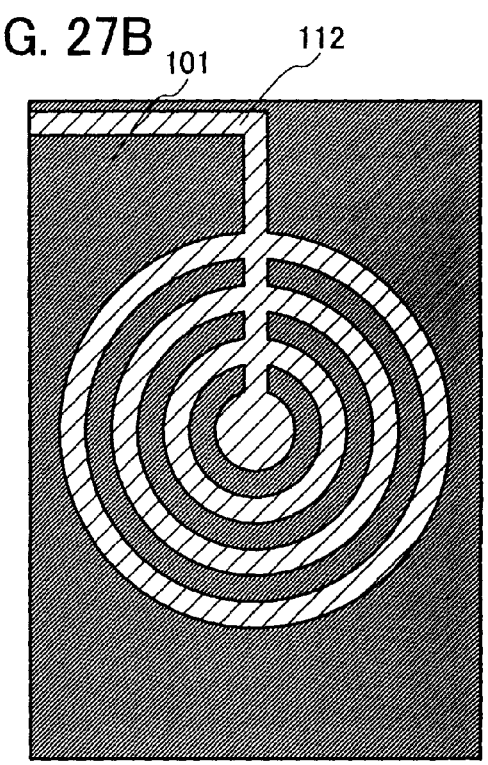

In FIG. 27B, the second electrode 112 has a shape along circumference in which a plurality of electrodes, radii of which are different from each other are provided in a concentric pattern and connected. In addition, a space between the electrodes functions as an opening pattern.

Figure 27C:
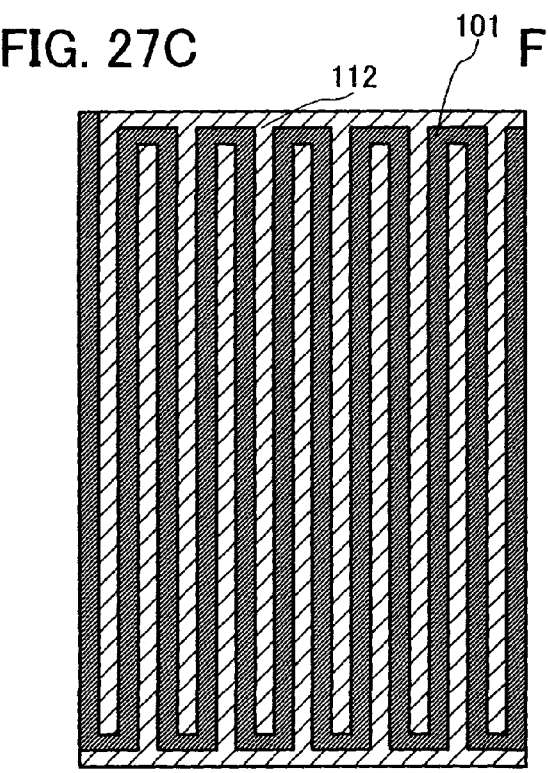

In FIG. 27C, the second electrode 112 has a shape in which two comb-shaped electrodes are provided so as to be reversed and make comb-shaped portions alternate between them. In addition, a space located between the comb-shaped portions functions as an opening pattern.

Figure 27D:
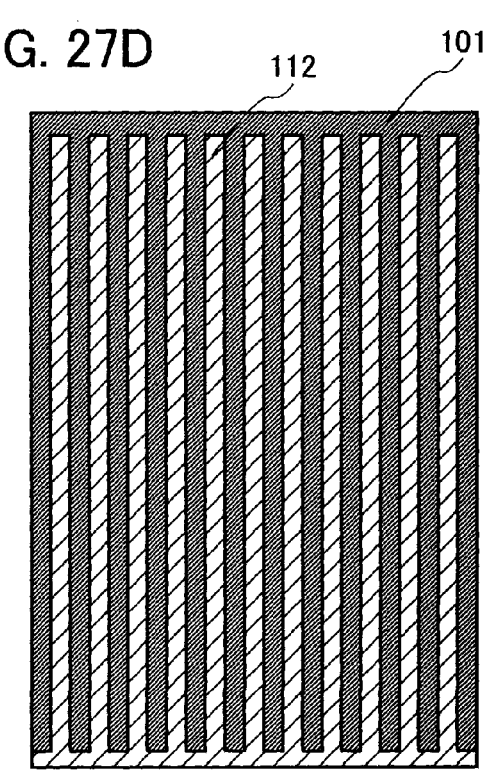

In FIG. 27D, the second electrode 112 has a comb-shape, and a space located between comb-shaped portions functions as an opening pattern.

A manufacturing method of the liquid crystal display device in accordance with this embodiment mode is almost similar to that of Embodiment Mode 2 in each case. Accordingly, the contents described in Embodiment Mode 2 can also be applied to this embodiment mode.

In accordance with this embodiment mode also, an advantageous effect which is similar to that of Embodiment Mode 2 can be obtained. Note that in each of the FFS-mode liquid crystal display devices shown in Embodiment Modes 3, and 4 to 26, the shape of the second electrode 112 may be any one of the shapes shown in FIGS. 27A to 27D.

Embodiment Mode 28

FIGS. 28A to 28D are plan views each showing a shape of an electrode of an IPS-mode liquid crystal display device in accordance with Embodiment Mode 28 of the invention. Since this embodiment mode describes a structure which is similar to that of Embodiment Mode 4 except for shapes of the first electrode 101 and the second electrode 112, illustration is omitted except for the first electrode 101 and the second electrode 112.

Figure 28A:
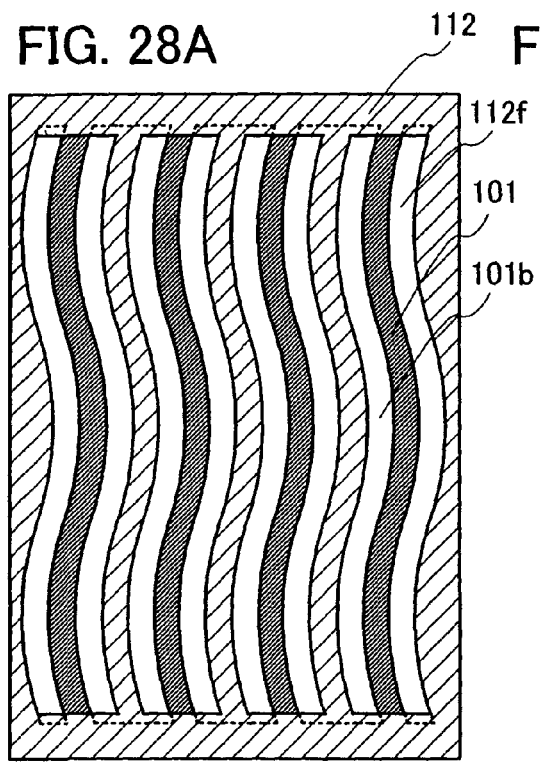
FIGS. 28A to 28D are plan views each showing a shape of an electrode of an IPS-mode liquid crystal display device in accordance with Embodiment Mode 28.

In FIG. 28A, each of an opening pattern 101b of the first electrode 101 and an opening pattern 112f of the second electrode 112 has a wave shape. The opening pattern 101b is located below and around a region in which the opening pattern 112f is not formed in the second electrode 112.

Figure 28B:
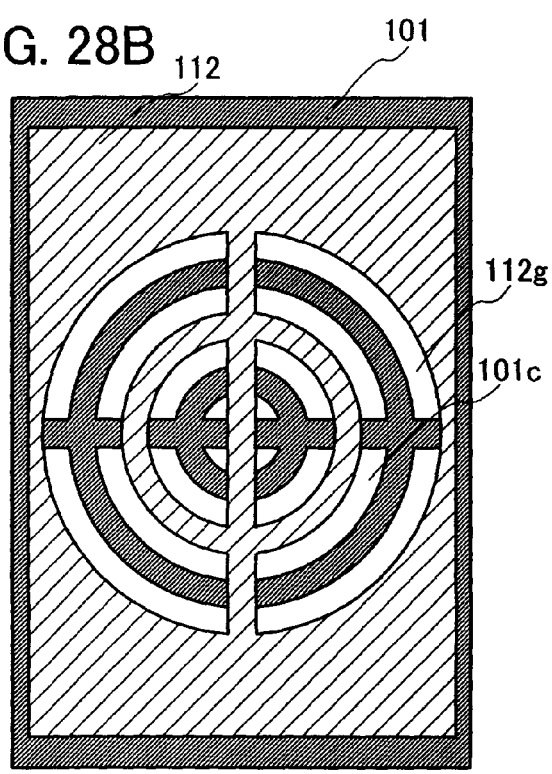

In FIG. 28B, the first electrode 101 has a shape in which a circular opening pattern 101c is provided in a center portion of a rectangular main body portion; a plurality of electrodes along circumference, radii of which are different from each other are provided in a pattern concentric with the opening pattern 101c within the opening pattern 101c; and these electrodes along the circumference are connected to the main body portion by one linear electrode. The second electrode 112 has a shape in which a circular opening pattern 112g is provided in a center portion of the rectangular main body portion; an electrode along the circumference is provided in a pattern concentric with the opening pattern 112g within the opening pattern 112g; and this electrode is connected to the main body portion by one linear electrode. Note that the electrode along the circumference included in the second electrode 112 may be provided in plural.

In addition, since the opening patterns 101b and 112g are concentric with each other, each electrode along the circumference included in the first electrode 101 and the electrode along the circumference included in the second electrode 112 are concentric with each other. Note that since the electrode along the circumference included in the first electrode 101 and the electrode along the circumference included in the second electrode 112 have different radii from each other, they are alternate and parallel to each other.

Figure 28C:
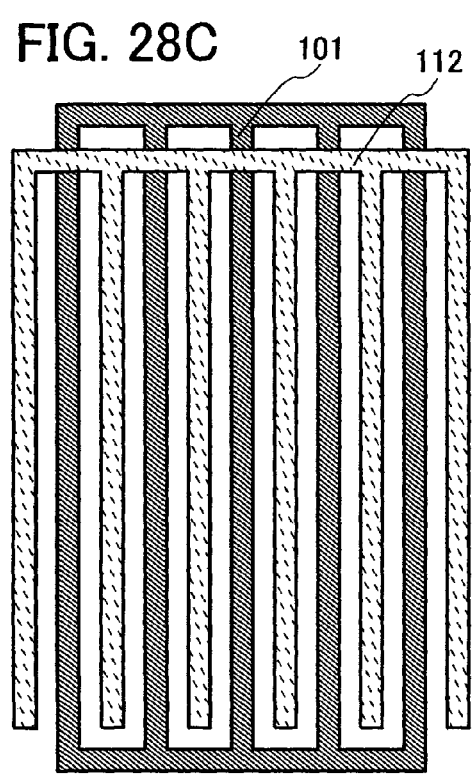

In FIG. 28C, the first electrode 101 has a shape in which a plurality of linear electrodes which are extended longitudinally in the drawing are provided alternately and in parallel to each other, and each of an upper end portion and a lower end portion of them is connected by a linear electrode which is extended laterally in the drawing. In addition, the second electrode 112 has a comb shape, and a comb-shaped portion is located in a space between the linear electrodes forming the first electrode 101.

Figure 28D:
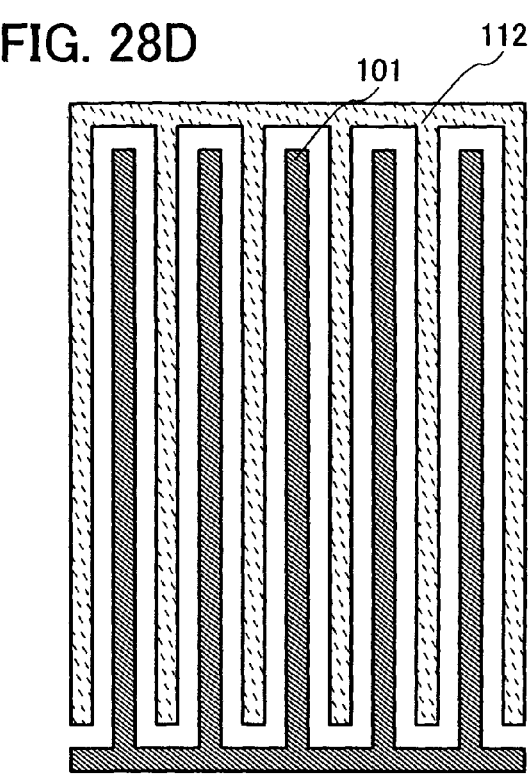

In FIG. 28D, each of the first electrode 101 and the second electrode 112 has a comb shape and they are reversed to each other. In addition, their comb-shaped portions are provided alternately.

A manufacturing method of the liquid crystal display device in accordance with this embodiment mode is almost similar to that of Embodiment Mode 4 in each case. Accordingly, the contents described in Embodiment Mode 4 can also be applied to this embodiment mode.

In accordance with this embodiment mode also, an advantageous effect which is similar to that of Embodiment Mode 4 can be obtained. Note that in the liquid crystal display devices in accordance with Embodiment Mode 5, the shape of each of the first electrode 101 and the second electrode 112 may be any one of the shapes shown in FIGS. 28A to 28D.

Embodiment Mode 29

Figure 29:
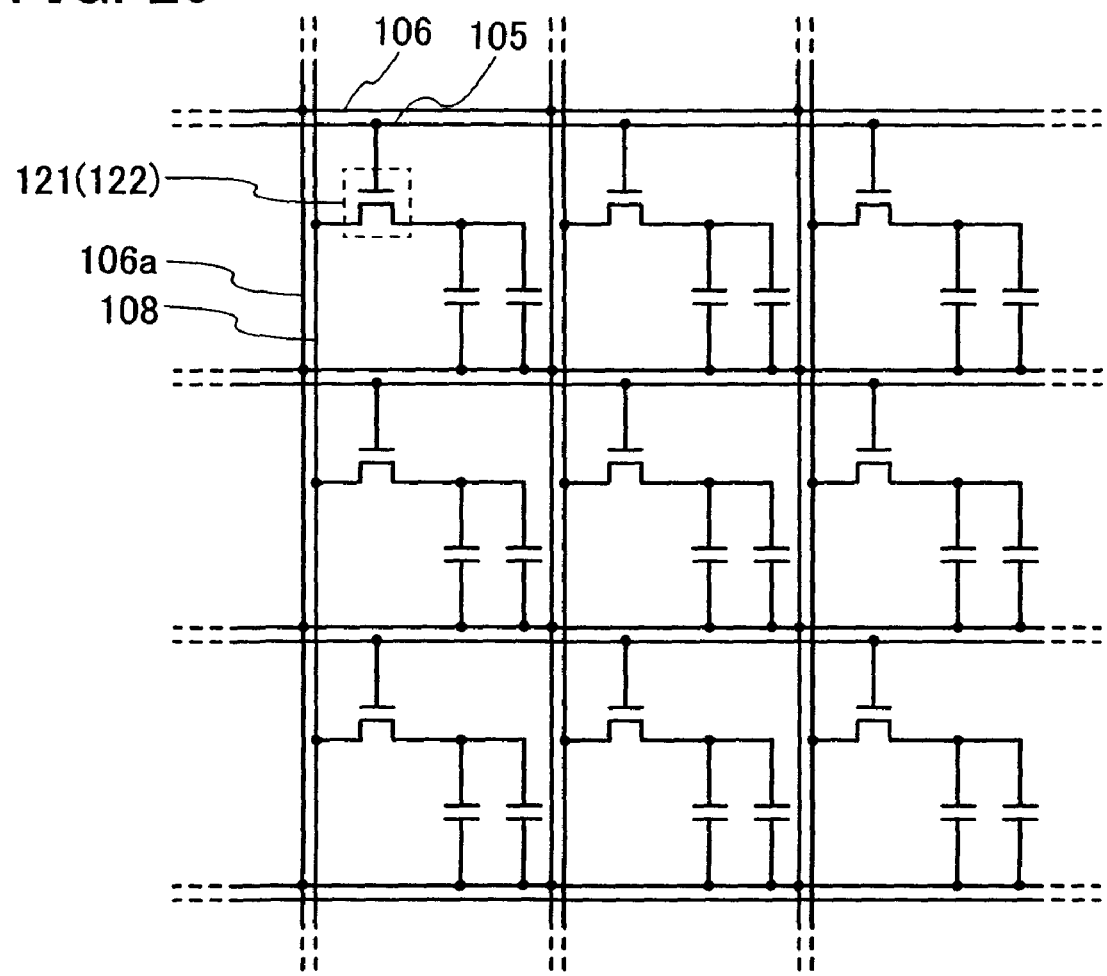
FIG. 29 is a circuit diagram showing a circuit configuration of a liquid crystal display device in accordance with Embodiment Mode 29.

FIG. 29 is a circuit diagram showing a circuit configuration of a liquid crystal display device in accordance with Embodiment Mode 29 of the invention. In the liquid crystal display device in accordance with this embodiment mode, a plurality of pixels are arranged in matrix. A structure of each pixel has a similar structure to each pixel included in the liquid crystal display devices shown in Embodiment Modes 2 to 28 except that a second auxiliary wiring 106a which is extended longitudinally in the drawing is formed. Accordingly, the contents described in Embodiment Modes 2 to 28 can also be applied to this embodiment mode. Hereinafter, common reference numerals are used for portions having similar structures to Embodiment Modes 2 to 28 and description thereof is omitted.

The second auxiliary wiring 106a is formed in the same layer as the auxiliary wiring 106, and is electrically connected to the auxiliary wiring 106 at each of intersections with the auxiliary wiring 106.

In addition, the pixel includes a capacitor $C_S$ and a capacitor $C_{LS}$ which are connected to the thin film transistors 121 and 122. The capacitor $C_S$ is a capacitor which is formed by the first electrode 101, the second electrode 112 where the opening pattern is not formed and each insulating film located between the first electrode 101 and the second electrode 112. The capacitor $C_{LS}$ is a capacitor which is formed by a portion which overlaps with the opening pattern of the second electrode 112 in the first electrode 101 and a portion located above this portion. Since these capacitors are formed, storage capacitance is increased.

In accordance with this embodiment mode also, an advantageous effect which is similar to those of Embodiment Modes 2 to 28 can be obtained. In addition, by providing the second auxiliary wiring 106a, a potential of the common electrode is easily held at the same value in all the pixels. Note that the liquid crystal display device in accordance with this embodiment mode may employ an FFS mode or an IPS mode.

Embodiment Mode 30

Figure 30A:
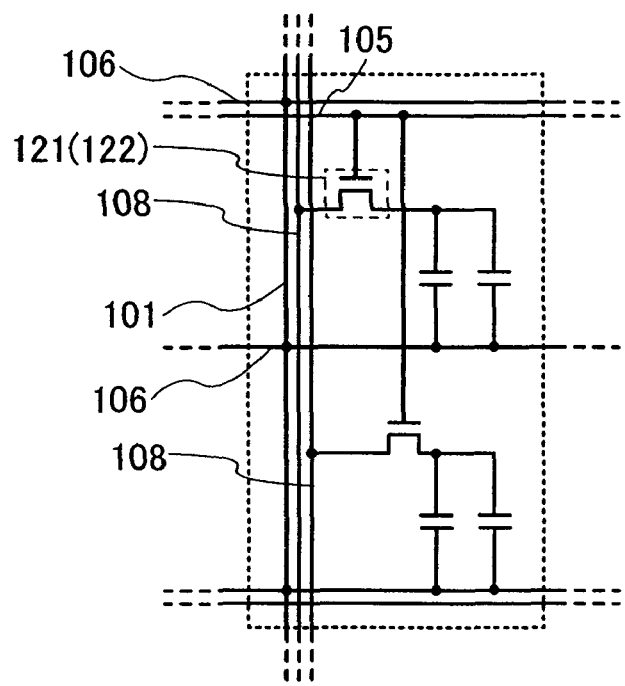
FIGS. 30A and 30B are circuit diagrams each showing a circuit configuration of a liquid crystal display device in accordance with Embodiment Mode 30.
Figure 30B:
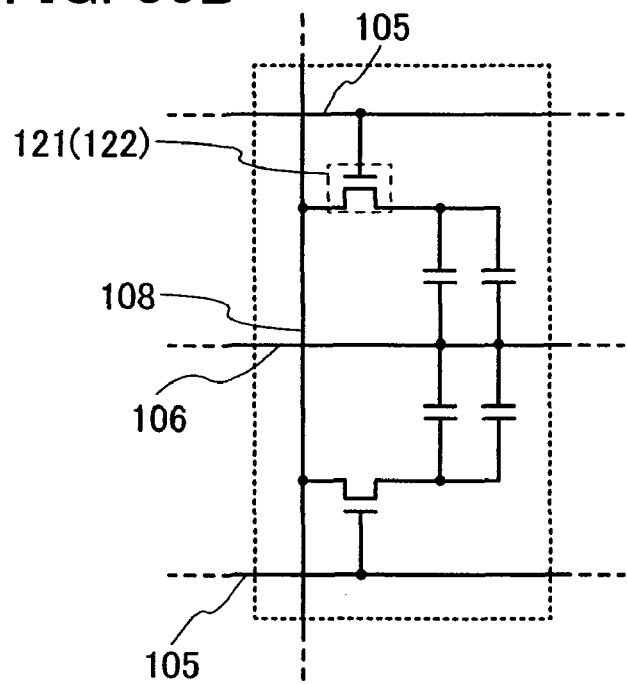

Each of FIGS. 30A and 30B is a circuit diagram of a liquid crystal display device in accordance with Embodiment Mode 30. The Liquid crystal display device in accordance with this embodiment mode is an FFS-mode or an IPS-mode liquid crystal display device, and one pixel thereof is formed of a plurality of (e.g., 2) subpixels. A structure of each subpixel is a structure which is similar to that of any one of the pixels included in the liquid crystal display devices shown in Embodiment Modes 2 to 28. Accordingly, the contents described in Embodiment Modes 2 to 28 can also be applied to this embodiment mode. Hereinafter, common reference numerals are used for portions having similar structures to Embodiment Modes 2 to 28 and description thereof is omitted.

In an example shown in FIG. 30A, a plurality of subpixels which form one pixel are electrically connected to one gate wiring 105, and are electrically connected to the different source wirings 108 and the different auxiliary wirings 106. The number of the source wirings 108 is the same number as the subpixels (2 in FIG. 30A) every one pixel column. Therefore, a different signal can be transmitted to each subpixel.

In an example shown in FIG. 30B, a plurality of subpixels which form one pixel are electrically connected to the different gate wirings 105, and are electrically connected to one auxiliary wiring 106.

Note that each subpixel includes the capacitor $C_S$ and the capacitor $C_{LS}$. Since each of these capacitors has a structure which is similar to that of Embodiment Mode 29, description thereof is omitted.

In accordance with this embodiment mode, an advantageous effect which is similar to those of Embodiment Modes 2 to 28 can be obtained. In addition, since one pixel is formed of a plurality of subpixels, a viewing angle can be further increased. Further, an advantageous effect can be obtained in which the pixel is provided with redundancy, and an advantageous effect can be obtained in which area gray scale display can be performed.

Embodiment Mode 31

A manufacturing method of a liquid crystal display device in accordance with Embodiment Mode 31 is described with reference to FIGS. 31A to 31E, FIGS. 32A to 32D, and FIGS. 33A and 33B. This embodiment mode is an example of a manufacturing method of a liquid crystal display device having the structure shown in Embodiment Mode 3. By using this manufacturing method, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a viewing angle is widened by applying an optimal electric field. Although an interlayer insulating film is a single-layer structure in FIGS. 31A to 31E, FIGS. 32A to 32D, and FIGS. 33A and 33B, it may be a two-layer structure.

Figure 31A:
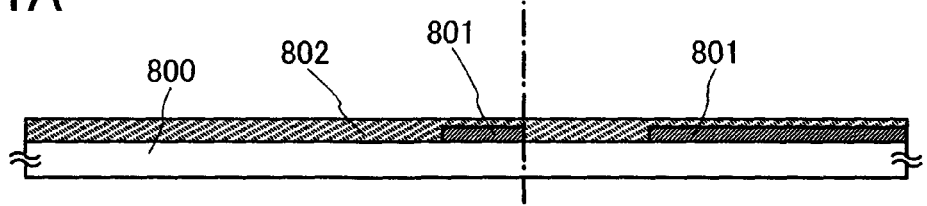
FIGS. 31A to 31E are cross-sectional views showing a manufacturing method of a liquid crystal module in accordance with Embodiment Mode 31.

First, as shown in FIG. 31A, a conductive film having a light-transmitting property is formed over a substrate 800. The substrate 800 is a glass substrate, a quartz substrate, a substrate formed of an insulator such as alumina, a plastic substrate having heat resistance that can resist processing temperature of a post-process, a silicon substrate, or a metal substrate. Alternatively, the substrate 800 may be a substrate in which an insulating film of silicon oxide, silicone nitride, or the like is formed on a surface of metal such as stainless, a semiconductor substrate, or the like. Note that in the case of using a plastic substrate as the substrate 800, it is preferable to use a plastic substrate having a relatively high glass transition point such as PC (polycarbonate), PES (polyethersulfone), PET (polyethylene terephthalate), or PEN (polyethylene naphthalate).

In addition, the conductive film is, for example, an ITO film, or an IZO (Indium Zinc Oxide) film in which indium tin oxide or indium oxide including an Si element is mixed with zinc oxide (ZnO) at 2 to 20 wt %.

Subsequently, a photoresist film is formed over this conductive film, and this photoresist film is exposed and developed. Thus, a resist pattern is formed over the conductive film. Subsequently, the conductive film is etched by using this resist pattern as a mask. Thus, a first electrode 801 which is the pixel electrode is formed over the substrate 800. After that, the resist pattern is removed.

Subsequently, an insulating film 802 is formed over the first electrode 801 and the substrate 800. For example, the insulating film 802 is an insulating film in which a silicon oxide ($SiO_x$) film is stacked on a silicon nitride ($SiN_x$) film; however, it may be another insulator (e.g., silicon oxynitride ($SiO_xN_y$: x>y), or silicon nitride oxide ($SiN_xO_y$: x>y).

Here, by performing nitriding on a surface of the insulating film 802 formed of the silicon oxide film, the silicon oxynitride film, or the like with high-density plasma, a nitride film may be formed on the surface of insulating film 802.

For example, high-density plasma is generated by using a microwave of 2.45 GHz, and has electron density of $1\times10^{11}$ to $1\times10^{13}/cm^3$, electron temperature of 2 eV or less, and ion energy of 5 eV or less. Such high-density plasma has low kinetic energy of active species, and can form a film with less plasma damage and fewer defects compared with conventional plasma treatment. A distance from an antenna generating a microwave to the insulating film 802 is set to 20 to 80 mm, and preferably, it is set to 20 to 60 mm.

The surface of the insulating film 802 can be nitrided by performing the high-density plasma treatment in a nitrogen atmosphere, such as in an atmosphere including nitrogen and rare gas or in an atmosphere including nitrogen, hydrogen, and rare gas, or in an atmosphere including ammonia and rare gas. Since such a nitride film can suppress impurity diffusion from the substrate 800 and can be formed to be extremely thin by the high-density plasma treatment, influence of stress on a semiconductor film formed thereover can be reduced.

Figure 31B:
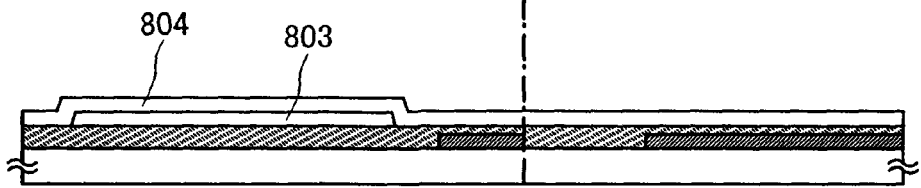

Subsequently, as shown in FIG. 31B, a crystalline semiconductor film (e.g., a polysilicon film) is formed over the insulating film 802. As a method of forming the crystalline semiconductor film, a method of directly forming the crystalline semiconductor film over the insulating film 802, and a method of forming an amorphous semiconductor film over the insulating film 802, and then crystallizing the amorphous semiconductor film can be given.

As a method for crystallizing the amorphous semiconductor film, a method of laser light irradiation, a method of thermal crystallization using an element which promotes crystallization of a semiconductor film (e.g., a metal element such as nickel), or a method of laser light irradiation after thermal crystallization using an element which promotes crystallization of the semiconductor film can be used. Needless to say, a method of thermal crystallization of the amorphous semiconductor film without using the above-described element can also be used; however, it is limited to the case of a substrate which can withstand high temperature such as a quartz substrate or a silicon wafer.

When laser irradiation is used, a continuous wave laser beam (a CW laser beam) or a pulsed laser beam can be used. As a laser beam which can be used here, laser beams which are emitted from one laser or a plurality of lasers from a gas laser such as an Ar laser, a Kr laser, or an excimer laser, a laser using a medium in which one element or a plurality of elements of Nd, Yb, Cr, Ti, Ho, Er, Tm, and Ta is added as a dopnat to single crystal of YAG, $YVO_4$, forsterite ($Mg_2SiO_4$), $YAlO_3$, or $GdVO_4$, or polycrystal (ceramic) of YAG, $Y_2O_3$, $YVO_4$, $YAlO_3$, or $GdVO_4$, a glass laser, a ruby laser, an alexandrite laser, a Ti:sapphire laser, a copper vapor laser, or a gold vapor laser can be given. By laser beam irradiation with a fundamental wave of such a laser beam and a second harmonic wave to a fourth harmonic wave of the fundamental wave of such a laser beam, crystals each having a large particle size can be obtained. For example, a second harmonic wave (532 nm) or a third harmonic wave (355 nm) of an Nd:$YVO_4$ laser (having a fundamental wave of 1064 nm) can be used. At this time, power density of the laser is necessary to be about 0.01 to 100 $MW/cm^2$ (preferably, 0.1 to 10 $MW/cm^2$). Irradiation is performed by setting the scan speed at about 10 to 2000 cm/sec.

Note that the laser using a medium in which one element or a plurality of elements of Nd, Yb, Cr, Ti, Ho, Er, Tm, and Ta is added as a dopnat into single crystal of YAG, $YVO_4$, forsterite ($Mg_2SiO_4$), $YAlO_3$, or $GdVO_4$, or polycrystal (ceramic) of YAG, $Y_2O_3$, $YVO_4$, $YAlO_3$, or $GdVO_4$; an Ar ion laser; or the Ti:sapphire laser can be continuously oscillated, and can also be pulsed oscillated with a repetition rate of 10 MHz or more by performing a Q-switch operation, mode locking, or the like. When the laser beam is emitted with the repetition rate of 10 MHz or more, a semiconductor film is irradiated with the next pulse during the period in which the semiconductor film is melted by the laser beam and solidified. Accordingly, a solid-fluid interface can be continuously moved in the semiconductor film so that crystal grains which have grown continuously in the scan direction can be obtained, unlike the case of using a pulsed laser with a low repetition rate.

When ceramic (a polycrystal) is used as a medium, the medium can be formed in a free shape in a short time and at low cost. When a single crystal is used, a columnar medium having a diameter of several mm and a length of several tens mm is usually used; however, when ceramic is used, a larger medium can be made.

Since concentration of a dopant such as Nd or Yb in a medium which directly contributes to light emission cannot be greatly changed in either the single crystal or the polycrystal, there is a limitation on improvement in output of a laser by increasing the concentration of the dopant to some extent. However, in the case of ceramic, significant improvement in output can be expected because the size of the medium can be extremely increased compared with the single crystal.

Further, in the case of ceramic, a medium having a parallelepiped shape or a rectangular parallelepiped shape can be easily formed. When a medium having such a shape is used and emitted light is made travel in a zigzag manner inside the medium, a path of the emitted light can be made long. Therefore, amplification is increased so that a laser beam can be emitted with high output. Furthermore, since a cross section of a laser beam emitted from the medium having such a shape is a quadrangular shape, it has an advantage in being shaped into a linear beam compared with a circular beam. By shaping laser beam emitted in this manner with an optical system, a linear beam having a length of 1 mm or less on a lateral side and a length of several mm to several m on a longitudinal side can be easily obtained. Moreover, when the medium is uniformly irradiated with excited light, energy distribution of the linear beam is uniform in a longitudinal direction.

By irradiating the semiconductor film with this linear beam, the whole surface of the semiconductor film can be annealed more uniformly. When uniform annealing is needed to opposite ends of the linear beam, a device such that a portion where energy is attenuated is shielded by providing slits in the opposite ends is needed.

When the semiconductor film is annealed by using the linear beam having uniform intensity which can be obtained in this manner and an electronic device is manufactured by using this semiconductor film, characteristics of the electronic device are excellent and uniform.

As a method of thermal crystallization by using an element which promotes crystallization of an amorphous semiconductor film, a technique disclosed in Japanese Published Patent Application No. H08-78329 can be used. The technique disclosed in the patent application is as follows. A metal element which promotes crystallization is added to an amorphous semiconductor film (also called an amorphous silicon film) and heat treatment is performed thereto, so that an amorphous semiconductor film is crystallized from an added region as a starting point.

Alternatively, the amorphous semiconductor film can be crystallized by performing intense light irradiation instead of heat treatment. In this case, any one of infrared light, visible light, and ultraviolet light, or a combination thereof can be used. Typically, light emitted from a halogen lamp, a metal halide lamp, a xenon arc lamp, a carbon arc lamp, a high pressure sodium lamp, or high pressure mercury lamp is used. A lamp light source is turned on for 1 to 60 seconds, preferably, 30 to 60 seconds, and this operation is repeated 1 to 10 times, preferably, 2 to 6 times. Although emission intensity of the lamp light source is set as appropriate, it is set so that a semiconductor film is heated at around 600 to 1000° C. for a moment. Note that heat treatment for releasing hydrogen included in an amorphous semiconductor film having an amorphous structure may be performed before performing intense light irradiation, if necessary. In addition, the amorphous semiconductor film may be crystallized by performing both heat treatment and intense light irradiation.

In order to increase degree of crystallinity (a ratio of a crystalline component in a total volume of a film) of a crystalline semiconductor film after heat treatment to repair a defect left in a crystal grain, the crystalline semiconductor film may be irradiated with laser light in an atmosphere or an oxygen atmosphere. As laser light, the above-described one can be used.

In addition, it is necessary to remove the added element from the crystalline semiconductor film, and a method thereof is described below. First, a barrier layer formed of an oxide film (called chemical oxide) is formed having a thickness of 1 nm to 10 nm on a surface of the crystalline semiconductor film by processing the surface of the crystalline semiconductor film with a solution including ozone (typically, ozone water). The barrier layer functions as an etching stopper when only a gettering layer is selectively removed in a later step.

Subsequently, the gettering layer including a rare gas element is formed over the barrier layer as a gettering site. Here, a semiconductor film including a rare gas element is formed as the gettering layer by CVD or sputtering. When the gettering layer is formed, a sputtering condition is controlled as appropriate so that the rare gas element is added to the gettering layer. As the rare gas element, one element or a plurality of elements selected from helium (He), neon (Ne), argon (Ar), krypton (Kr), and xenon (Xe) is used.

In the case where the gettering layer is formed by using source gas including phosphorus which is an impurity element is used or by using a target including phosphorus, gettering can be performed by using a coulomb force of phosphorus as well as gettering by the rare gas element. In addition, since a metal element (e.g., nickel) tends to move to a region having high oxygen concentration in gettering, it is preferable that oxygen concentration included in the gettering layer be, for example, $5 \times 10^{18}$ cm$^{-3}$ or more.

Subsequently, gettering of the metal element (e.g., nickel) is performed by performing heat treatment (e.g., thermal treatment or intense light irradiation) to the crystalline semiconductor film, the barrier layer, and the gettering layer, and the metal element in the crystalline semiconductor film is decreased in its concentration or removed.

Subsequently, etching is performed by a known etching method using the barrier layer as an etching stopper, and only the gettering layer is selectively removed. After that, the barrier layer formed of the oxide film is removed by an etchant including, for example, hydrofluoric acid.

Here, an impurity ion may also be added considering threshold characteristics of a TFT manufactured.

Subsequently, a photoresist film (not shown) is applied over the crystalline semiconductor film by an application method, and this photoresist film is exposed and developed. The application method means a spin coating method, a spray method, a screen printing method, a paint method, or the like. Thus, a resist pattern is formed over the crystalline semiconductor film. Subsequently, the crystalline semiconductor film is etched by using this resist pattern as a mask. Thus, a crystalline semiconductor film 803 is formed over the insulating film 802.

Subsequently, after a surface of the crystalline semiconductor film 803 is washed by an etchant including hydrofluoric acid, a gate insulating film 804 is formed having a thickness of 10 nm to 200 nm over the crystalline semiconductor film 803. The gate insulating film 804 is formed of an insulating film including silicon as a main component such as a silicon oxide film, a silicon nitride film, a silicon oxynitride film, a silicon nitride oxide film, or the like. In addition, the gate insulating film 804 may be a single layer or a stacked-layer film. Note that the gate insulating film 804 is formed also over the insulating film 802.

Figure 31C:
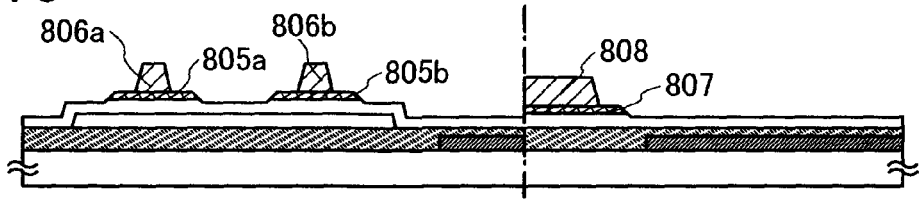

Subsequently, as shown in FIG. 31C, after the gate insulating film 804 is washed, a first conductive film and a second conductive film are sequentially formed over the gate insulating film 804. For example, the first conductive film is a tungsten film and the second conductive film is a tantalum nitride film.

Subsequently, a photoresist film (not shown) is applied over the second conductive film, and this photoresist film is exposed and developed. Thus, a resist pattern is formed over the second conductive film. Subsequently, the first conductive film and the second conductive film are etched in a first condition, and the second conductive film is etched in a second condition by using this resist pattern as a mask. Thus, first gate electrodes 805a and 805b, and second gate electrodes 806a and 806b are formed over the crystalline semiconductor film 803. The first gate electrodes 805a and 805b are separated from each other. The second gate electrode 806a is located over the first gate electrode 805a, and the second gate electrode 806b is located over the first gate electrode 805b. A tilt angle of each side surface of the first gate electrodes 805a and 805b is more gradual than a tilt angle of each side surface of the second gate electrodes 806a and 806b.

In addition, by this etching treatment, a first wiring 807 and a second wiring 808 located over the first wiring 807 are formed near the first electrode 801. Here, it is preferable that each gate electrode and each wiring described above be led so that corners thereof are rounded when seen from a direction which is perpendicular to the substrate 800. By rounding the corners, the case where dust or the like remains at the corners of the wiring can be prevented, so that a defect caused by dust can be suppressed to improve a yield. After that, the photoresist film is removed.

Figure 31D:
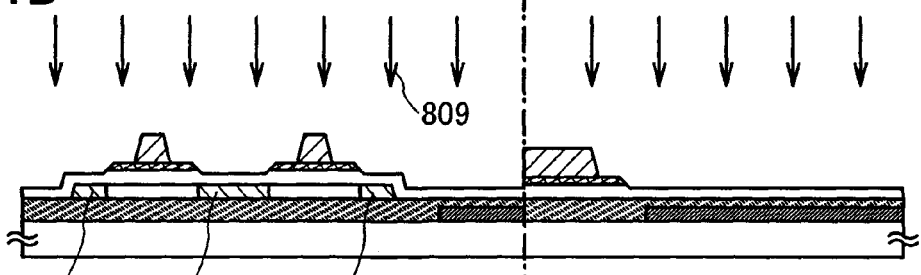

Subsequently, as shown in FIG. 31D, an impurity element 809 (e.g., phosphorus) of a first conductivity type (e.g., n-type conductivity) is added to the crystalline semiconductor film 803 using the first gate electrodes 805a and 805b, and the second gate electrodes 806*a* and 806*b* as masks. Thus, first impurity regions 810*a*, 810*b*, and 810*c* are formed in the crystalline semiconductor film 803. The first impurity region 810*a* is located in a region serving as a source of the thin film transistor. The first impurity region 810*c* is located in a region serving as a drain of the thin film transistor. The first impurity region 810*b* is located between the first gate electrodes 805*a* and 805*b*.

Figure 31E:
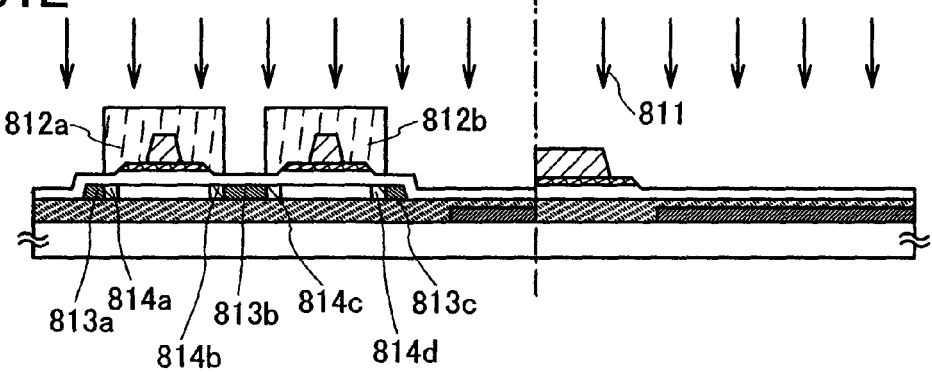

Subsequently, as shown in FIG. 31E, a photoresist film is applied so as to cover the whole surface of each of the first gate electrodes 805*a* and 805*b* and the second gate electrodes 806*a* and 806*b*, and this photoresist film is exposed and developed. Thus, a top face and the periphery of each of the first gate electrode 805*a* and the second gate electrode 806*a*, and a top face and the periphery of each of the first gate electrode 805*b* and the second gate electrode 806*b* are covered with resist patterns 812*a* and 812*b*. Subsequently, an impurity element 811 of the first conductivity type (e.g., phosphorus) is added to the crystalline semiconductor film 803 by using the resist patterns 812*a* and 812*b* as masks. Thus, the impurity element 811 of the first conductivity type is added again to a part of each of the first impurity regions 810*a*, 810*b*, and 810*c*, so that second impurity regions 813*a*, 813*b*, and 813*c* are formed. Note that the other parts of each of the first impurity regions 810*a*, 810*b*, and 810*c* are left as third impurity regions 814*a*, 814*b*, 814*c*, and 814*d*.

Figure 32A:
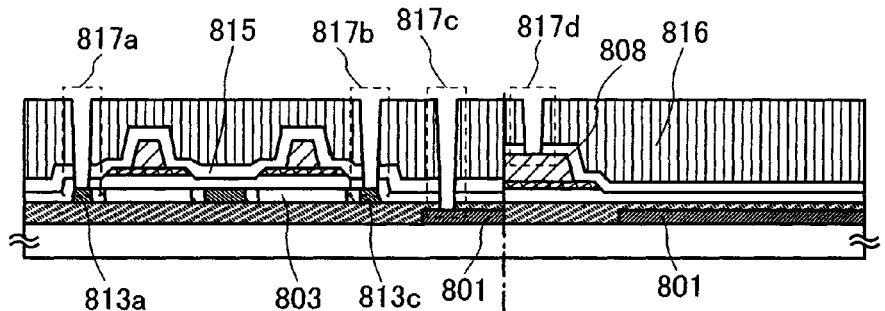
FIGS. 32A to 32D are cross-sectional views showing a manufacturing method of the liquid crystal module in accordance with Embodiment Mode 31.

After that, as shown in FIG. 32A, the resist patterns 812*a* and 812*b* are removed. Subsequently, an insulating film covering almost the whole surface (not shown) is formed. This insulating film is, for example, a silicon oxide film, and is formed by plasma CVD.

Subsequently, by performing heat treatment to the crystalline semiconductor film 803, the impurity elements which are added are activated. This heat treatment is a rapid thermal annealing method (an RTA method) using a lamp light source, a method of a YAG laser or an excimer laser irradiation from a back side, or heat treatment using a furnace, or treatment by a method combining a plurality of these methods.

By the above-described heat treatment, the element which is used as a catalyzer (e.g., a metal element such as nickel) when the crystalline semiconductor film 803 is crystallized is gettered by the second impurity regions 813*a*, 813*b*, and 813*c* including the high concentration impurities (e.g., phosphorus), and nickel concentration mainly in a portion serving as a channel formation region is reduced in the crystalline semiconductor film 803, as well as activating the impurity element. Accordingly, crystallinity of the channel formation region is improved. Therefore, an off-current value of the TFT is lowered and high electron field-effect mobility can be obtained. A TFT having excellent properties can be obtained in this manner.

Subsequently, an insulating film 815 is formed so as to cover the surface of the crystalline semiconductor film 803. The insulating film 815 is, for example, a silicon nitride film, and is formed by plasma CVD. Subsequently, a planarizing film serving as an interlayer insulating film 816 is formed over the insulating film 815. As the interlayer insulating film 816, an inorganic material having a light-transmitting property (e.g., silicon oxide, silicon nitride, or silicon nitride including oxygen), a photosensitive or non-photosensitive organic material (e.g., polyimide, acryl, polyamide, polyimide amide, resist or benzocyclobutene), a stacked layer of such a material, or the like is used. In addition, as another film having a light-transmitting property which is used as the planarizing film, an insulating film formed of an SiOx film including an alkyl group obtained by the application method, such as an insulating film formed by using silica glass, an alkylsiloxane polymer, an alkylsilsesquioxane polymer, a hydrogen silsesquioxane polymer, a hydrogen alkylsilsesquioxane polymer, or the like can be used. As examples of a siloxane-based polymer, coating insulating film materials such as PSB-K1 and PSB-K31 (products of Toray industries, Inc.) and ZRS-5PH (a product of Catalysts & Chemicals Industries Co., Ltd.) can be given. The interlayer insulating film 816 may be a single-layer film or a multi-layer film.

Subsequently, a photoresist film (not shown) is applied over the interlayer insulating film 816, and this photoresist film is exposed and developed. Thus, a resist pattern is formed over the interlayer insulating film 816. Subsequently, the interlayer insulating film 816, the insulating film 815, and the gate insulating film 804 are etched by using this resist pattern as a mask. Thus, contact holes 817*a*, 817*b*, 817*c*, and 817*d* are formed in the interlayer insulating film 816, the insulating film 815, and the gate insulating film 804. The contact hole 817*a* is located over the second impurity region 813*a* which is the source of the transistor, and the contact hole 817*b* is located over the second impurity region 813*c* which is the drain of the transistor. The contact hole 817*c* is located over the first electrode 801, and the contact hole 817*d* is located over the second wiring 808. After that, the resist pattern is removed.

Figure 32B:
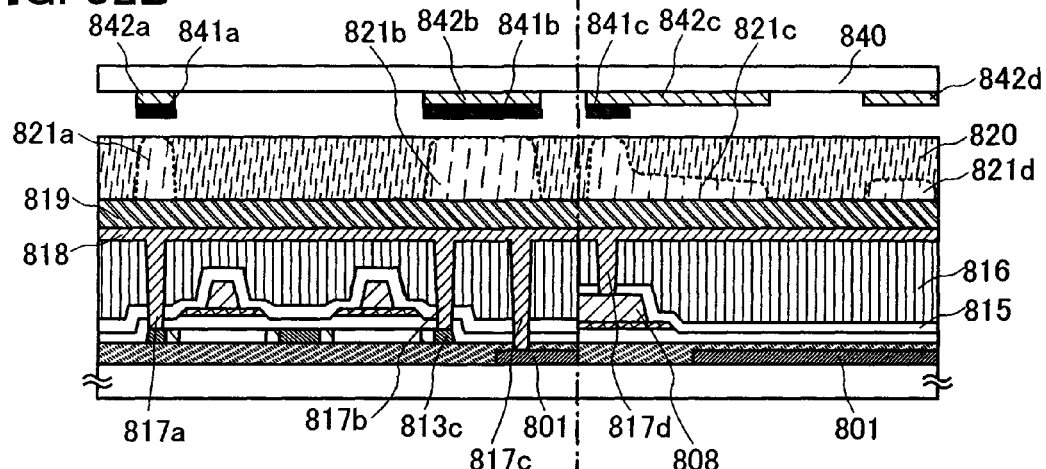

Subsequently, as shown in FIG. 32B, a first conductive film 818 is formed in each of the contact holes 817*a*, 817*b*, 817*c*, and 817*d* and over the interlayer insulating film 816. In addition, the first conductive film 818 is a conductive film having a light-transmitting property, such as an ITO film, or an IZO (Indium Zinc Oxide) film in which indium tin oxide or indium oxide including an Si element is mixed with zinc oxide (ZnO) at 2 to 20 wt %. Subsequently, a second conductive film 819 is formed over the first conductive film 818. The second conductive film 819 is, for example, a metal film.

Subsequently, a photoresist film 820 is applied over the second conductive film 819. Subsequently, a reticle 840 is provided above the photoresist film 820. As for the reticle 840, semi-transmissive film patterns 842*a*, 842*b*, 842*c*, 842*d* are formed over a glass substrate, and light-shielding patterns 841*a*, 841*b*, and 841*c* are formed over a part of each of the semi-transmissive film patterns 842*a*, 842*b*, 842*c*, and 842*d*. The semi-transmissive film pattern 842*a* and the light-shielding pattern 841*a* are located above the contact hole 817*a*; the semi-transmissive film pattern 842*b* and the light-shielding pattern 841*b* are located above the contact hole 817*b* and the contact hole 817*c*; the semi-transmissive film pattern 842*c* and the light-shielding pattern 841*c* are located above the contact hole 817*d*; and the semi-transmissive film pattern 842*d* is located above the first electrode 801.

Subsequently, the photoresist film 820 is exposed by using the reticle 840 as a mask. Thus, the photoresist film 820 is exposed to light except for a portion located below the light-shielding patterns 841*a*, 841*b*, and 841*c* and lower layer portions located near the second conductive film 819 which is below a portion where the semi-transmissive film patterns 842*a*, 842*b*, 842*c*, and 842*d* and the light-shielding patterns 841*a*, 841*b*, and 841*c* are not overlapped. Note that reference numerals 821*a*, 821*b*, 821*c*, and 821*d* are used for the portions which are not exposed to light.

Figure 32C:
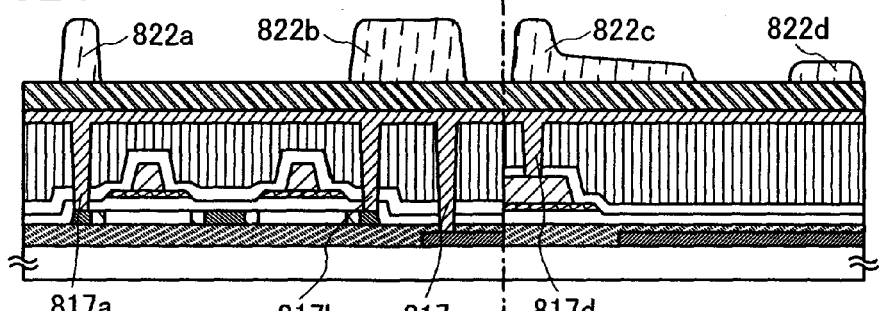

Subsequently, as shown in FIG. 32C, the photoresist film 820 is developed. Thus, the portions which are exposed to light in the photoresist film 820 are removed, and resist patterns 822*a*, 822*b*, 822*c*, and 822*d* are formed. The resist pattern 822*a* is located over the contact hole 817*a*. The resist pattern 822*b* is located over each of the contact hole 817*b* and the contact hole 817*c* and therebetween. The resist pattern 822*c* is located over and around the contact hole 817*d*. The resist pattern 822d is located over the first electrode 801. Note that a portion other than a position over the contact hole 817d in the resist pattern 822c, and the resist pattern 822d are thinner than other resist patterns.

Figure 32D:
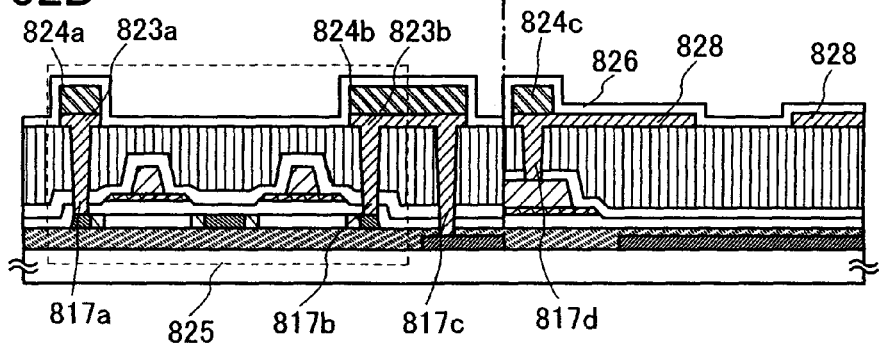

Subsequently, as shown in FIG. 32D, the first conductive film 818 and the second conductive film 819 are etched by using the resist patterns 822a, 822b, 822c, and 822d as masks. Thus, the first conductive film 818 and the second conductive film 819 are removed from regions which are not covered with the resist patterns 822a, 822b, 822c, and 822d.

In addition, since the resist patterns 822a, 822b, 822c, and 822d are also gradually etched, thin portions of the resist patterns (specifically, the portion other than the portion over the contact hole 817d in the resist pattern 822c, and the resist pattern 822d) are removed during etching treatment. Therefore, in a portion located below each of the portion other than the portion over the contact hole 817d in the resist pattern 822c, and the resist pattern 822d, the second conductive film 819 is removed and only the first conductive film 818 is left. After that, the resist patterns 822a, 822b, and 822c are removed.

In this manner, source wirings 823a and 824a, drain wirings 823b and 824b, a conductive film for connecting 824c, and a second electrode 828 which is a common electrode are formed by one resist pattern and one etching treatment. The source wirings 823a and 824a, and the drain wirings 823b and 824b form a thin film transistor 825, with the crystalline semiconductor film 803, each impurity region formed in the crystalline semiconductor film 803, the gate insulating film 804, the first gate electrodes 805a and 805b, and the second gate electrodes 806a and 806b. In addition, the drain wirings 823b and 824b electrically connect the impurity region 813c serving as the drain to the first electrode 801. The second electrode 828 is electrically connected to the second wiring 808 by being partially embedded in the contact hole 817d. The conductive film for connecting 824c is located over the second electrode 828 located over the contact hole 817d.

After that, a first alignment film 826 is formed. In this manner, an active matrix substrate is formed. Note that by the treatment shown in FIGS. 31A to 31E, and FIGS. 32A to 32D, thin film transistors 827 and 829 (shown in FIG. 33B) are also formed in a gate signal line driver circuit region 854 of a liquid crystal display device shown in FIGS. 33A and 33B. Further, by the treatment shown in FIGS. 31B to 31D, a first terminal electrode 838a and a second terminal electrode 838b (shown in FIG. 33B) which connect the active matrix substrate to the outside are formed.

Figures 33A, 33B:
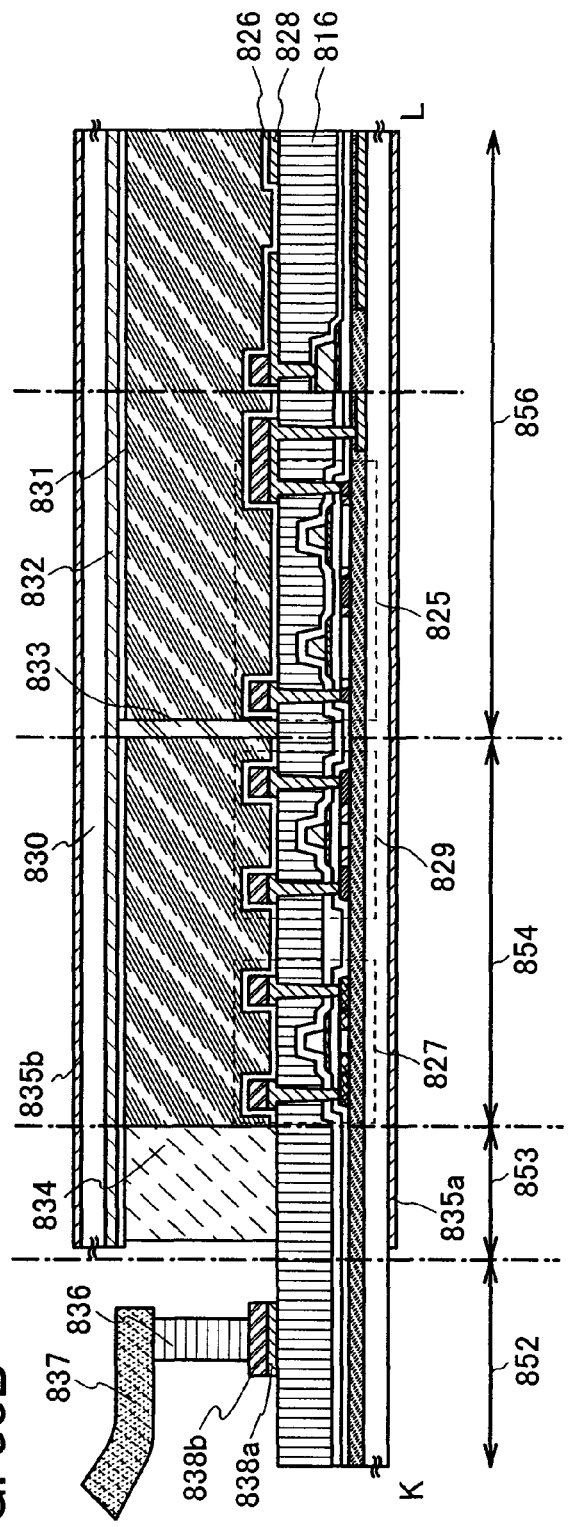
FIG. 33A is a plan view of the liquid crystal module in accordance with Embodiment Mode 31.
FIG. 33B is a cross-sectional view taken along a line K-L in FIG. 33A.

After that, as shown in a plan view in FIG. 33A and a cross-sectional view taken along a line K-L in FIG. 33B, an organic resin film such as an acryl resin film is formed over the active matrix substrate, and this organic resin film is selectively removed by etching using a resist pattern. Thus, a columnar spacer 833 is formed over the active matrix substrate. Subsequently, liquid crystals are dropped on the active matrix substrate after a sealant 834 is formed in a sealing region 853. Before dropping the liquid crystal, a protective film which prevents the sealant and the liquid crystals from reacting with each other may be formed.

After that, an opposite substrate 830 over which a color filter 832 and a second alignment film 831 are formed is provided in a position opposite to the active matrix substrate, and these two substrates are attached together with the sealant 834. At this time, the active matrix substrate and the opposite substrate 830 are attached together with a uniform distance by the spacer 833. Subsequently, a space between the substrates is completely sealed by using a sealant (not shown). In this manner, the liquid crystals are sealed between the active matrix substrate and the opposite substrate.

Subsequently, either one or both of the active matrix substrate and the opposite substrate is/are separated in a desired shape, if necessary. Further, polarizing plates 835a and 835b are provided. Subsequently, a flexible printed circuit (hereinafter described as an FPC) 837 is connected to the second terminal electrode 838b provided in an external terminal connecting region 852 through an anisotropic conductive film 836.

A structure of a liquid crystal module formed in this manner is described below. A pixel region 856 is provided in the center of the active matrix substrate. A plurality of pixels are formed in the pixel region 856. In FIG. 33A, a gate signal line driver circuit region 854 for driving each gate signal line is provided above and below the pixel region 856. In addition, a source signal line driver circuit region 857 for driving each source signal line is provided in a region between the pixel region 856 and the FPC 837. The gate signal line driver circuit region 854 may be provided only on one side, which can be selected appropriately considering a substrate size or the like in the liquid crystal module. However, it is preferable that the gate signal line driver circuit regions 854 be symmetrically provided with the pixel region 856 interposed therebetween when operation reliability, driving efficiency, or the like of the circuit is considered. Further, input of a signal to each driver circuit is performed by the FPC 837.

In accordance with this embodiment mode also, an effect which is the same as that of Embodiment Mode 3 can be obtained.

Embodiment Mode 32

A liquid crystal display module in accordance with Embodiment Mode 32 is described with reference to FIGS. 34A and 34B, and FIGS. 35A and 35B. In each drawing, a structure of a pixel portion 930 is similar to the structure of the pixel region 856 shown in Embodiment Mode 31, in which a plurality of pixels are formed over the substrate 100.

Figure 34A:
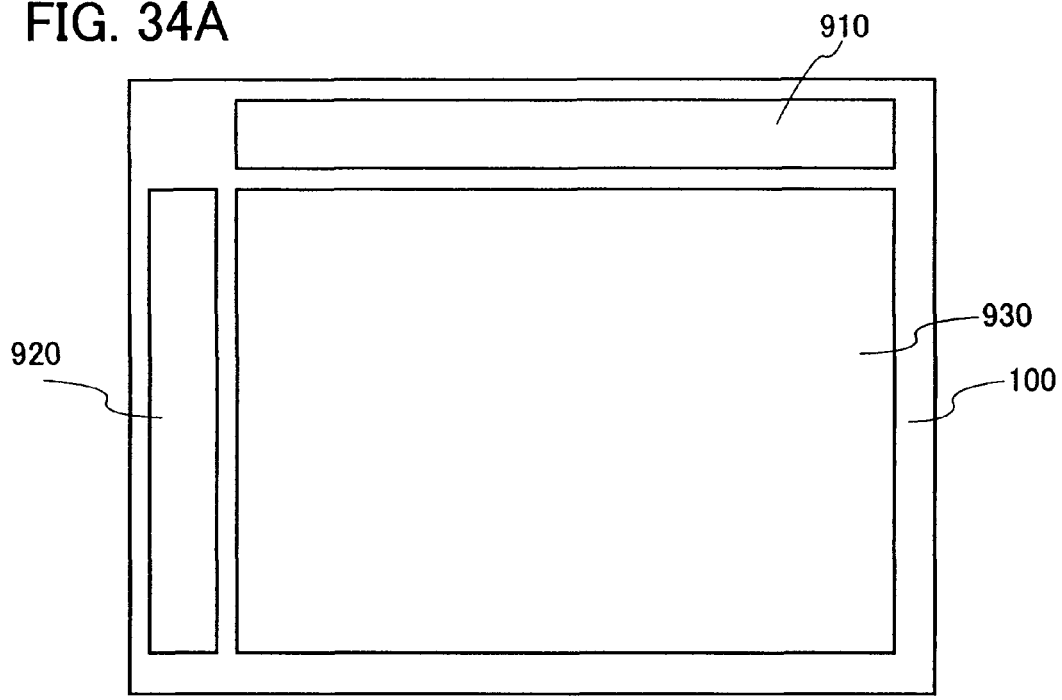
FIGS. 34A and 34B are diagrams showing a liquid crystal display module in accordance with Embodiment Mode 32.
Figure 34B:
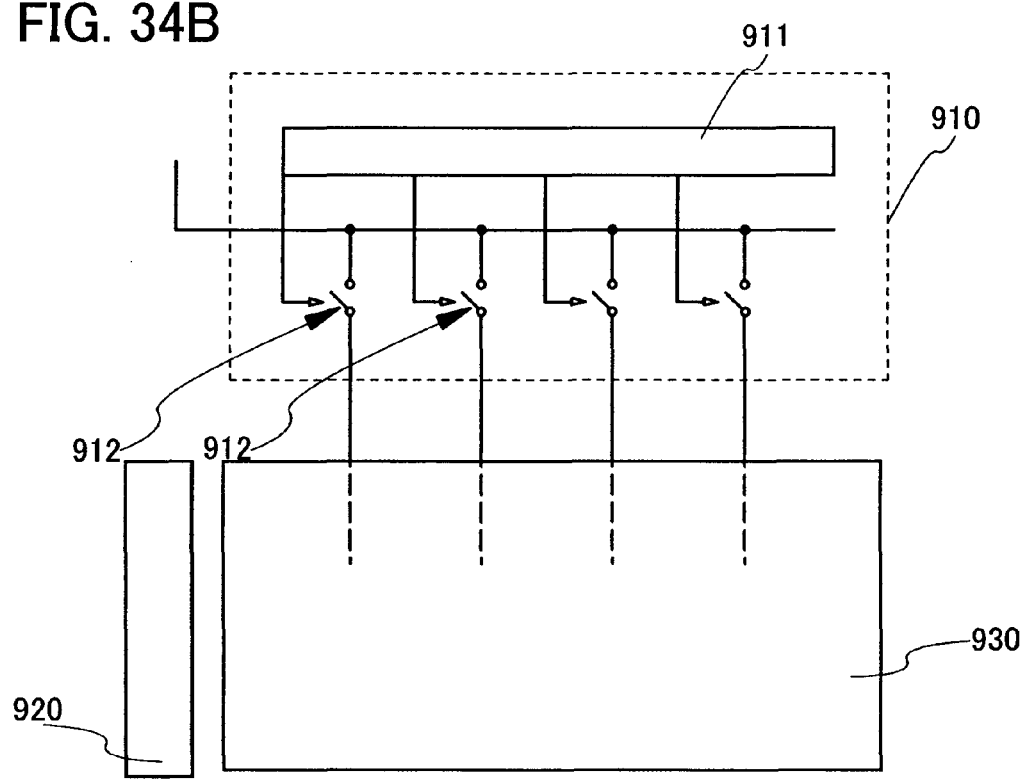

FIG. 34A is a schematic plan view of the liquid crystal display module, and FIG. 34B is a diagram showing a circuit configuration of a source driver 910. In an example shown in FIGS. 34A and 34B, both of a gate driver 920 and the source driver 910 are formed over the same substrate 100 as the pixel portion 930, as shown in FIG. 34A. The source driver 910 includes a plurality of thin film transistors 912 for controlling a source signal line to which an input video signal is transmitted, and a shift register 911 for controlling the plurality of thin film transistors 912, as shown in FIG. 34B.

Figure 35A:
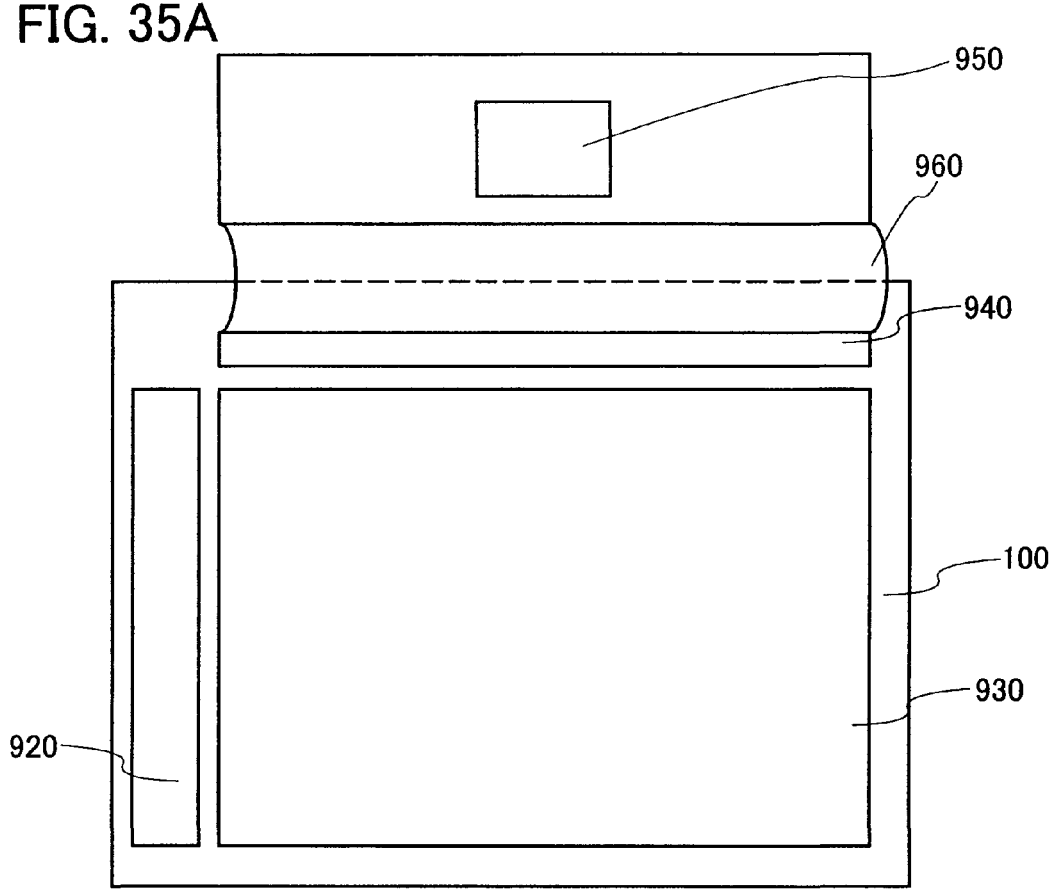
FIGS. 35A and 35B are diagrams showing the liquid crystal display module in accordance with Embodiment Mode 32.
Figure 35B:
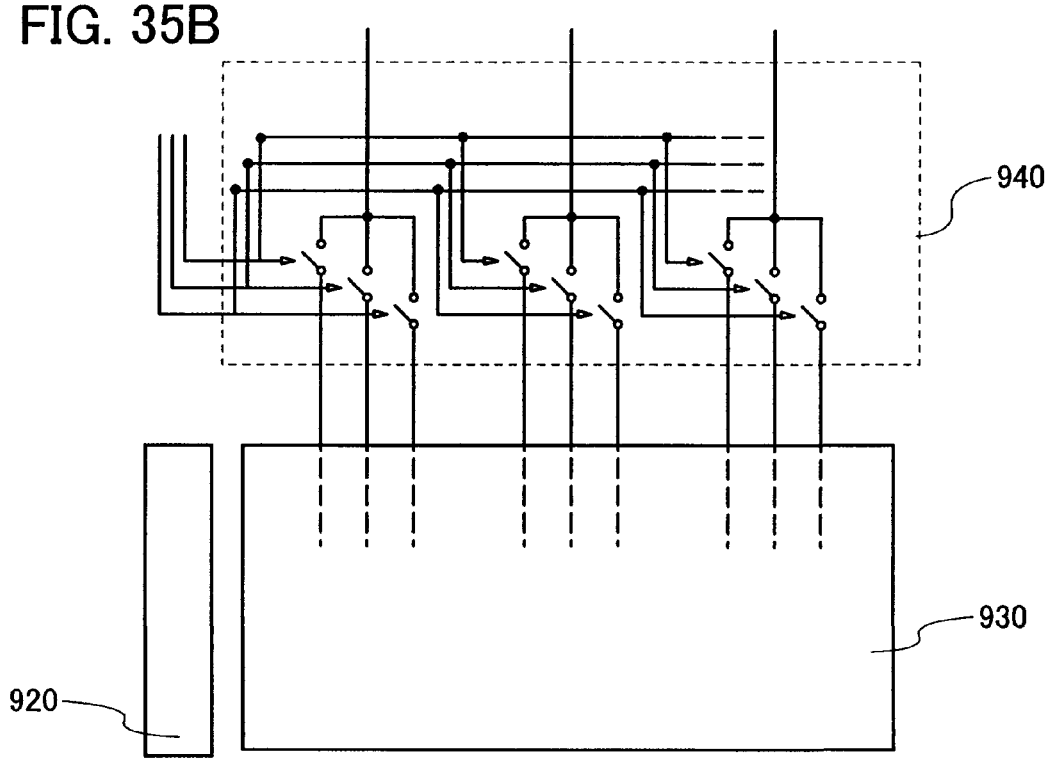

FIG. 35A is a schematic plan view of the liquid crystal display module, and FIG. 35B is a diagram showing a circuit configuration of a source driver. In an example shown in FIGS. 35A and 35B, the source driver includes a thin film transistor group 940 formed over the substrate 100, and an IC 950 which is separately formed from the substrate 100, as shown in FIG. 35A. The IC 950 and the thin film transistor group 940 are electrically connected with, for example, an FPC 960.

The IC 950 is, for example, formed by using a single crystalline silicon substrate, and controls the thin film transistor group 940 and inputs a video signal to the thin film transistor group 940. The thin film transistor group 940 controls a source signal line to which a video signal is transmitted based on a control signal from the IC 950.

Also by the liquid crystal display module in accordance with Embodiment Mode 32, an effect which is the same as that of Embodiment Mode 3 can be obtained.

Embodiment Mode 33

Figure 38A:
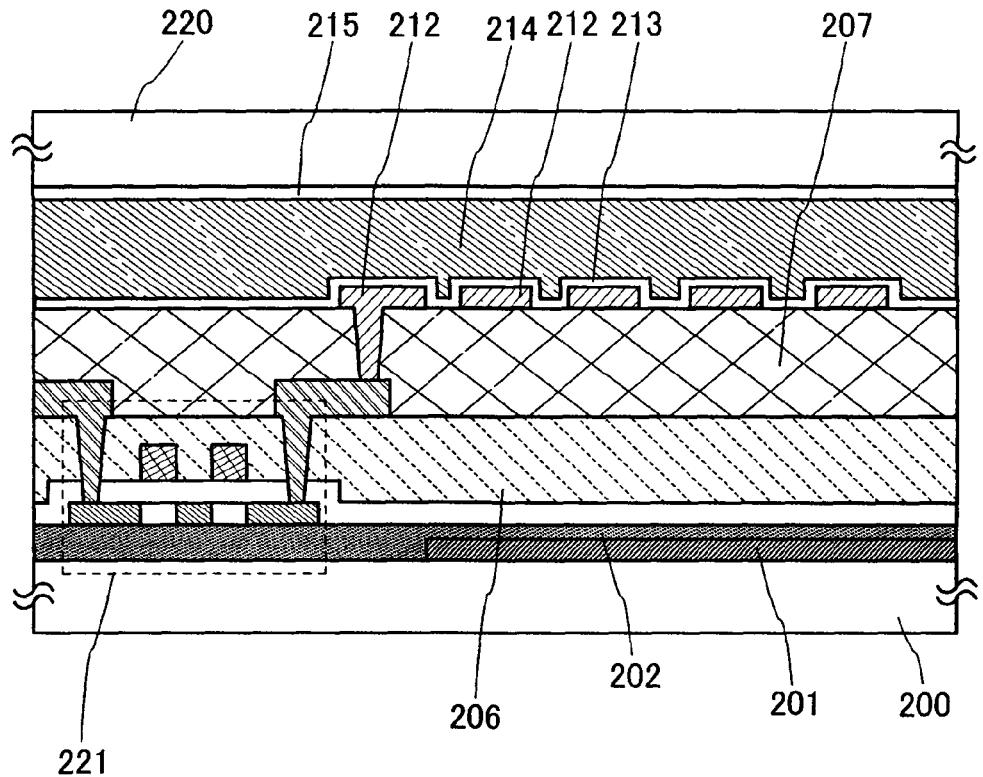
FIGS. 38A and 38B are cross-sectional views each showing a structure of a light-emitting device in accordance with Embodiment Mode 34.
Figure 38B:
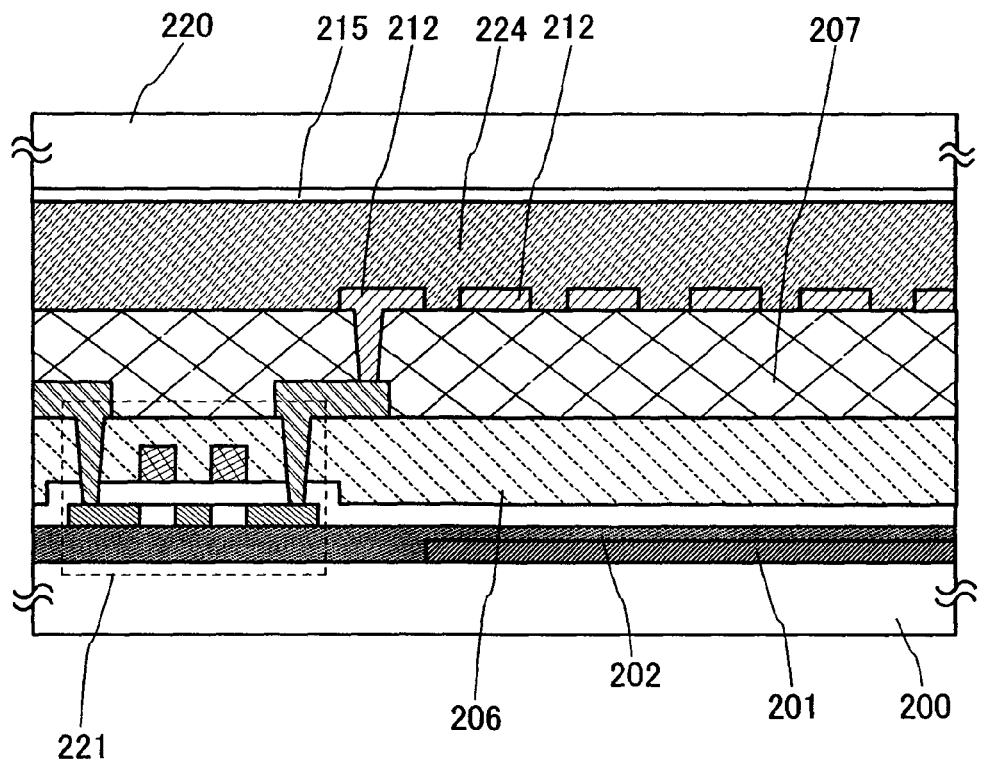

FIGS. 38A and 38B are cross-sectional views each showing a structure of a light-emitting device using the invention. In this embodiment, an example is shown in which the structure of the invention is combined with a self light-emitting element (e.g., an EL element) is described.

FIG. 38A is an example of a light-emitting device combining the structure of the invention with a thin-film EL element. The thin-film EL element includes a light-emitting layer formed of a thin film of a light-emitting material, and light emission can be obtained by collision excitation of a luminescent center or a host material by electrons accelerated with a high electric field.

As a mechanism of light emission, there are donor-acceptor recombination type light emission utilizing a donor level and an acceptor level, and localized-type light emission utilizing inner-shell electron transition of a metal ion. In general, in many cases, a thin-film EL element has localized-type light emission and a dispersion-type EL element has donor-acceptor recombination type light emission.

A specific structure is described below. FIG. 38A has a structure using a top-gate thin film transistor 221, and is similar to that of the liquid crystal display device in accordance with Embodiment Mode 1 in that a first electrode 201 and a second electrode 212 are used. That is, the first electrode 201 is formed over a substrate 200; an insulating film 202 is formed over the substrate 200 and the first electrode 201; and the thin film transistor 221 is formed over the insulating film 202. In addition, interlayer insulating films 206 and 207 are formed over the thin film transistor 221, and the second electrode 212 is formed over the interlayer insulating film 207. A slit is formed in the second electrode 212. Note that a slit may also be formed in the first electrode 201. In this embodiment mode, a layer 214 including a light-emitting material is provided over the second electrode 212.

The substrate 200, the first electrode 201, the insulating film 202, the thin film transistor 221, the interlayer insulating films 206 and 207, and the second electrode 212 are formed by steps which are similar to those of Embodiment Mode 2. Next, a dielectric 213 is formed over the second electrode 212, and the layer 214 including the light-emitting material may be provided over the dielectric 213. However, the invention is not limited this structure, and the dielectric 213 is not necessarily provided. When the dielectric 213 is not formed, each of the interlayer insulating films 206 and 207 functions as a dielectric. Further, a second substrate 220 is provided over the layer 214 including the light-emitting material with a protective layer 215 interposed therebetween.

A light-emitting material includes a host material and a luminescent center. As a luminescent center of localized-type light emission, manganese (Mn), copper (Cu) samarium (Sm), terbium (Tb), erbium (Er), thulium (Tm), europium (Eu), cerium (Ce), praseodymium (Pr), or the like can be used. Note that a halogen element such as fluorine (F) or chlorine (Cl) may be added as charge compensation.

As a light-emission center of donor-acceptor recombination type light emission, a light-emitting material including a first impurity element which forms a donor level and a second impurity element which forms an acceptor level can be used. As the first impurity element, for example, fluorine (F), chlorine (Cl), aluminum (Al), or the like can be used. As the second impurity element, for example, copper (Cu), silver (Ag), or the like can be used.

As a host material used for a light-emitting material, hydrosulfide, oxide, or nitride can be used. As hydrosulfide, for example, zinc sulfide (ZnS), cadmium sulfide (CdS), calcium sulfide (CaS), yttrium sulfide ($Y_2S_3$), gallium sulfide ($Ga_2S_3$), strontium sulfide (SrS), barium sulfide (BaS), or the like can be used. As oxide, for example, zinc oxide (ZnO), yttrium oxide ($Y_2O_3$), or the like can be used.

As nitride, for example, aluminum nitride (AlN), gallium nitride (GaN), indium nitride (InN), or the like can be used. Further, zinc selenide (ZnSe), zinc telluride (ZnTe), or the like can also be used, and a ternary mixed crystal such as calcium sulfide-gallium ($CaGa_2S_4$), strontium sulfide-gallium ($SrGa_2S_4$), or barium sulfide-gallium ($BaGa_2S_4$) may also be used.

In many cases, a thin-film EL element has localized-type light emission and a dispersion-type EL element has donor-acceptor recombination type light emission. In the case of the structure in FIG. 38A, it is preferable that a light-emitting material using a luminescent center serving as localized light emission (e.g., ZnS:Mn, ZnS:Cu, or Cl) be used.

Next, FIG. 38B shows an example of a light-emitting device combining the structure of the invention with a dispersion-type EL element. The dispersion-type EL element includes a light-emitting layer in which particles of a light-emitting material are dispersed in a binder, and light emission can be obtained by collision excitation of a luminescent center or a host material by electrons accelerated with a high electric field, similarly to the thin-film EL element. In the case of the dispersion-type EL element, a layer 224 including the light-emitting material is provided so as to be in contact with the second electrode 212.

As a light-emitting material which is dispersed in a binder, the above-described light-emitting material can be used similarly to the thin-film type EL element. Note that in the case of the dispersion-type EL element, it is preferable that a light-emitting material using a luminescent center serving as donor-acceptor recombination type light emission (e.g., ZnS:Ag, Cl, ZnS:Cu, or Al) be used. In addition, the light-emitting material is not limited to an inorganic material, and a light-emitting material using an organic material (e.g., rbrene, or 9,10-diphenylanthracene) may also be used.

As a binder which can be used for the dispersion-type EL element, an organic material or an inorganic material can be used, or a mixed material of an organic material and an inorganic material may be used. As an organic material, a resin such as a polyethylene, polypropylene, a polystyrene-based resin, a silicone resin, an epoxy resin, or vinylidene fluoride, or a polymer having a comparatively high dielectric constant like a cyanoethyl cellulose-based resin can be used. In addition, a heat-resistant molecule such as aromatic polyamide or polybenzimidazole, or a siloxane resin may also be used.

Further, a resin material such as a vinyl resin, e.g., polyvinyl alcohol or polyvinyl butyral, a phenol resin, a novolac resin, an acrylic resin, a melamine resin, a urethane resin, or an oxazole resin (polybenzoxazole) may also be used, or a photo-curing resin or the like can also be used. Moreover, a dielectric constant can also be controlled by mixing these resins with microparticles having a high dielectric constant such as barium titanate ($BaTiO_3$) or strontium titanate ($SrTiO_3$) as appropriate.

As an inorganic material used for the binder, a material selected from silicon oxide ($SiO_x$), silicon nitride ($SiN_x$), silicon including oxygen and nitrogen, aluminum nitride (AlN), aluminum including oxygen and nitrogen, aluminum oxide ($Al_2O_3$), titanium oxide ($TiO_2$), $BaTiO_3$, $SrTiO_3$, lead titanate ($PbTiO_3$), potassium niobate ($KNbO_3$), lead niobate ($PbNbO_3$), tantalum oxide ($Ta_2O_5$), barium tantalate ($BaTa_2O_6$), lithium tantalate ($LiTaO_3$), yttrium oxide ($Y_2O_3$), zirconium oxide ($ZrO_2$), zinc sulfide (ZnS), and a substance including another inorganic material can be used. By mixing the organic material with an inorganic material having a high dielectric constant (by adding or the like), a dielectric constant of a layer including a light-emitting material and a light-emitting substance formed of the binder can be further increased.

Note that although the EL element can obtain light emission when a voltage is applied between a pair of electrode layers, it is preferable to use AC drive in this embodiment mode. This is because an EL light-emitting element shown in this embodiment mode is controlled to emit light by using an electric field generated by the first electrode 201 and the second electrode 212. Note that the electric field generated for light emission is similar to that of each liquid crystal display device described in the above-described embodiment modes.

As shown in this embodiment mode, an interval between the electrodes can be controlled by forming the insulating film over the first electrode. For example, a micro cavity effect can also be obtain between the first electrode and the second electrode by controlling the interval between the electrodes in the structure shown in this embodiment mode, so that a light-emitting device having excellent color purity can be manufactured.

As described above, an application range of the invention is extremely wide and the invention can be used for electronic devices in all fields.

Note that the invention is not limited to the above-described embodiment modes, and the invention can be implemented by changing in various ways unless such changes depart from the spirit and the scope of the invention.

Embodiment Mode 34

Electronic devices in accordance with Embodiment Mode 34 of the invention are described with reference to FIGS. 36A to 36H. The display device or the display module shown in any one of the above-described embodiment modes is mounted in each of the electronic devices.

A camera such as a video camera or a digital camera, a goggle display (a head mounted display), a navigation system, an audio reproducing device (e.g., a car audio component set), a computer, a game machine, a portable information terminal (e.g., a mobile computer, a mobile phone, a mobile game machine, or an electronic book), an image reproducing device provided with a recording medium (specifically, a device for reproducing a content of a recording medium such as a Digital Versatile Disc (DVD) and having a display which can display an reproduced image), and the like are given as these electronic devices. Specific examples of these electronic devices are shown in FIGS. 36A to 36H.

Figure 36A:
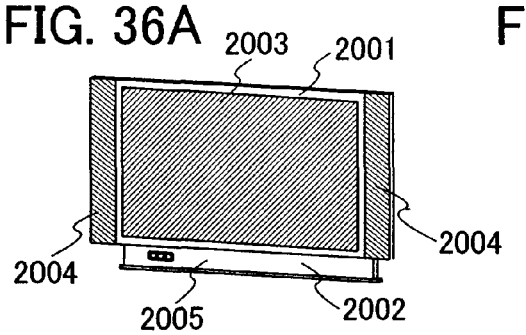
FIGS. 36A to 36H are perspective views each showing an electronic device in accordance with Embodiment Mode 33.

FIG. 36A shows a monitor of a television receiver or a personal computer, which includes a housing 2001, a support base 2002, a display portion 2003, a speaker portion 2004, a video input terminal 2005, and the like. The display device or the display module shown in any one of the above-described embodiment modes is used for the display portion 2003. Since this display device or display module is included, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a viewing angle is widened by applying an optimal electric field. In addition, when a part of a pixel electrode having the same potential as that of a drain or a source of a thin film transistor is provided below the drain or the source of the thin film transistor, the potential of the drain or the source thereof is stabilized. Accordingly, since an interval between opening patterns included in the electrodes can be reduced and an electric field is applied smoothly, liquid crystal molecules can be easily controlled. Further, since a voltage can be lowered by reducing the interval between the opening patterns included in the electrodes, power consumption can be reduced.

Figure 36B:
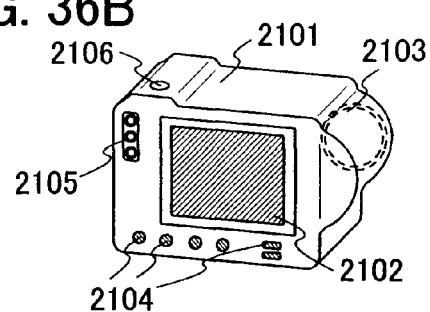

FIG. 36B shows a digital camera. An image receiving portion 2103 is provided in a front portion of a main body 2101, and a shutter button 2106 is provided in a upper surface portion of the main body 2101. In addition, a display portion 2102, operating keys 2104, and an external connecting port 2105 are provided in a back portion of the main body 2101. The display device or the display module shown in any one of the above-described embodiment modes is used for the display portion 2102. Since this display device or display module is included, an advantageous effect which is similar to that of the aforementioned embodiment mode can be obtained. For example, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a product including a liquid crystal display device or a liquid crystal module having a wide viewing angle can be provided.

Figure 36C:
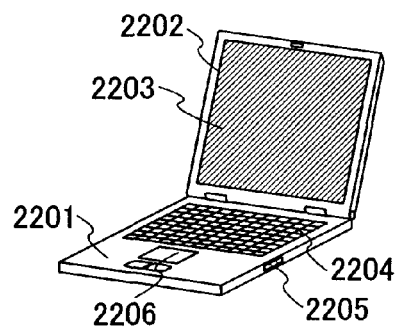

FIG. 36C shows a laptop personal computer. A keyboard 2204, an external connecting port 2205, and a pointing device 2206 are provided in a main body 2201. In addition, a housing 2202 having a display portion 2203 is attached to the main body 2201. The display device or the display module shown in any one of the above-described embodiment modes is used for the display portion 2203. Since this display device or display module is included, an advantageous effect which is similar to that of the aforementioned embodiment mode can be obtained. For example, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and an interval of the opening pattern can be freely set. Then, a gradient of an electric field applied between the electrodes can be controlled, so that, for example, an electric field parallel to the substrate or the like can be easily increased. That is, since liquid crystal molecules which are aligned in parallel to the substrate (so-called homogeneous alignment) can be controlled in a direction parallel to the substrate in a display device using liquid crystals, a product including a liquid crystal display device or a liquid crystal module having a wide viewing angle can be provided.

Figure 36D:
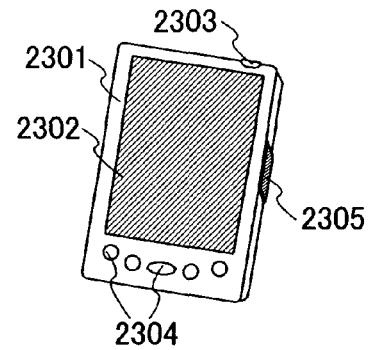

FIG. 36D shows a mobile computer, which includes a main body 2301, a display portion 2302, a switch 2303, operating keys 2304, an infrared port 2305, and the like. An active matrix display device is provided in the display portion 2302. The display device or the display module shown in any one of the above-described embodiment modes is used for the display portion 2302. Since this display device or display module is included, an advantageous effect which is similar to that of the aforementioned embodiment mode can be obtained. For example, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a product including a liquid crystal display device or a liquid crystal module having a wide viewing angle can be provided.

Figure 36E:
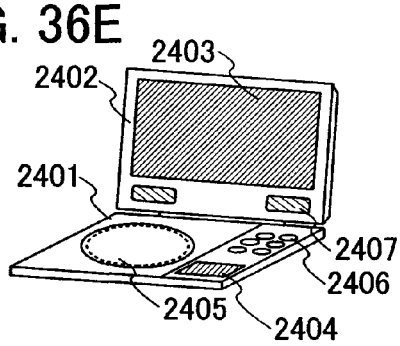

FIG. 36E shows an image reproduction device. A display portion 2404, a record medium reading portion 2405, and an operating key 2406 are provided in a main body 2401. In addition, a housing 2402 having a speaker portion 2407 and a display portion 2403 are attached to the main body 2401. The display device or the display module shown in any one of the above-described embodiment modes is used for each of the display portions 2403 and 2404. Since this display device or display module is included, an advantageous effect which is similar to that of the aforementioned embodiment mode can be obtained. For example, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a product including a liquid crystal display device or a liquid crystal module having a wide viewing angle can be provided.

Figure 36F:
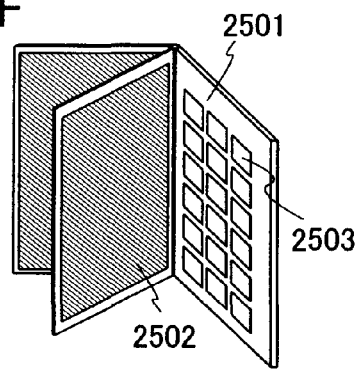

FIG. 36F shows an electronic book. An operating key 2503 is provided in a main body 2501. In addition, a plurality of display portions 2502 are attached to the main body 2501. The display device or the display module shown in any one of the above-described embodiment modes is used for the display portion 2502. Since this display device or display module is included, an advantageous effect which is similar to that of the aforementioned embodiment mode can be obtained. For example, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a product including a liquid crystal display device or a liquid crystal module having a wide viewing angle can be provided.

Figure 36G:
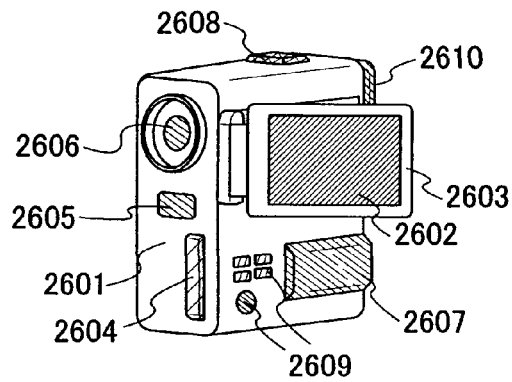

FIG. 36G shows a video camera. An external connecting port 2604, a remote control receiving portion 2605, an image receiving portion 2606, a battery 2607, an audio input portion 2608, operating keys 2609, and an eye piece portion 2610 are provided in a main body 2601. In addition, a housing 2603 having a display portion 2602 is attached to the main body 2601. The display device or the display module shown in any one of the above-described embodiment modes is used for the display portion 2602. Since this display device or display module is included, an advantageous effect which is similar to that of the aforementioned embodiment mode can be obtained. For example, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a product including a liquid crystal display device or a liquid crystal module having a wide viewing angle can be provided.

Figure 36H:
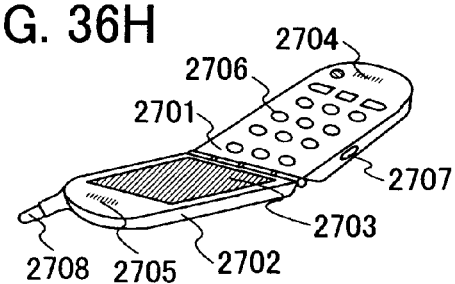

FIG. 36H shows a mobile phone, which includes a main body 2701, a housing 2702, a display portion 2703, an audio input portion 2704, an audio output portion 2705, an operating key 2706, an external connecting port 2707, an antenna the 2708, and the like. The display device or the display module shown in any one of the above-described embodiment modes is used for the display portion 2703. Since this display device or display module is included, an advantageous effect which is similar to that of the aforementioned embodiment mode can be obtained. For example, degree of freedom of an interval between a common electrode and a pixel electrode is improved. Accordingly, since optimal values for an arrangement interval and width of an opening pattern of the pixel electrode change depending on a distance between the pixel electrode and the common electrode, the size, the width, and the interval of the opening pattern can be freely set. Then, a gradient of an electric field applied between the electrodes can be controlled, so that, for example, an electric field parallel to the substrate can be easily increased. That is, since liquid crystal molecules which are aligned in parallel to the substrate (so-called homogeneous alignment) can be controlled in a direction parallel to the substrate in a display device using liquid crystals, a product including a liquid crystal display device or a liquid crystal module having a wide viewing angle can be provided.

This application is based on Japanese Patent Application serial No. 2006-135954 filed in Japan Patent Office on May 16, 2006, the entire contents of which are hereby incorporated by reference.

What is claimed is:

1. A liquid crystal display device comprising:
a first electrode formed over a substrate;

a first insulating film formed over the first electrode;
a semiconductor film formed over the first insulating film;
a gate insulating film formed over the semiconductor film;
a gate electrode formed over the gate insulating film;
a second insulating film formed over the gate electrode;
a second electrode formed over the second insulating film and including an opening; and
a liquid crystal provided over the second electrode,
wherein the liquid crystal is controlled by an electric field between the first electrode and the second electrode.

2. The liquid crystal display device according to claim 1, wherein the first electrode is a common electrode and the second electrode is a pixel electrode.

3. The liquid crystal display device according to claim 1, wherein the first electrode is a pixel electrode and the second electrode is a common electrode.

4. An electronic device comprising the liquid crystal display device according to claim 1.

5. A liquid crystal display device comprising:
a first electrode formed over a substrate;
a first insulating film formed over the first electrode;
a conductive film formed over the first insulating film;
a semiconductor film formed over the conductive film;
a second insulating film formed over the semiconductor film;
a second electrode formed over the second insulating film and including an opening; and
a liquid crystal provided over the second electrode,
wherein the liquid crystal is controlled by an electric field between the first electrode and the second electrode.

6. The liquid crystal display device according to claim 5, wherein the first electrode is a common electrode and the second electrode is a pixel electrode.

7. The liquid crystal display device according to claim 5, wherein the first electrode is a pixel electrode and the second electrode is a common electrode.

8. An electronic device comprising the liquid crystal display device according to claim 5.

9. A liquid crystal display device comprising:
a first electrode formed over a substrate;
a first insulating film formed over the first electrode;
a thin film transistor formed over the first insulating film;
a second insulating film formed over the thin film transistor;
a conductive film formed over the second insulating film;
a third insulating film formed over the conductive film;
a second electrode formed over the third insulating film and including an opening; and
a liquid crystal provided over the second electrode,
wherein the liquid crystal is controlled by an electric field between the first electrode and the second electrode.

10. The liquid crystal display device according to claim 9, wherein the first electrode is a common electrode and the second electrode is a pixel electrode.

11. The liquid crystal display device according to claim 9, wherein the first electrode is a pixel electrode and the second electrode is a common electrode.

12. An electronic device comprising the liquid crystal display device according to claim 9.

13. A liquid crystal display device comprising:
a first electrode formed over a substrate;
a first insulating film formed over the first electrode;
a thin film transistor formed over the first insulating film;
a second insulating film formed over the thin film transistor;
a second electrode formed over the second insulating film and including an opening; and
a liquid crystal provided over the second electrode,
wherein the liquid crystal is controlled by an electric field between the first electrode and the second electrode.

14. The liquid crystal display device according to claim 13, wherein the first electrode is a common electrode and the second electrode is a pixel electrode.

15. The liquid crystal display device according to claim 13, wherein the first electrode is a pixel electrode and the second electrode is a common electrode.

16. An electronic device comprising the liquid crystal display device according to claim 13.

* * * * *